(12) United States Patent
Glass et al.

(10) Patent No.: US 11,436,651 B2
(45) Date of Patent: *Sep. 6, 2022

(54) GROUP VIDEO GENERATING SYSTEM

(71) Applicant: e2interactive, Inc., Atlanta, GA (US)

(72) Inventors: Brett R. Glass, Kansas City, MO (US); Nicole E. Glass, Kansas City, MO (US); Karl Joseph Geisler, Kansas City, MO (US); Dominique Michelle Pierron O'Hara, Kansas City, MO (US)

(73) Assignee: E2INTERACTIVE, INC., Atlanta, GA (US)

( * ) Notice: Subject to any disclaimer, the term of this patent is extended or adjusted under 35 U.S.C. 154(b) by 393 days.

This patent is subject to a terminal disclaimer.

(21) Appl. No.: 16/511,260

(22) Filed: Jul. 15, 2019

(65) Prior Publication Data

US 2019/0340661 A1 Nov. 7, 2019

Related U.S. Application Data

(63) Continuation of application No. 14/829,237, filed on Aug. 18, 2015, now Pat. No. 10,417,677, and a
(Continued)

(51) Int. Cl.
*G06Q 30/00* (2012.01)
*G06Q 30/06* (2012.01)
(Continued)

(52) U.S. Cl.
CPC ......... *G06Q 30/0601* (2013.01); *G06Q 20/12* (2013.01); *G06Q 20/123* (2013.01);
(Continued)

(58) Field of Classification Search
CPC ..................................................... G06Q 30/00
See application file for complete search history.

(56) References Cited

U.S. PATENT DOCUMENTS 794,417 A 7/1905 Maniachi
3,288,350 A 11/1966 Kushner
(Continued)

FOREIGN PATENT DOCUMENTS

EP 0950968 A4 5/2004
EP 1519332 A1 3/2005
(Continued)

OTHER PUBLICATIONS

International Search Report of PCT/US 13/23945, dated Mar. 29, 2013; 2 pages.
(Continued)

*Primary Examiner* — Mark A Fadok
(74) *Attorney, Agent, or Firm* — Landmark Intellectual Property Law, PLLC; Gregory M Murphy

(57) ABSTRACT

A group video generating system includes an application that is executed on each of multiple computing devices to generate a graphical user interface (GUI) that receives from each of a plurality of participants, a video segment including content directed toward a recipient. The application combines the video segment from each participant to form a group video, and transmits the group video to the recipient.

20 Claims, 32 Drawing Sheets

Related U.S. Application Data continuation-in-part of application No. 13/964,895, filed on Aug. 12, 2013, now Pat. No. 10,430,865, which is a continuation-in-part of application No. 13/753,453, filed on Jan. 29, 2013, now Pat. No. 10,713,709.

(60) Provisional application No. 62/039,260, filed on Aug. 19, 2014, provisional application No. 61/737,731, filed on Dec. 14, 2012, provisional application No. 61/592,320, filed on Jan. 30, 2012, provisional application No. 61/698,410, filed on Sep. 7, 2012, provisional application No. 61/737,729, filed on Dec. 14, 2012.

(51) Int. Cl.
*H04L 65/403* (2022.01)
*H04N 7/15* (2006.01)
*G06Q 20/12* (2012.01)
*G06Q 20/38* (2012.01)
*G06Q 50/00* (2012.01)
*H04L 65/75* (2022.01)

(52) U.S. Cl.
CPC ........... *G06Q 20/387* (2013.01); *G06Q 30/06* (2013.01); *G06Q 30/0631* (2013.01); *G06Q 50/01* (2013.01); *H04L 65/403* (2013.01); *H04L 65/75* (2022.05); *H04N 7/152* (2013.01)

(56) References Cited

U.S. PATENT DOCUMENTS

| | | |
|---|---|---|
| 4,068,213 A | 1/1978 | Nakamura et al. |
| 4,482,802 A | 11/1984 | Aizawa et al. |
| 4,734,858 A | 3/1988 | Schlafly |
| 4,747,049 A | 5/1988 | Richardson et al. |
| 4,755,940 A | 7/1988 | Brachtl et al. |
| 4,767,917 A | 8/1988 | Ushikubo |
| 4,795,892 A | 1/1989 | Gilmore et al. |
| 4,877,947 A | 10/1989 | Mori |
| 4,900,904 A | 2/1990 | Wright et al. |
| 4,908,521 A | 3/1990 | Boggan et al. |
| 4,943,707 A | 7/1990 | Boggan |
| 5,091,634 A | 2/1992 | Finch et al. |
| 5,117,355 A | 5/1992 | McCarthy |
| 5,202,826 A | 4/1993 | McCarthy |
| 5,255,182 A | 10/1993 | Adams |
| 5,256,863 A | 10/1993 | Ferguson et al. |
| 5,311,424 A | 5/1994 | Mukherjee et al. |
| 5,367,148 A | 11/1994 | Storch et al. |
| 5,375,240 A | 12/1994 | Grundy |
| 5,383,113 A | 1/1995 | Kight et al. |
| 5,384,449 A | 1/1995 | Peirce |
| 5,465,288 A | 11/1995 | Falvey et al. |
| 5,477,038 A | 12/1995 | Levine et al. |
| 5,500,513 A | 3/1996 | Langhans et al. |
| 5,502,765 A | 3/1996 | Ishiguro et al. |
| 5,511,114 A | 4/1996 | Stimson et al. |
| 5,577,109 A | 11/1996 | Stimson et al. |
| 5,581,064 A | 12/1996 | Riley et al. |
| 5,590,038 A | 12/1996 | Pitroda |
| 5,602,377 A | 2/1997 | Beller et al. |
| 5,619,559 A | 4/1997 | Kennedy |
| 5,621,201 A | 4/1997 | Langhans et al. |
| 5,621,787 A | 4/1997 | McKoy et al. |
| 5,644,721 A | 7/1997 | Chung et al. |
| 5,657,389 A | 8/1997 | Houvener |
| 5,671,279 A | 9/1997 | Elgamal |
| 5,679,938 A | 10/1997 | Templeton et al. |
| 5,679,940 A | 10/1997 | Templeton et al. |
| 5,696,909 A | 12/1997 | Wallner |
| 5,699,528 A | 12/1997 | Hogan |
| 5,705,798 A | 1/1998 | Tarbox |
| 5,708,780 A | 1/1998 | Levergood et al. |
| 5,721,768 A | 2/1998 | Stimson et al. |
| 5,721,781 A | 2/1998 | Deo et al. |
| 5,729,693 A | 3/1998 | Holda-Fleck |
| 5,732,136 A | 3/1998 | Murphree et al. |
| 5,734,719 A | 3/1998 | Tsevdos et al. |
| 5,740,915 A | 4/1998 | Williams |
| 5,754,655 A | 5/1998 | Hughes et al. |
| 5,760,381 A | 6/1998 | Stich et al. |
| 5,777,305 A | 7/1998 | Smith et al. |
| 5,799,285 A | 8/1998 | Klingman |
| 5,806,045 A | 9/1998 | Biorge et al. |
| 5,828,740 A | 10/1998 | Khuc et al. |
| 5,844,972 A | 12/1998 | Jagadish et al. |
| 5,850,217 A | 12/1998 | Cole |
| 5,857,175 A | 1/1999 | Day et al. |
| 5,873,072 A | 2/1999 | Kight et al. |
| 5,878,401 A | 3/1999 | Joseph |
| 5,884,271 A | 3/1999 | Pitroda |
| 5,889,270 A | 3/1999 | Haagen et al. |
| 5,889,863 A | 3/1999 | Weber |
| 5,897,625 A | 4/1999 | Gustin et al. |
| 5,903,633 A | 5/1999 | Lorsch |
| 5,903,830 A | 5/1999 | Joao et al. |
| 5,903,874 A | 5/1999 | Leonard et al. |
| 5,907,142 A | 5/1999 | Kelsey |
| 5,909,492 A | 6/1999 | Payne et al. |
| 5,913,210 A | 6/1999 | Call |
| 5,918,213 A | 6/1999 | Bernard et al. |
| 5,930,363 A | 7/1999 | Stanford et al. |
| 5,945,653 A | 8/1999 | Walker et al. |
| 5,950,173 A | 9/1999 | Perkowski |
| 5,953,710 A | 9/1999 | Fleming |
| 5,956,695 A | 9/1999 | Carrithers et al. |
| 5,956,700 A | 9/1999 | Landry |
| 5,968,110 A | 10/1999 | Westrope et al. |
| 5,984,508 A | 11/1999 | Hurley |
| 5,988,509 A | 11/1999 | Taskett |
| 5,991,413 A | 11/1999 | Arditti et al. |
| 5,991,748 A | 11/1999 | Taskett |
| 5,991,749 A | 11/1999 | Morrill, Jr. |
| 5,999,624 A | 12/1999 | Hopkins |
| 6,000,608 A | 12/1999 | Dorf |
| 6,012,049 A | 1/2000 | Kawan |
| 6,018,570 A | 1/2000 | Matison |
| 6,025,780 A | 2/2000 | Bowers et al. |
| 6,029,139 A | 2/2000 | Cunningham et al. |
| 6,029,141 A | 2/2000 | Bezos et al. |
| 6,029,151 A | 2/2000 | Nikander |
| 6,032,135 A | 2/2000 | Molano et al. |
| 6,032,859 A | 3/2000 | Muehlberger et al. |
| 6,039,244 A | 3/2000 | Finsterwald |
| 6,049,778 A | 4/2000 | Walker et al. |
| 6,055,511 A | 4/2000 | Luebbering et al. |
| 6,055,567 A | 4/2000 | Ganesan et al. |
| 6,058,300 A | 5/2000 | Hanson |
| 6,058,382 A | 5/2000 | Kasai et al. |
| 6,062,472 A | 5/2000 | Cheung |
| 6,070,150 A | 5/2000 | Remington et al. |
| 6,085,167 A | 7/2000 | Iguchi |
| 6,085,242 A | 7/2000 | Chandra |
| 6,088,682 A | 7/2000 | Burke |
| 6,092,053 A | 7/2000 | Boesch et al. |
| 6,098,053 A | 8/2000 | Slater |
| 6,105,008 A | 8/2000 | Davis et al. |
| 6,119,164 A | 9/2000 | Basche |
| 6,125,352 A | 9/2000 | Franklin et al. |
| 6,129,276 A | 10/2000 | Jelen et al. |
| 6,134,533 A | 10/2000 | Shell |
| 6,138,106 A | 10/2000 | Walker et al. |
| 6,138,911 A | 10/2000 | Fredregill et al. |
| 6,142,369 A | 11/2000 | Jonstromer |
| 6,148,249 A | 11/2000 | Newman |
| 6,167,387 A | 12/2000 | Lee-Wai-Yin |
| 6,169,890 B1 | 1/2001 | Vatanen |
| 6,173,272 B1 | 1/2001 | Thomas et al. |
| 6,175,823 B1 | 1/2001 | Dusen |
| 6,185,545 B1 | 2/2001 | Resnick et al. |
| 6,188,752 B1 | 2/2001 | Lesley |

(56) References Cited

U.S. PATENT DOCUMENTS

| | | |
|---|---|---|
| 6,219,652 B1 | 4/2001 | Carter et al. |
| 6,222,914 B1 | 4/2001 | McMullin |
| 6,226,364 B1 | 5/2001 | O'Neil |
| 6,240,397 B1 | 5/2001 | Sachs |
| 6,256,690 B1 | 7/2001 | Carper |
| 6,282,566 B1 | 8/2001 | Lee, Jr. et al. |
| 6,285,749 B1 | 9/2001 | Manto |
| 6,289,322 B1 | 9/2001 | Kitchen et al. |
| 6,295,522 B1 | 9/2001 | Boesch |
| 6,304,860 B1 | 10/2001 | Martin, Jr. et al. |
| 6,308,887 B1 | 10/2001 | Korman et al. |
| 6,311,165 B1 | 10/2001 | Coutts et al. |
| 6,311,170 B1 | 10/2001 | Embrey |
| 6,314,171 B1 | 11/2001 | Dowens |
| 6,315,195 B1 | 11/2001 | Ramachandran |
| 6,317,028 B1 | 11/2001 | Valiulis |
| 6,324,525 B1 | 11/2001 | Kramer et al. |
| 6,327,577 B1 | 12/2001 | Garrison et al. |
| 6,330,544 B1 | 12/2001 | Walker et al. |
| 6,332,135 B1 | 12/2001 | Conklin et al. |
| 6,333,976 B2 | 12/2001 | Lesley |
| 6,334,116 B1 | 12/2001 | Ganesan et al. |
| 6,360,254 B1 | 3/2002 | Linden et al. |
| 6,363,362 B1 | 3/2002 | Burfield et al. |
| 6,363,364 B1 | 3/2002 | Nel |
| 6,366,893 B2 | 4/2002 | Hannula et al. |
| 6,375,073 B1 | 4/2002 | Aebi et al. |
| 6,422,462 B1 | 7/2002 | Cohen |
| 6,424,706 B1 | 7/2002 | Katz et al. |
| 6,434,238 B1 | 8/2002 | Chaum et al. |
| 6,442,532 B1 | 8/2002 | Kawan |
| 6,467,684 B2 | 10/2002 | Fite et al. |
| 6,473,500 B1 | 10/2002 | Risaf et al. |
| 6,473,739 B1 | 10/2002 | Showghi et al. |
| 6,494,367 B1 | 12/2002 | Zacharias |
| 6,502,745 B1 | 1/2003 | Stimson et al. |
| 6,507,823 B1 | 1/2003 | Nel |
| 6,529,956 B1 | 3/2003 | Smith et al. |
| 6,536,659 B1 | 3/2003 | Hauser et al. |
| 6,542,933 B1 | 4/2003 | Durst, Jr. et al. |
| 6,550,672 B1 | 4/2003 | Tracy et al. |
| 6,575,361 B1 | 6/2003 | Graves et al. |
| 6,581,827 B2 | 6/2003 | Welton |
| 6,591,098 B1 | 7/2003 | Shieh et al. |
| 6,594,640 B1 | 7/2003 | Postrel |
| 6,594,644 B1 | 7/2003 | Dusen |
| 6,609,113 B1 | 8/2003 | O'Leary et al. |
| 6,615,189 B1 | 9/2003 | Phillips et al. |
| 6,615,190 B1 | 9/2003 | Slater |
| 6,622,015 B1 | 9/2003 | Himmel et al. |
| 6,636,833 B1 | 10/2003 | Flitcroft et al. |
| 6,648,222 B2 | 11/2003 | McDonald et al. |
| 6,651,885 B1 | 11/2003 | Arias |
| 6,659,259 B2 | 12/2003 | Knox et al. |
| 6,678,664 B1 | 1/2004 | Ganesan |
| 6,684,269 B2 | 1/2004 | Wagner |
| 6,705,520 B1 | 3/2004 | Pitroda et al. |
| 6,745,022 B2 | 6/2004 | Knox |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,819,219 B1 | 11/2004 | Bolle et al. |
| 6,827,260 B2 | 12/2004 | Stoutenburg et al. |
| 6,829,596 B1 | 12/2004 | Frazee |
| 6,836,765 B1 | 12/2004 | Sussman |
| 6,836,962 B2 | 1/2005 | Khandros et al. |
| 6,839,692 B2 | 1/2005 | Carrott et al. |
| 6,839,744 B1 | 1/2005 | Kloba et al. |
| 6,848,613 B2 | 2/2005 | Nielsen et al. |
| 6,856,974 B1 | 2/2005 | Ganesan et al. |
| 6,868,391 B1 | 3/2005 | Hultgren |
| 6,882,984 B1 | 4/2005 | Boyle et al. |
| 6,915,277 B1 | 7/2005 | Manchester et al. |
| 6,918,537 B2 | 7/2005 | Graves et al. |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B1 | 8/2005 | Ritter et al. |
| 6,941,270 B1 | 9/2005 | Hannula |
| 6,948,063 B1 | 9/2005 | Ganesan et al. |
| 6,961,412 B2 | 11/2005 | Ruckart et al. |
| 6,965,866 B2 | 11/2005 | Klein |
| 6,975,937 B1 | 12/2005 | Kantarjiev et al. |
| 6,988,657 B1 | 1/2006 | Singer et al. |
| 6,993,510 B2 | 1/2006 | Guy et al. |
| 7,014,107 B2 | 3/2006 | Singer et al. |
| 7,016,863 B1 | 3/2006 | Kamakura et al. |
| 7,024,174 B2 | 4/2006 | Nagy et al. |
| 7,024,396 B2 | 4/2006 | Woodward |
| 7,054,842 B2 | 5/2006 | James et al. |
| 7,069,248 B2 | 6/2006 | Huber |
| 7,072,854 B2 | 7/2006 | Loeser |
| 7,072,864 B2 | 7/2006 | Brake, Jr. et al. |
| 7,083,084 B2 | 8/2006 | Graves et al. |
| 7,085,931 B1 | 8/2006 | Smith et al. |
| 7,086,584 B2 | 8/2006 | Stoutenburg et al. |
| 7,093,761 B2 | 8/2006 | Smith et al. |
| 7,117,227 B2 | 10/2006 | Call |
| 7,128,274 B2 | 10/2006 | Kelley et al. |
| 7,130,817 B2 | 10/2006 | Karas et al. |
| 7,131,582 B2 | 11/2006 | Welton |
| 7,143,055 B1 | 11/2006 | Perkowski |
| 7,162,440 B2 | 1/2007 | Koons |
| 7,165,052 B2 | 1/2007 | Diveley et al. |
| 7,182,252 B1 | 2/2007 | Cooper et al. |
| 7,194,438 B2 | 3/2007 | Sovio et al. |
| 7,209,889 B1 | 4/2007 | Whitfield |
| 7,209,890 B1 | 4/2007 | Peon et al. |
| 7,216,092 B1 | 5/2007 | Weber et al. |
| 7,222,101 B2 | 5/2007 | Bishop et al. |
| 7,229,006 B2 | 6/2007 | Babbi et al. |
| 7,229,014 B1 | 6/2007 | Snyder |
| 7,243,839 B2 | 7/2007 | Beck et al. |
| 7,249,054 B2 | 7/2007 | Keil |
| 7,249,097 B2 | 7/2007 | Hutchison et al. |
| 7,269,256 B2 | 9/2007 | Rosen |
| 7,292,998 B2 | 11/2007 | Graves et al. |
| 7,316,350 B2 | 1/2008 | Algiene |
| 7,328,190 B2 | 2/2008 | Smith et al. |
| 7,333,955 B2 | 2/2008 | Graves et al. |
| 7,356,327 B2 | 4/2008 | Cai et al. |
| 7,363,265 B2 | 4/2008 | Horgan |
| 7,370,012 B2 | 5/2008 | Karns et al. |
| 7,376,431 B2 | 5/2008 | Niedermeyer |
| 7,383,226 B2 | 6/2008 | Kight et al. |
| 7,398,248 B2 | 7/2008 | Phillips et al. |
| 7,400,883 B2 | 7/2008 | Rivers et al. |
| 7,415,617 B2 | 8/2008 | Ginter et al. |
| 7,437,328 B2 | 10/2008 | Graves et al. |
| 7,494,417 B2 | 2/2009 | Walker et al. |
| 7,519,543 B2 | 4/2009 | Ota et al. |
| 7,536,349 B1 | 5/2009 | Mik et al. |
| 7,566,000 B2 | 7/2009 | Agostino et al. |
| 7,590,557 B2 | 9/2009 | Harrison et al. |
| 7,631,803 B2 | 12/2009 | Peyret et al. |
| 7,650,308 B2 | 1/2010 | Nguyen et al. |
| 7,702,542 B2 | 4/2010 | Aslanian, Jr. |
| 7,711,598 B2 | 5/2010 | Perkowski |
| 7,725,326 B1 | 5/2010 | Tracy et al. |
| 7,735,724 B2 | 6/2010 | Fujita et al. |
| 7,757,944 B2 | 7/2010 | Cline et al. |
| 7,774,209 B2 | 8/2010 | James et al. |
| 7,840,437 B2 | 11/2010 | Lewis |
| 7,848,948 B2 | 12/2010 | Perkowski et al. |
| 7,866,548 B2 | 1/2011 | Reed et al. |
| 7,904,333 B1 | 3/2011 | Perkowski |
| 7,905,399 B2 | 3/2011 | Barnes et al. |
| 7,917,386 B2 | 3/2011 | Christensen |
| 7,940,333 B2 | 5/2011 | Suzuki |
| 7,941,373 B1 | 5/2011 | Chang et al. |
| 7,959,076 B1 | 6/2011 | Hopkins, III |
| 8,046,268 B2 | 10/2011 | Hunt |
| 8,060,413 B2 | 11/2011 | Castell et al. |
| 8,103,520 B2 | 1/2012 | Mueller et al. |

(56) References Cited

U.S. PATENT DOCUMENTS

| | | |
|---|---|---|
| 8,109,436 B1 | 2/2012 | Hopkins, III |
| 8,195,568 B2 | 6/2012 | Singhal |
| 8,332,323 B2 | 12/2012 | Stals et al. |
| 8,355,982 B2 | 1/2013 | Hazel et al. |
| 8,396,758 B2 | 3/2013 | Paradise et al. |
| 8,509,814 B1 | 8/2013 | Parker |
| 8,577,735 B2 | 11/2013 | Wilen et al. |
| 8,636,203 B1 | 1/2014 | Patterson et al. |
| 8,662,387 B1 | 3/2014 | Geller et al. |
| 8,751,298 B1 | 6/2014 | Giordano et al. |
| 8,768,834 B2 | 7/2014 | Zacarias et al. |
| 9,098,190 B2 | 8/2015 | Zhou et al. |
| 9,483,786 B2 | 11/2016 | Glass et al. |
| 9,672,687 B2 | 6/2017 | Cage et al. |
| 2001/0001321 A1 | 5/2001 | Resnick et al. |
| 2001/0001856 A1 | 5/2001 | Gould et al. |
| 2001/0005840 A1 | 6/2001 | Verkama |
| 2001/0007983 A1 | 7/2001 | Lee |
| 2001/0011248 A1 | 8/2001 | Himmel et al. |
| 2001/0032878 A1 | 10/2001 | Tsiounis et al. |
| 2001/0034707 A1 | 10/2001 | Sakaguchi |
| 2001/0037264 A1 | 11/2001 | Husemann et al. |
| 2001/0042784 A1 | 11/2001 | Fite et al. |
| 2001/0044776 A1 | 11/2001 | Kight et al. |
| 2001/0056410 A1 | 12/2001 | Ishigaki |
| 2002/0002535 A1 | 1/2002 | Kitchen et al. |
| 2002/0010627 A1 | 1/2002 | Lerat |
| 2002/0010677 A1 | 1/2002 | Kitchen et al. |
| 2002/0013768 A1 | 1/2002 | Ganesan |
| 2002/0019809 A1 | 2/2002 | Kitchen et al. |
| 2002/0022472 A1 | 2/2002 | Watler et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0052841 A1 | 5/2002 | Guthrie et al. |
| 2002/0060243 A1 | 5/2002 | Janiak et al. |
| 2002/0062249 A1 | 5/2002 | Iannacci |
| 2002/0062282 A1 | 5/2002 | Kight et al. |
| 2002/0065713 A1 | 5/2002 | Awada et al. |
| 2002/0065773 A1 | 5/2002 | Kight et al. |
| 2002/0065774 A1 | 5/2002 | Young et al. |
| 2002/0077076 A1 | 6/2002 | Suryanarayana et al. |
| 2002/0077993 A1 | 6/2002 | Immonen et al. |
| 2002/0088855 A1 | 7/2002 | Hodes |
| 2002/0091573 A1 | 7/2002 | Hodes |
| 2002/0101966 A1 | 8/2002 | Nelson |
| 2002/0107791 A1 | 8/2002 | Nobrega et al. |
| 2002/0111906 A1 | 8/2002 | Garrison et al. |
| 2002/0115424 A1 | 8/2002 | Bagoren et al. |
| 2002/0116329 A1 | 8/2002 | Serbetcioglu et al. |
| 2002/0119767 A1 | 8/2002 | Fieldhouse et al. |
| 2002/0120571 A1 | 8/2002 | Maung et al. |
| 2002/0128968 A1 | 9/2002 | Kitchen et al. |
| 2002/0138450 A1 | 9/2002 | Kremer |
| 2002/0138573 A1 | 9/2002 | Saguy |
| 2002/0152123 A1 | 10/2002 | Giordano et al. |
| 2002/0152160 A1 | 10/2002 | Allen-Rouman et al. |
| 2002/0152179 A1 | 10/2002 | Racov |
| 2002/0153414 A1 | 10/2002 | Stoutenburg et al. |
| 2002/0161631 A1 | 10/2002 | Banerjee et al. |
| 2002/0169713 A1 | 11/2002 | Chang et al. |
| 2002/0178062 A1 | 11/2002 | Wright et al. |
| 2002/0190123 A1 | 12/2002 | Anvekar et al. |
| 2002/0198722 A1 | 12/2002 | Yuschik |
| 2003/0001005 A1 | 1/2003 | Risafi et al. |
| 2003/0004802 A1 | 1/2003 | Callegari |
| 2003/0004891 A1 | 1/2003 | Rensburg et al. |
| 2003/0004894 A1 | 1/2003 | Rowney et al. |
| 2003/0009382 A1 | 1/2003 | D'Arbeloff et al. |
| 2003/0023552 A1 | 1/2003 | Kight et al. |
| 2003/0028481 A1 | 2/2003 | Flitcroft et al. |
| 2003/0033246 A1 | 2/2003 | Slater |
| 2003/0055735 A1 | 3/2003 | Cameron et al. |
| 2003/0055782 A1 | 3/2003 | Slater |
| 2003/0070080 A1 | 4/2003 | Rosen |
| 2003/0074328 A1 | 4/2003 | Schiff et al. |
| 2003/0093366 A1 | 5/2003 | Halper et al. |
| 2003/0105672 A1 | 6/2003 | Epstein et al. |
| 2003/0105688 A1 | 6/2003 | Brown et al. |
| 2003/0115126 A1 | 6/2003 | Pitroda |
| 2003/0121967 A1 | 7/2003 | Goldberg et al. |
| 2003/0126079 A1 | 7/2003 | Roberson et al. |
| 2003/0141358 A1 | 7/2003 | Hudson et al. |
| 2003/0162565 A1 | 8/2003 | Al-Khaja |
| 2003/0163787 A1 | 8/2003 | Hay et al. |
| 2003/0172039 A1 | 9/2003 | Guy et al. |
| 2003/0191711 A1 | 10/2003 | Jamison et al. |
| 2003/0197059 A1 | 10/2003 | Tidball et al. |
| 2003/0200179 A1 | 10/2003 | Kwan |
| 2003/0200184 A1 | 10/2003 | Dominguez et al. |
| 2003/0212601 A1 | 11/2003 | Silva et al. |
| 2003/0218062 A1 | 11/2003 | Noriega et al. |
| 2003/0218066 A1 | 11/2003 | Fernandes et al. |
| 2003/0220884 A1 | 11/2003 | Choi et al. |
| 2003/0226042 A1 | 12/2003 | Fukushima |
| 2003/0229590 A1 | 12/2003 | Byrne et al. |
| 2003/0233317 A1 | 12/2003 | Judd |
| 2003/0233318 A1 | 12/2003 | King et al. |
| 2003/0234819 A1 | 12/2003 | Daly et al. |
| 2003/0236704 A1 | 12/2003 | Antonucci |
| 2004/0009760 A1 | 1/2004 | Laybourn et al. |
| 2004/0010462 A1 | 1/2004 | Moon et al. |
| 2004/0019564 A1 | 1/2004 | Goldthwaite et al. |
| 2004/0019568 A1 | 1/2004 | Moenickheim et al. |
| 2004/0029569 A1 | 2/2004 | Khan et al. |
| 2004/0046035 A1 | 3/2004 | Davila et al. |
| 2004/0049456 A1 | 3/2004 | Dreyer |
| 2004/0049458 A1 | 3/2004 | Kunugi et al. |
| 2004/0054587 A1 | 3/2004 | Dev et al. |
| 2004/0059671 A1 | 3/2004 | Nozaki et al. |
| 2004/0064409 A1 | 4/2004 | Kight et al. |
| 2004/0068446 A1 | 4/2004 | Do et al. |
| 2004/0068448 A1 | 4/2004 | Kim |
| 2004/0078327 A1 | 4/2004 | Frazier et al. |
| 2004/0078332 A1 | 4/2004 | Ferguson et al. |
| 2004/0083170 A1 | 4/2004 | Bam et al. |
| 2004/0083171 A1 | 4/2004 | Kight et al. |
| 2004/0093305 A1 | 5/2004 | Kight et al. |
| 2004/0094624 A1 | 5/2004 | Fernandes et al. |
| 2004/0107170 A1 | 6/2004 | Labrou et al. |
| 2004/0114766 A1 | 6/2004 | Hileman et al. |
| 2004/0117302 A1 | 6/2004 | Weichert et al. |
| 2004/0118914 A1 | 6/2004 | Smith et al. |
| 2004/0128197 A1 | 7/2004 | Bam et al. |
| 2004/0139005 A1 | 7/2004 | Ganesan |
| 2004/0159700 A1 | 8/2004 | Khan et al. |
| 2004/0162058 A1 | 8/2004 | Mottes |
| 2004/0167853 A1 | 8/2004 | Sharma |
| 2004/0181463 A1 | 9/2004 | Goldthwaite et al. |
| 2004/0185881 A1 | 9/2004 | Lee et al. |
| 2004/0199431 A1 | 10/2004 | Ganesan et al. |
| 2004/0199474 A1 | 10/2004 | Ritter |
| 2004/0205023 A1 | 10/2004 | Hafer et al. |
| 2004/0205138 A1 | 10/2004 | Friedman et al. |
| 2004/0210449 A1 | 10/2004 | Breck et al. |
| 2004/0215560 A1 | 10/2004 | Amalraj et al. |
| 2004/0215564 A1 | 10/2004 | Lawlor et al. |
| 2004/0215573 A1 | 10/2004 | Teutenberg et al. |
| 2004/0224660 A1 | 11/2004 | Anderson |
| 2004/0225560 A1 | 11/2004 | Lewis et al. |
| 2004/0230489 A1 | 11/2004 | Goldthwaite et al. |
| 2004/0232225 A1 | 11/2004 | Bishop et al. |
| 2004/0242208 A1 | 12/2004 | Teicher |
| 2004/0243490 A1 | 12/2004 | Murto et al. |
| 2004/0249710 A1 | 12/2004 | Smith et al. |
| 2004/0249766 A1 | 12/2004 | Ganesan et al. |
| 2004/0267663 A1 | 12/2004 | Karns et al. |
| 2004/0267664 A1 | 12/2004 | Nam et al. |
| 2004/0267665 A1 | 12/2004 | Nam et al. |
| 2005/0001027 A1 | 1/2005 | Bahar |
| 2005/0015388 A1 | 1/2005 | Dasgupta et al. |

(56) References Cited

U.S. PATENT DOCUMENTS

| | | |
|---|---|---|
| 2005/0021457 A1 | 1/2005 | Johnson et al. |
| 2005/0027624 A1 | 2/2005 | Cai |
| 2005/0027655 A1 | 2/2005 | Sharma et al. |
| 2005/0033645 A1 | 2/2005 | DuPhily |
| 2005/0051619 A1 | 3/2005 | Graves et al. |
| 2005/0060261 A1 | 3/2005 | Remington et al. |
| 2005/0061872 A1 | 3/2005 | Paschini et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0079863 A1 | 4/2005 | Macaluso |
| 2005/0080634 A1 | 4/2005 | Kanniainen et al. |
| 2005/0080727 A1 | 4/2005 | Postrel |
| 2005/0086164 A1 | 4/2005 | Kim et al. |
| 2005/0086168 A1 | 4/2005 | Alvarez et al. |
| 2005/0096981 A1 | 5/2005 | Shimada |
| 2005/0097038 A1 | 5/2005 | Yu et al. |
| 2005/0103839 A1 | 5/2005 | Hewel |
| 2005/0107068 A1 | 5/2005 | Smith et al. |
| 2005/0109835 A1 | 5/2005 | Jacoby et al. |
| 2005/0116028 A1 | 6/2005 | Cohen et al. |
| 2005/0125343 A1 | 6/2005 | Mendelovich |
| 2005/0125348 A1 | 6/2005 | Fulton et al. |
| 2005/0127169 A1 | 6/2005 | Foss |
| 2005/0137978 A1 | 6/2005 | Ganesan et al. |
| 2005/0143051 A1 | 6/2005 | Park |
| 2005/0154644 A1 | 7/2005 | Deakin et al. |
| 2005/0174975 A1 | 8/2005 | Mgrdechian et al. |
| 2005/0177437 A1 | 8/2005 | Ferrier |
| 2005/0177517 A1 | 8/2005 | Leung et al. |
| 2005/0182714 A1 | 8/2005 | Nel |
| 2005/0182720 A1 | 8/2005 | Willard et al. |
| 2005/0184145 A1 | 8/2005 | Law et al. |
| 2005/0187873 A1 | 8/2005 | Labrou et al. |
| 2005/0199709 A1 | 9/2005 | Linlor |
| 2005/0203835 A1 | 9/2005 | Nhaissi et al. |
| 2005/0203844 A1 | 9/2005 | Ferguson et al. |
| 2005/0209965 A1 | 9/2005 | Ganesan |
| 2005/0222925 A1 | 10/2005 | Jamieson |
| 2005/0222961 A1 | 10/2005 | Staib et al. |
| 2005/0228717 A1 | 10/2005 | Gusler et al. |
| 2005/0247777 A1 | 11/2005 | Pitroda |
| 2005/0259589 A1 | 11/2005 | Rozmovits et al. |
| 2005/0261968 A1 | 11/2005 | Randall et al. |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini et al. |
| 2006/0000900 A1 | 1/2006 | Fernandes et al. |
| 2006/0004631 A1 | 1/2006 | Roberts et al. |
| 2006/0004656 A1 | 1/2006 | Lee |
| 2006/0006226 A1 | 1/2006 | Fitzgerald et al. |
| 2006/0023856 A1 | 2/2006 | Welton |
| 2006/0026070 A1 | 2/2006 | Sun |
| 2006/0037835 A1 | 2/2006 | Doran et al. |
| 2006/0041470 A1 | 2/2006 | Filho et al. |
| 2006/0053056 A1 | 3/2006 | Alspach-Goss et al. |
| 2006/0058011 A1 | 3/2006 | Vanska et al. |
| 2006/0074767 A1 | 4/2006 | Fortney et al. |
| 2006/0080232 A1 | 4/2006 | Epps |
| 2006/0085310 A1 | 4/2006 | Mylet et al. |
| 2006/0089160 A1 | 4/2006 | Othmer |
| 2006/0089893 A1 | 4/2006 | Joseph et al. |
| 2006/0113376 A1 | 6/2006 | Reed et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0161490 A1 | 7/2006 | Chakiris et al. |
| 2006/0163343 A1 | 7/2006 | Changryeol |
| 2006/0167744 A1 | 7/2006 | Yoo |
| 2006/0206436 A1 | 9/2006 | James et al. |
| 2006/0207856 A1 | 9/2006 | Dean et al. |
| 2006/0235754 A1 | 10/2006 | Walker et al. |
| 2006/0253320 A1 | 11/2006 | Heywood |
| 2006/0255125 A1 | 11/2006 | Jennings et al. |
| 2007/0017976 A1 | 1/2007 | Peyret et al. |
| 2007/0021969 A1 | 1/2007 | Homeier-Beals |
| 2007/0030824 A1 | 2/2007 | Ribaudo et al. |
| 2007/0038577 A1 | 2/2007 | Werner et al. |
| 2007/0043682 A1 | 2/2007 | Drapkin et al. |
| 2007/0055785 A1 | 3/2007 | Stevens |
| 2007/0063024 A1 | 3/2007 | Guillot |
| 2007/0100761 A1 | 5/2007 | Dillon |
| 2007/0108269 A1 | 5/2007 | Benco et al. |
| 2007/0114274 A1 | 5/2007 | Gibbs et al. |
| 2007/0118478 A1 | 5/2007 | Graves et al. |
| 2007/0125838 A1 | 6/2007 | Law et al. |
| 2007/0130085 A1 | 6/2007 | Zhu |
| 2007/0156436 A1 | 7/2007 | Fisher et al. |
| 2007/0162337 A1 | 7/2007 | Hawkins et al. |
| 2007/0175984 A1 | 8/2007 | Khandaker et al. |
| 2007/0192182 A1 | 8/2007 | Monaco et al. |
| 2007/0198347 A1 | 8/2007 | Muldoon |
| 2007/0208618 A1 | 9/2007 | Paintin et al. |
| 2007/0233615 A1 | 10/2007 | Tumminaro |
| 2007/0257767 A1 | 11/2007 | Beeson |
| 2007/0262140 A1 | 11/2007 | Long |
| 2007/0265872 A1 | 11/2007 | Robinson et al. |
| 2007/0284434 A1 | 12/2007 | Fletcher |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0028395 A1 | 1/2008 | Motta et al. |
| 2008/0033817 A1 | 2/2008 | Billmaier et al. |
| 2008/0040265 A1 | 2/2008 | Rackley, III et al. |
| 2008/0041938 A1 | 2/2008 | Wise |
| 2008/0046366 A1 | 2/2008 | Bemmel et al. |
| 2008/0052164 A1 | 2/2008 | Abifaker |
| 2008/0052169 A1 | 2/2008 | O'Shea et al. |
| 2008/0059318 A1 | 3/2008 | Packes et al. |
| 2008/0070690 A1 | 3/2008 | Luchene et al. |
| 2008/0071620 A1 | 3/2008 | Lowe |
| 2008/0078831 A1 | 4/2008 | Johnson et al. |
| 2008/0091545 A1 | 4/2008 | Jennings et al. |
| 2008/0097844 A1 | 4/2008 | Hsu et al. |
| 2008/0097851 A1 | 4/2008 | Bemmel et al. |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0133351 A1 | 6/2008 | White et al. |
| 2008/0172306 A1 | 7/2008 | Schorr et al. |
| 2008/0172331 A1 | 7/2008 | Graves et al. |
| 2008/0179395 A1 | 7/2008 | Dixon et al. |
| 2008/0228597 A1 | 9/2008 | Sondles |
| 2008/0235095 A1 | 9/2008 | Oles et al. |
| 2008/0255942 A1 | 10/2008 | Craft |
| 2008/0273630 A1 | 11/2008 | Mege et al. |
| 2008/0290987 A1 | 11/2008 | Li |
| 2008/0319868 A1 | 12/2008 | Briscoe et al. |
| 2009/0001159 A1 | 1/2009 | James et al. |
| 2009/0006116 A1 | 1/2009 | Baker et al. |
| 2009/0030789 A1 | 1/2009 | Mashinsky |
| 2009/0037326 A1 | 2/2009 | Chitti et al. |
| 2009/0055296 A1 | 2/2009 | Nelsen |
| 2009/0076896 A1 | 3/2009 | DeWitt et al. |
| 2009/0106115 A1 | 4/2009 | James et al. |
| 2009/0111378 A1 | 4/2009 | Sheynman et al. |
| 2009/0112709 A1 | 4/2009 | Barhydt et al. |
| 2009/0144161 A1 | 6/2009 | Fisher |
| 2009/0157554 A1 | 6/2009 | Hobson et al. |
| 2009/0164329 A1 | 6/2009 | Bishop et al. |
| 2009/0171739 A1 | 7/2009 | De et al. |
| 2009/0171804 A1 | 7/2009 | Lee et al. |
| 2009/0173782 A1 | 7/2009 | Muscato |
| 2009/0173784 A1 | 7/2009 | Tang |
| 2009/0187491 A1 | 7/2009 | Bull et al. |
| 2009/0192904 A1 | 7/2009 | Patterson et al. |

(56) References Cited

U.S. PATENT DOCUMENTS

| | | |
|---|---|---|
| 2009/0192928 A1 | 7/2009 | Abifaker |
| 2009/0247131 A1 | 10/2009 | Champion et al. |
| 2009/0254453 A1 | 10/2009 | Sanguinetti et al. |
| 2009/0281915 A1 | 11/2009 | Deakin et al. |
| 2009/0281941 A1 | 11/2009 | Worth |
| 2009/0281951 A1 | 11/2009 | Shakkarwar |
| 2009/0287558 A1 | 11/2009 | Seth et al. |
| 2009/0298427 A1 | 12/2009 | Wilkinson et al. |
| 2009/0327121 A1 | 12/2009 | Carroll et al. |
| 2010/0005025 A1 | 1/2010 | Kumar et al. |
| 2010/0008535 A1 | 1/2010 | Abulafia et al. |
| 2010/0010906 A1 | 1/2010 | Grecia |
| 2010/0041368 A1 | 2/2010 | Kumar |
| 2010/0042471 A1 | 2/2010 | Chang et al. |
| 2010/0063906 A1 | 3/2010 | Nelsen et al. |
| 2010/0076833 A1 | 3/2010 | Nelsen |
| 2010/0082487 A1 | 4/2010 | Nelsen |
| 2010/0082490 A1 | 4/2010 | Rosenblatt et al. |
| 2010/0088188 A1 | 4/2010 | Kumar et al. |
| 2010/0097180 A1 | 4/2010 | Cardullo |
| 2010/0130172 A1 | 5/2010 | Vendrow et al. |
| 2010/0131415 A1 | 5/2010 | Sartipi |
| 2010/0174993 A1 | 7/2010 | Pennington et al. |
| 2010/0175287 A1 | 7/2010 | Gupta et al. |
| 2010/0185505 A1 | 7/2010 | Sprogoe et al. |
| 2010/0205063 A1 | 8/2010 | Mersky |
| 2010/0223314 A1* | 9/2010 | Gadel ............... G11B 27/034 709/200 |
| 2010/0280921 A1 | 11/2010 | Stone et al. |
| 2010/0293536 A1 | 11/2010 | Nikitin et al. |
| 2010/0299194 A1 | 11/2010 | Snyder et al. |
| 2010/0299266 A1 | 11/2010 | Catania et al. |
| 2010/0304852 A1 | 12/2010 | Szrek et al. |
| 2011/0087592 A1 | 4/2011 | Veen et al. |
| 2011/0091092 A1 | 4/2011 | Nepomniachtchi et al. |
| 2011/0106698 A1 | 5/2011 | Isaacson et al. |
| 2011/0125607 A1 | 5/2011 | Wilen |
| 2011/0145044 A1 | 6/2011 | Nelsen et al. |
| 2011/0161226 A1 | 6/2011 | Courtion et al. |
| 2011/0166992 A1* | 7/2011 | Dessert ............ G06Q 20/0655 705/39 |
| 2011/0173083 A1 | 7/2011 | Reed et al. |
| 2011/0202419 A1 | 8/2011 | Mamdani et al. |
| 2011/0234514 A1 | 9/2011 | Gothard |
| 2011/0246284 A1 | 10/2011 | Chaikin et al. |
| 2011/0251962 A1 | 10/2011 | Hruska |
| 2012/0004769 A1 | 1/2012 | Hallenbeck et al. |
| 2012/0099780 A1 | 4/2012 | Smith et al. |
| 2012/0136780 A1 | 5/2012 | El-Awady et al. |
| 2012/0203572 A1 | 8/2012 | Christensen |
| 2012/0209688 A1 | 8/2012 | Lamothe et al. |
| 2012/0234911 A1 | 9/2012 | Yankovich et al. |
| 2012/0271689 A1 | 10/2012 | Etheredge et al. |
| 2012/0284185 A1 | 11/2012 | Mettler et al. |
| 2012/0330830 A1* | 12/2012 | Mason ............... G06Q 30/04 705/41 |
| 2013/0073388 A1 | 3/2013 | Heath |
| 2013/0290121 A1 | 10/2013 | Simakov et al. |
| 2013/0304561 A1 | 11/2013 | Warner et al. |
| 2014/0006268 A1 | 1/2014 | Roberts et al. |
| 2014/0019238 A1 | 1/2014 | Blatchley et al. |
| 2015/0278845 A1 | 10/2015 | Sorem et al. |
| 2017/0076293 A1 | 3/2017 | Cage et al. |
| 2018/0192108 A1* | 7/2018 | Lyons ............... G11B 27/031 |

FOREIGN PATENT DOCUMENTS

| | | |
|---|---|---|
| EP | 2128809 A1 | 12/2009 |
| JP | 2002189963 A | 7/2002 |
| JP | 2002318951 A | 10/2002 |
| JP | 2003208541 A | 7/2003 |
| KR | 20010106187 A | 11/2001 |
| KR | 20040028487 A | 4/2004 |
| KR | 20040052531 A | 6/2004 |
| KR | 20040069294 A | 8/2004 |
| KR | 20050118609 A | 12/2005 |
| KR | 20090123444 A | 12/2009 |
| WO | 2005111882 A1 | 11/2005 |
| WO | 2008005018 A9 | 1/2010 |
| WO | 2013078499 A1 | 6/2013 |

OTHER PUBLICATIONS

ISA European Patent Office, Search Report of EP09812328.4, dated Jul. 4, 2012, Germany, 6 pages.
ISA Korea, International Search Report of PCT/US2009/056118, dated Apr. 19, 2010, 3 pages.
ISA Korea, International Search Report of PCT/US2009/058111, dated May 26, 2010, 3 pages.
ISA Korean Intellectual Property Office, International Search Report of PCT/US2010/060875, dated Jul. 29, 2011, 10 pages.
Nelsen, David A., "Systems and Methods to Manage and Control Use of a Virtual Card," U.S. Appl. No. 13/158,349, filed Jun. 10, 2011, 62 pages.

* cited by examiner

FIG. 4

Select Occasion

- Occasion 1
- Occasion 2
- Occasion 3
- Occasion 4
- Occasion 5

FIG. 5

Enter Information Identifying Gift Recipient

- Name
- Age
- Birth Date
- Gender
- Photo
- Interests/Preferences
  - Shopping
  - Dining
  - Travel/Leisure

FIG. 6

Enter Information Identifying Organizer/Purchaser

- Name
- Phone Number
- E-mail Address
- Photo

FIG. 7

Select Design

- Design 1
- Design 2
- Design 3
- Design 4
- Design 5

FIG. 8

Select Gift Card

- Group or Individual
- Select Merchant
  - Merchant 1
  - Merchant 2
  - Merchant 3
- Amount
- Electronic or Physical

FIG. 9

Enter Occasion/Event Details

- Event Title
- Event Date
- Gift Cut Off Date

FIG. 10

Select Gift Card Holder

- Customizable Holder
- Occasion-Specific Holder
- Video Holder

FIG. 11

Select Celebration Video

- Yes/No
- Send Notice Via
  - Email
  - Text/SMS/MMS
  - Social Media
- Browse and Select Video Templates
  - Video 1
  - Video 2
  - Video 3

FIG. 16

| HOME | START THE OCCASION | | OCCASIONS | |
|---|---|---|---|---|
| GENERAL<br>ALL DESIGNS<br>FEATURED DESIGNS<br>NEW DESIGNS | BIRTHDAY | HOLIDAY | | THANK YOU |
| SEASONAL<br>CHRISTMAS<br>HANUKKAH<br>VALENTINE'S DAY<br>EASTER<br>MOTHER'S DAY<br>FATHER'S DAY | CONGRATULATIONS | WEDDING | | BABY |
| OCCASIONS<br>ANNIVERSARY<br>BABY<br>BACK-TO-SCHOOL<br>BIRTHDAY<br>BRIDAL<br>CONGRATULATIONS<br>GRADUATION<br>HOUSE WARMING<br>THANK YOU<br>WEDDING | | | | |

FIG. 18

| HOME | START THE OCCASION | OCCASIONS |
|---|---|---|

| 1 CHOOSE DESIGN | 2 ENTER DETAILS | 3 ADD GIFT & CUSTOMIZE | 4 INVITE GUESTS |
|---|---|---|---|

TELL US ABOUT THE PARTY!

| | |
|---:|---|
| EVENT TITLE | [EVENT TITLE] |
| WHO ARE WE CELEBRATING? | [GUEST NAME] ?????????GUEST OR RECIPIENT??? |
| EVENT TYPE | BIRTHDAY ▼ |
| EVENT DATE | [MM/DD/YEAR] |
| GIFT CUT-OFF DATE | [MM/DD/YEAR] |

UPLOAD GUEST PHOTO

WHO'S THE PARTY PLANNER?

| | |
|---:|---|
| HOST NAME | [YOUR NAME] |
| HOST PHONE | [###-###-####] |
| HOST E-MAIL | [_____@_____.__] |

UPLOAD HOST PHOTO

WHO'S THE LUCKY PERSON? [GIFT RECIPIENT NAME]

| | |
|---:|---|
| WHAT DOES THE LUCKY RECIPIENT LIKE? | SHOPPING ▼   DINING ▼   TRAVEL/LEISURE ▼ |
| ADDITIONAL INFORMATION FOR GUESTS | |

| GO BACK | SAVE EVENT | | NEXT |
|---|---|---|---|

FIG. 19

| HOME | START THE OCCASION | OCCASIONS |
|---|---|---|

| 1 CHOOSE DESIGN | 2 ENTER DETAILS | 3 ADD GIFT & CUSTOMIZE | 4 INVITE GUESTS |
|---|---|---|---|

SELECT GIFT CARD

ADD GIFT CARD?  ●YES  ○NO

| GROUP OR INDIVIDUAL GIFT CARD? | GROUP ▼ |
|---|---|
| SELECT GIFT CARD BY MERCHANT | MERCHANT 1 ▼ |

| [GIFT CARD IMAGE] | AMOUNT | [$###.##] | ● ELECTRONIC GIFT CARD |
|---|---|---|---|
| | CUT-OFF DATE | [MM/DD/YEAR] | ○ PHYSICAL GIFT CARD |

SELECT GIFT CARD HOLDER

| CUSTOMIZABLE GIFT CARD HOLDER | OCCASION-SPECIFIC GIFT CARD HOLDER | VIDEO GIFT CARD HOLDER | CELEBRATION VIDEO |
|---|---|---|---|

TEASER VIDEO

ADD TEASER VIDEO?  ●YES  ○NO

| SEND VIA | E-MAIL ▼ |
|---|---|
| | [___@___.___] |

BROWSE VIDEOS  CHOOSE FILE  [VIDEO IMAGE]

GO BACK   SAVE EVENT                    NEXT

FIG. 20

| HOME | START THE OCCASION | OCCASIONS |
|---|---|---|
| 1 CHOOSE DESIGN | 2 ENTER DETAILS | 3 ADD GIFT & CUSTOMIZE | 4 INVITE GUESTS |

| CHECK OUT METHOD | CHECKOUT PROGRESS | |
|---|---|---|
| SHIPPING INFORMATION | BILLING ADDRESS | CHANGE |
| SHIPPING METHOD | SHIPPING ADDRESS | CHANGE |
| PAYMENT INFORMATION | SHIPPING METHOD | CHANGE |
| ORDER REVIEW | PAYMENT METHOD | CHANGE |

ORDER REVIEW

| ITEM DESCRIPTION | QTY | CARD VALUE | SUBTOTAL |
|---|---|---|---|
| GIFT CARD (MERCHANT 1) | 1 | $25.00 | $25.00 |
| VIDEO TEASER (VIDEO 1) | 1 | N/A | $00.99 |
| | | SUBTOTAL | $25.99 |
| | | TAX | $01.48 |
| | | TOTAL | $27.47 |

FORGOT AN ITEM?
EDIT ORDER

PLACE ORDER

DISCOUNT OR COUPON CODE

APPLY

GO BACK  SAVE EVENT  NEXT

FIG. 24

| HOME | START THE OCCASION | OCCASIONS |
|---|---|---|

| 1 EVENT SETUP | 2 ADD GIFT & CUSTOMIZE | 3 CHECKOUT | 4 INVITE GUESTS |
|---|---|---|---|

INVITE GUESTS

| ADD EMAIL ADDRESSES | ADD FROM SOCIAL MEDIA 1 | ADD FROM SOCIAL MEDIA 2 | ADD FROM SOCIAL MEDIA 3 |
|---|---|---|---|

"Add email addresses separated by commas or returns."

+ADD TO GUEST LIST

GUEST LIST

| NAME | EMAIL ADDRESS | EDIT/REMOVE |
|---|---|---|
| | | EDIT |

GO BACK   SAVE EVENT   NEXT

FIG. 25

| HOME | START THE OCCASION | OCCASIONS |
|---|---|---|

| 1 EVENT SETUP | 2 ADD GIFT & CUSTOMIZE | 3 CHECKOUT | 4 INVITE GUESTS |
|---|---|---|---|

SCRAPBOOK

| ACTIVATE SCRAPBOOK | ◉ YES | ○ NO |
|---|---|---|

"Activate an online scrapbook that will allow you and guests to create pages by adding photos and messages to a digital scrapbook commemorating the event and adding to the celebration."

SELECT NOTIFICATIONS

○ NOTIFY USER WHEN A GUEST ADDS A GIFT CARD

○ NOTIFY USER WHEN A GUEST POSTS TO THE MESSAGE BOARD

○ NOTIFY USER WHEN A GUEST ADDS CONTENT TO THE GROUP VIDEO

○ NOTIFY USER WHEN A GUEST ADDS CONTENT TO THE SCRAPBOOK

SAVE

| GO BACK | SAVE EVENT | | NEXT |
|---|---|---|---|

[RECIPIENT GREETING, E.G. HAPPY BIRTHDAY]

10 OF YOUR CLOSEST FRIENDS ARE
CELEBRATING YOUR BIG DAY!

[EVENT CLOSURE NOTICE AND DATE, MAILING DATE]

PARTY PLANNER!

OPEN YOUR PRESENTS!

FIG. 30A
[RECIPIENT GREETING, E.G. HAPPY BIRTHDAY]
CLICK TO VIEW CELEBRATION VIDEO
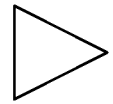
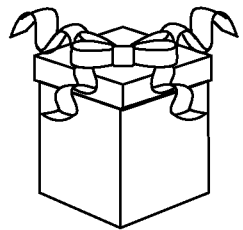
CLICK TO OPEN
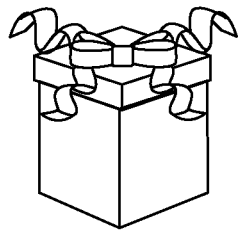
CLICK TO OPEN
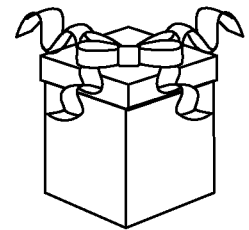
THIS GIFT WILL ARRIVE IN THE MAIL SOON!

FIG. 30B
[RECIPIENT GREETING, E.G. HAPPY BIRTHDAY]
CLICK TO VIEW CELEBRATION VIDEO
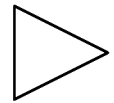
| MERCHANT 1<br>$25 E-CARD | MERCHANT 2<br>$25 E-CARD |
|---|---|
| PRINT | PRINT |
| SEND TO<br>MOBILE DEVICE | SEND TO<br>MOBILE DEVICE |
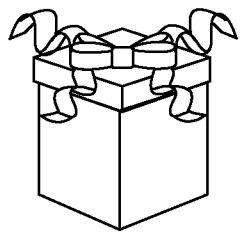
THIS GIFT WILL
ARRIVE IN THE
MAIL SOON!
NEXT

[RECIPIENT GREETING, E.G. THE PARTY ISN'T OVER!]

[STATEMENT INTRODUCING MERCHANT OFFERS]

| MERCHANT 1 IDENTIFIER (TEXT AND/OR GRAPHIC) | MERCHANT 2 IDENTIFIER (TEXT AND/OR GRAPHIC) |

CHECK YOUR MAILBOX!

SPECIAL OFFER WILL BECOME AVAILABLE WHEN YOU RECEIVE THIS GIFT CARD IN THE MAIL ON [DATE SPECIFIED]

CLICK ON BRANDS TO EXPLORE OFFERS

FIG. 31

WANT TO SEND A THANK YOU NOTE?

SELECT A THANK YOU E-CARD TO SEND:

| E-CARD DESIGN REPRESENTATION 1 | E-CARD DESIGN REPRESENTATION 2 | E-CARD DESIGN REPRESENTATION 3 |

OR

| SEND A PERSONALIZED VIDEO MESSAGE | SELECT A VIDEO MESSAGE |

BACK | NEXT

GROUP VIDEO GENERATING SYSTEM

RELATED APPLICATION

This application is a continuation of U.S. patent application Ser. No. 14/829,237, filed Aug. 18, 2015; which claims priority to Provisional Patent Application No. 62/039,260, filed Aug. 19, 2014; and is also a continuation-in-part of U.S. patent application Ser. No. 13/964,895, filed Sep. 12, 2013. Also, U.S. patent application Ser. No. 13/964,895 claims benefit of provisional patent application No. 61/737,731, filed Dec. 14, 2012; and is a continuation-in-part U.S. patent application Ser. No. 13/753,453, filed Jan. 29, 2013. U.S. patent application Ser. No. 13/753,453 claims priority to Provisional Patent Application Nos. 61/592,320, filed Jan. 30, 2012; 61/698,410, filed Sep. 7, 2012, and 61/737,729, filed Dec. 14, 2012. The disclosures and contents of the above-referenced applications are incorporated herein by reference in their entirety.

FIELD OF THE INVENTION

This invention relates generally to computing systems, and more particularly, to a personalized gifting system that includes a webpage personalized for a recipient and a technique for supplying user-supplied content to be transmitted to the recipient along with a gift card.

BACKGROUND

Transaction cards, stored value cards, or gift cards, as they are commonly called based upon their intended use, have become popular gifts. Gift cards typically comprise a stored value card whereby a certain cash equivalent value is encoded upon a magnetic strip applied to the surface of the card. This stored value may be determined by the vendor prior to packaging and display for sale or may be selected at the point of sale by the purchaser and loaded by the cashier using a magnetic card reader/writer. As an alternative to a magnetic strip, a transaction card may use a bar code to link the card to an account by which the associated value is stored in a computer database. Gift cards are typically provided with a generic and impersonal design, typically identifying the associated merchant for which the card may be used to purchase merchandise, and therefore are not personalized in view of the intended recipient. Gift card holders may be used to augment the gift of a transaction card by providing a surface for displaying decorations, images, or messages.

Gift cards are often presented for sale on display racks in stores, each card or packet of cards being hung upon a display stand peg. It is also known to provide a selection of gift cards for purchase online through a commercial webpage. Such webpages may allow an online purchaser to select among gift cards offered by a plurality of vendors, make selections as to monetary value, and direct transmittal of the selected gift card or cards to the address of an intended recipient.

SUMMARY

According to one aspect, a group video generating system includes an application that is executed on each of multiple computing devices to generate a graphical user interface (GUI) that receives from each of a plurality of participants, a video segment including content directed toward a recipient. The application combines the video segment from each participant to form a group video, and transmits the group video to the recipient.

According to another aspect, multiple instances of a mobile application is stored on each of multiple portable computing devices operated by a corresponding number of participants. Each instance is executed by the portable computing device to generate a graphical user interface (GUI) that receives from each of a plurality of participants, a video segment including content directed toward a recipient. The application combines the video segment from each participant to form a group video, and transmits the group video to the recipient.

BRIEF DESCRIPTION OF THE DRAWING FIGURES

FIG. 4 is an example occasion selection screen displayed by the personalized webpage hosting system according to an aspect of the present disclosure.

FIG. 5 is an example gift recipient screen displayed by the personalized webpage hosting system according to the teachings of the present disclosure.

FIG. 6 is an example host information entry screen displayed by the personalized webpage hosting system according to the teachings of the present disclosure.

FIG. 7 an example design selections screen displayed by the personalized webpage hosting system according to the teachings of the present disclosure.

FIG. 8 is an example gift card selection criteria screen displayed by the personalized webpage hosting system according to the teachings of the present disclosure.

FIG. 9 is an example occasion detail criteria screen displayed by the personalized webpage hosting system according to the teachings of the present disclosure.

FIG. 10 is an example gift card holder selection types screen displayed by the personalized webpage hosting system according to the teachings of the present disclosure.

FIG. 11 is an example group video selection criteria screen displayed by the personalized webpage hosting system according to the teachings of the present disclosure.

Figure 12:
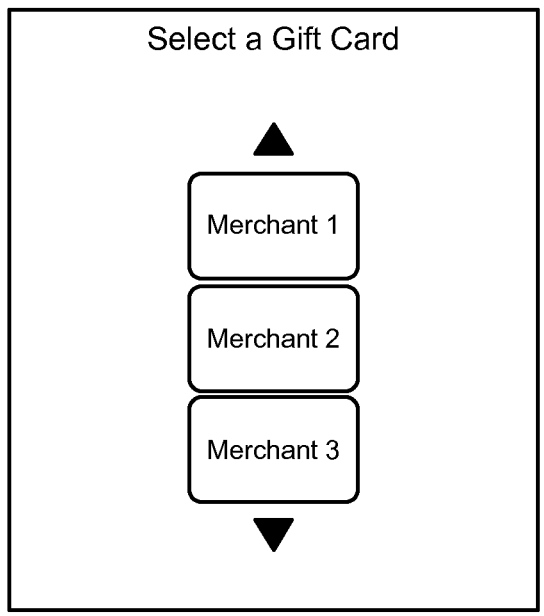

FIG. 12 is an example gift selection screen for displaying the personalized webpage to the recipient by the personalized webpage hosting system according to the teachings of the present disclosure.

Figure 13:
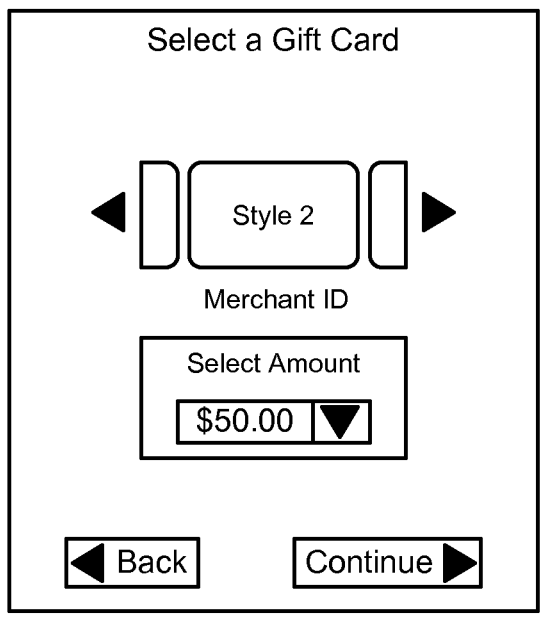

FIG. 13 is an example gift card customization screen for displaying the personalized webpage to the recipient by the personalized webpage hosting system according to the teachings of the present disclosure.

Figure 14:
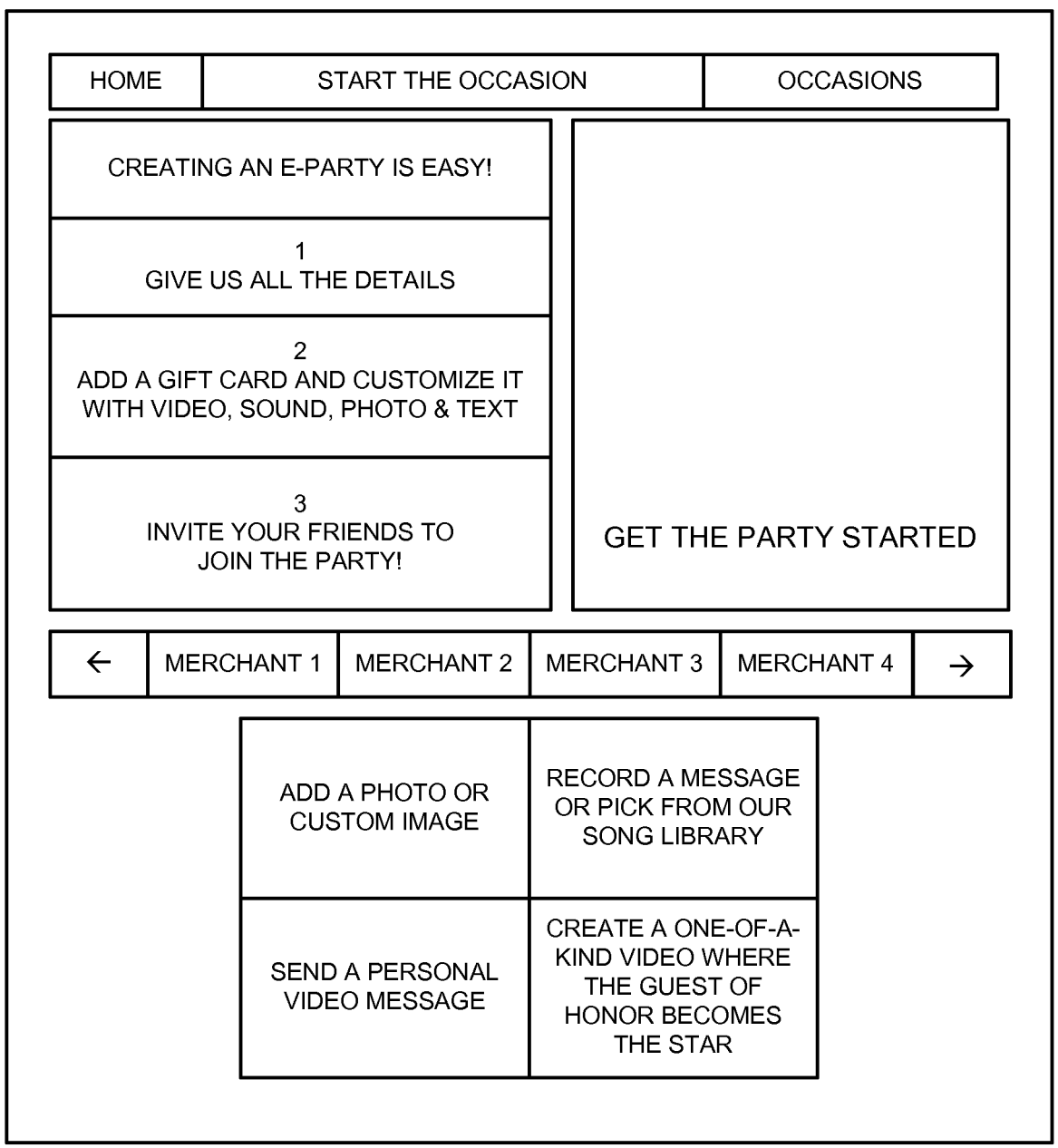

FIG. 14 illustrates an example splash screen that is generated by the personalized webpage hosting system according to the teachings of the present disclosure.

Figure 15:
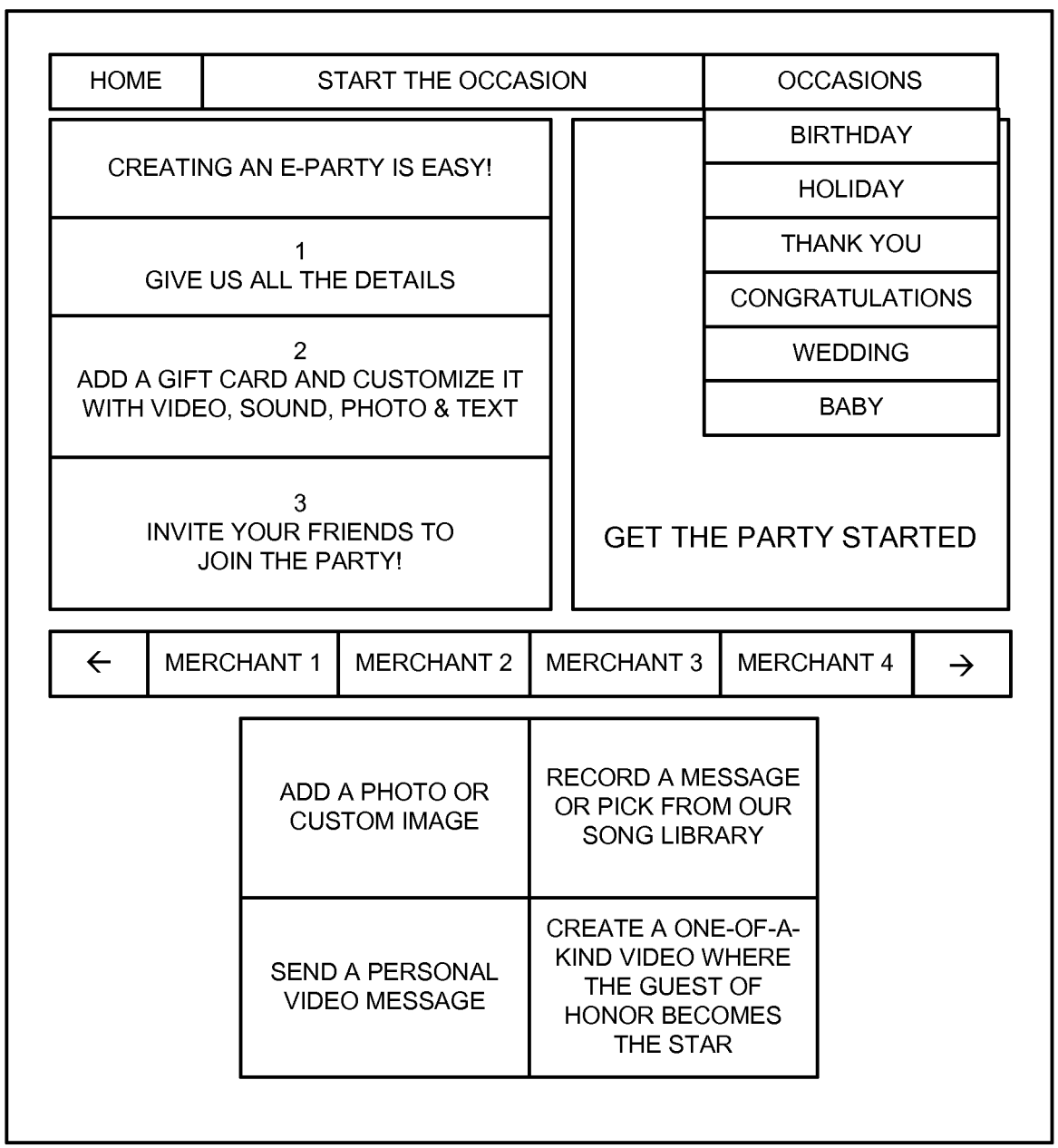

FIG. 15 illustrates an example drop-down list of the splash screen that is generated by the personalized webpage hosting system according to the teachings of the present disclosure.

FIG. 16 illustrates an example detailed occasion screen that is generated by the personalized webpage hosting system according to the teachings of the present disclosure.

Figure 17:
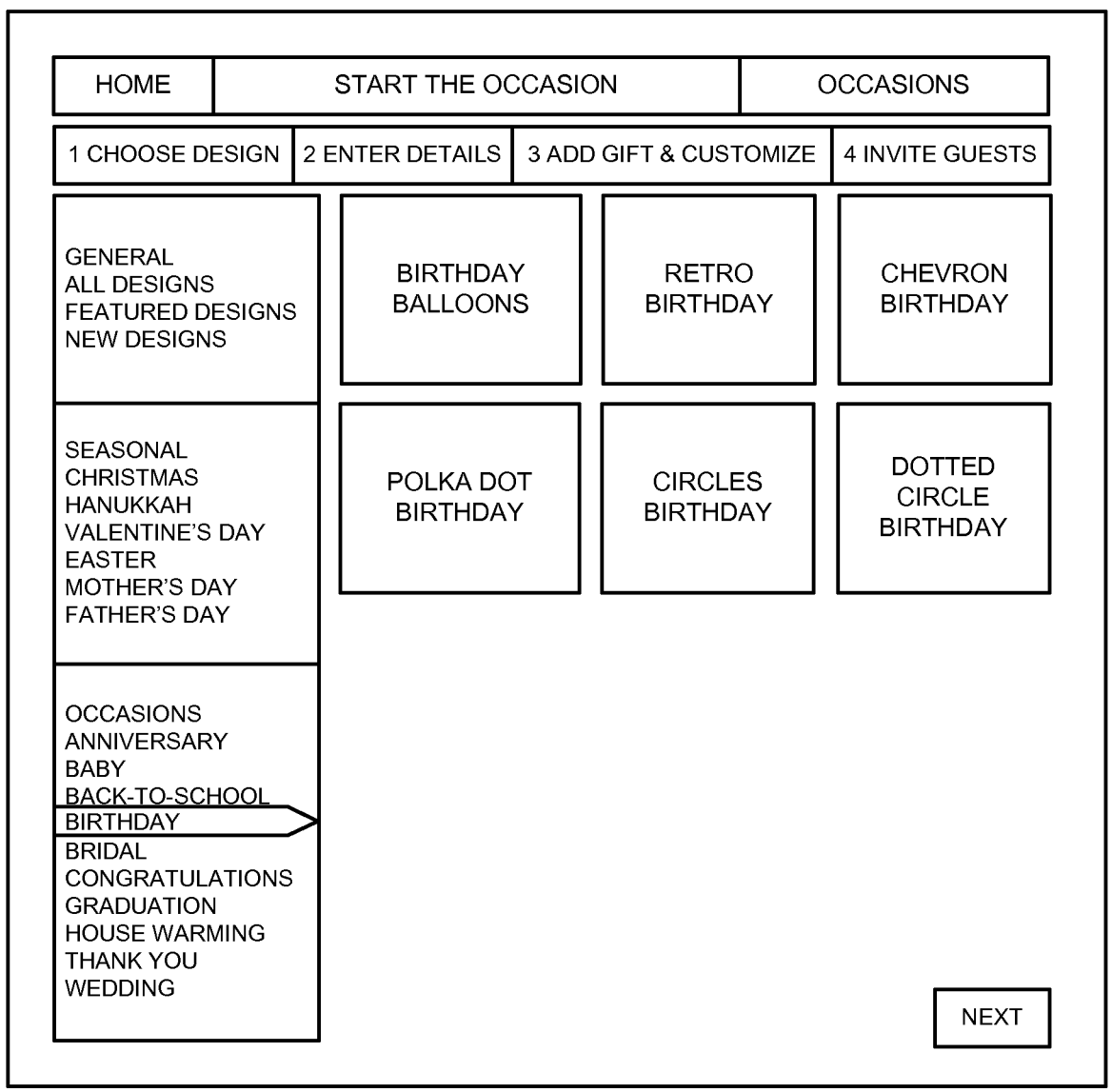

FIG. 17 illustrates another example detailed occasion screen that is generated by the personalized webpage hosting system according to the teachings of the present disclosure.

FIG. 18 illustrates an example details entry screen that is generated by the personalized webpage hosting system according to the teachings of the present disclosure.

FIG. 19 illustrates an example gift card selection screen that is generated by the personalized webpage hosting system according to the teachings of the present disclosure.

FIG. 20 illustrates an example gift card customization screen that is generated by the personalized webpage hosting system according to the teachings of the present disclosure.

Figure 21:
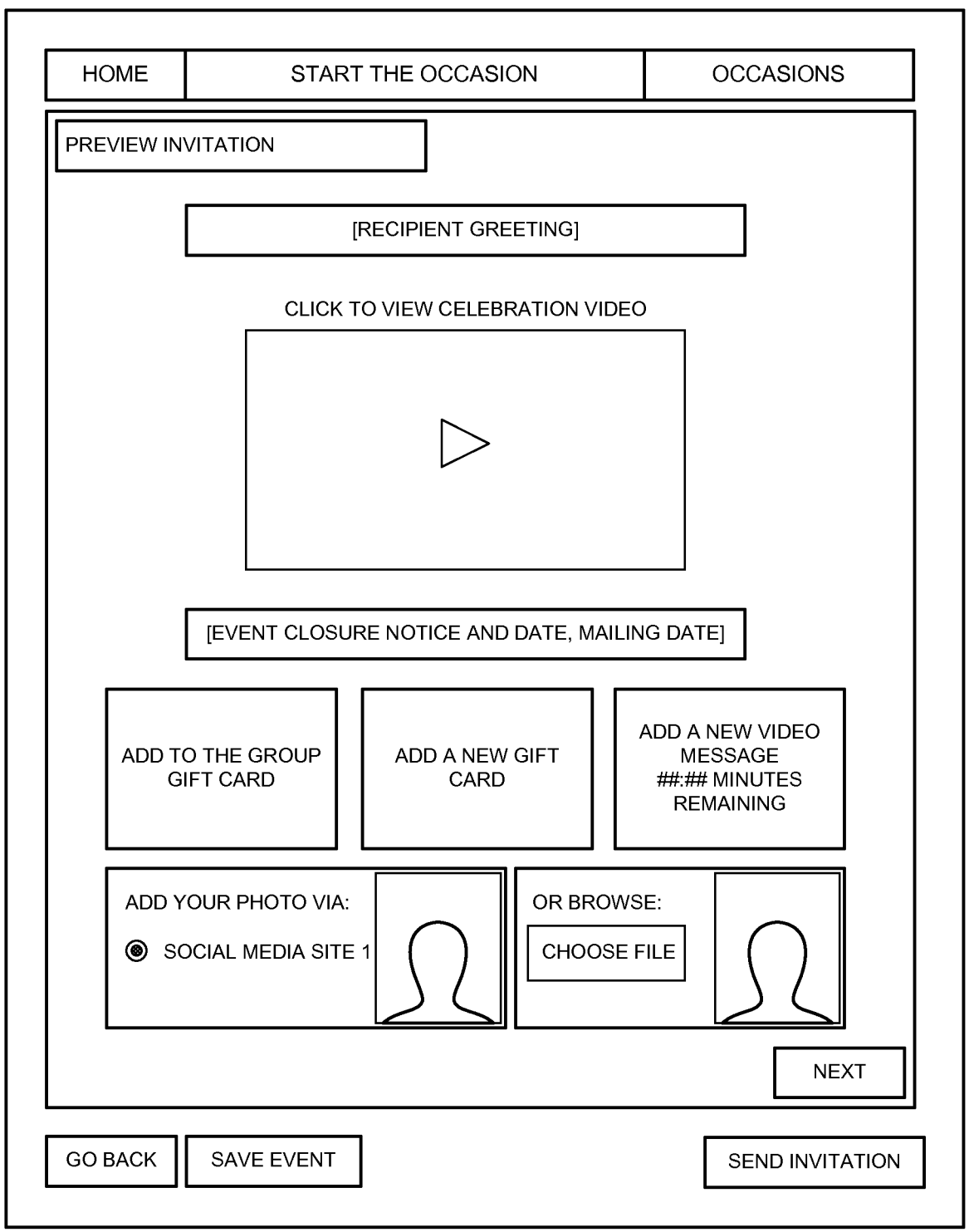

FIG. 21 illustrates an example group video entry screen that is generated by the personalized webpage hosting system according to the teachings of the present disclosure.

Figure 22:
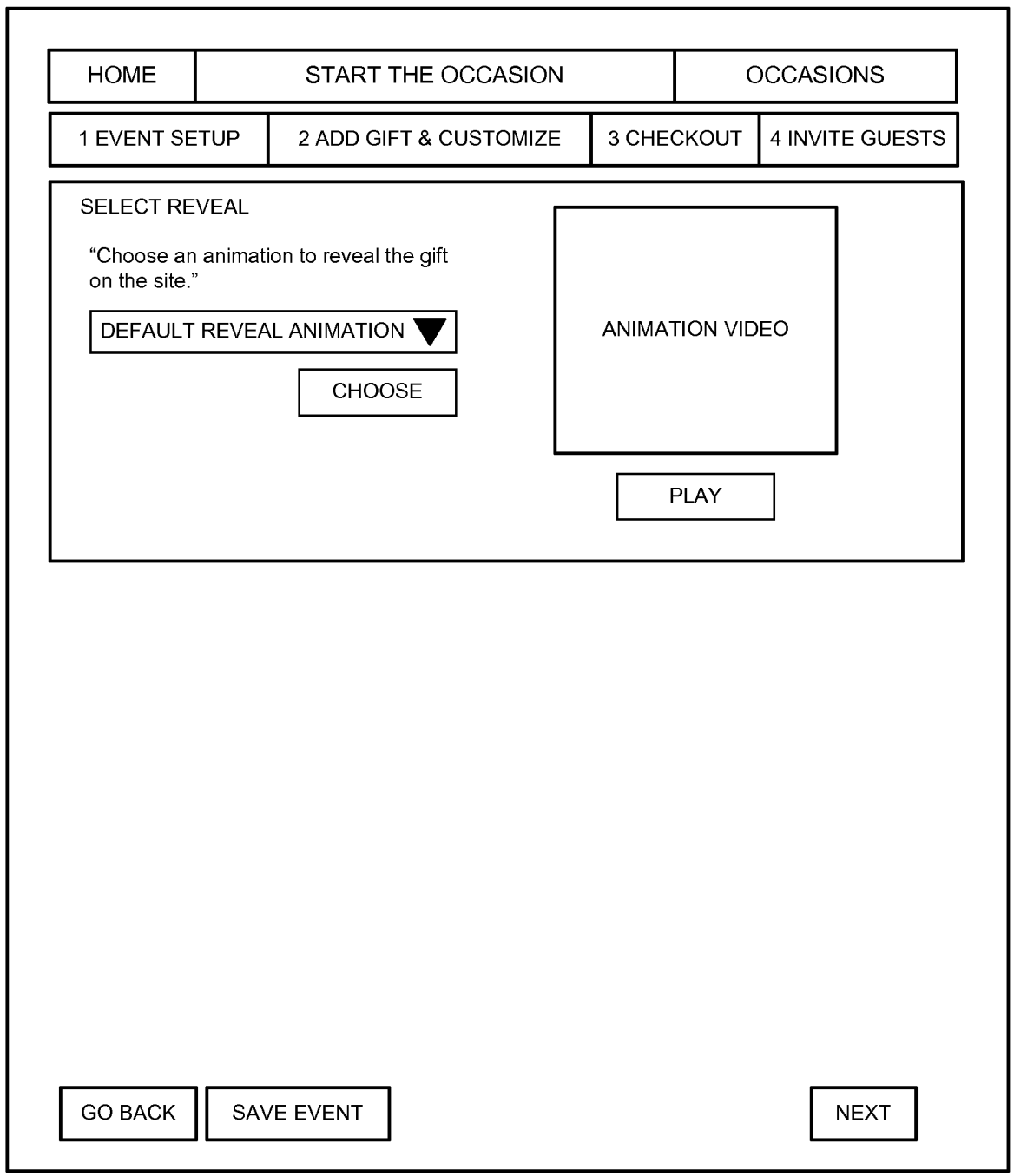

FIG. 22 illustrates an example reveal video creation screen that is generated by the personalized webpage hosting system according to the teachings of the present disclosure.

Figure 23:
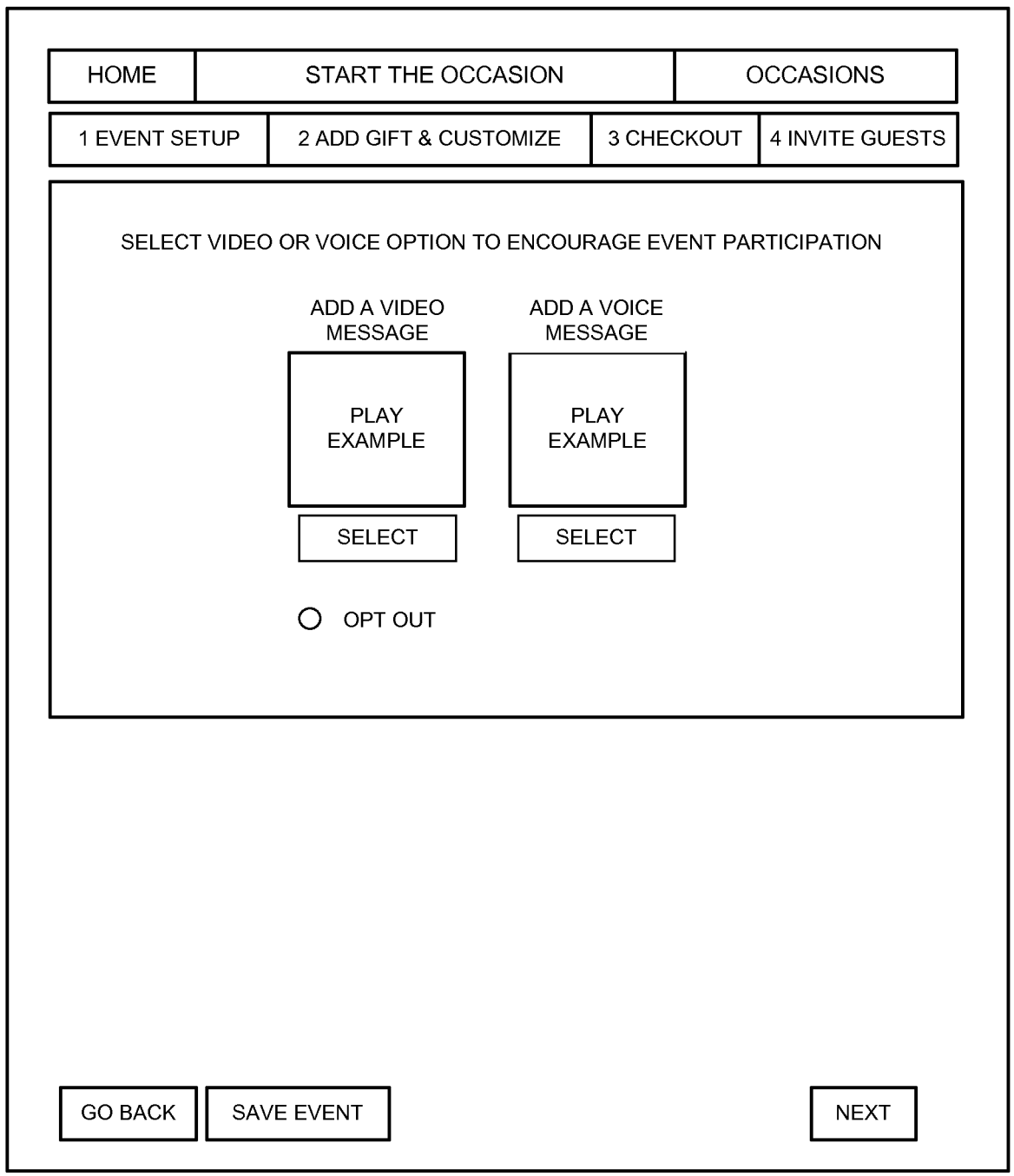

FIG. 23 illustrates an example reveal customization screen that is generated by the personalized webpage hosting system according to the teachings of the present disclosure.

FIG. 24 illustrates an example invitation screen that is generated by the personalized webpage hosting system according to the teachings of the present disclosure.

FIG. 25 illustrates an example guest invitation screen that is generated by the personalized webpage hosting system according to the teachings of the present disclosure.

Figure 26:
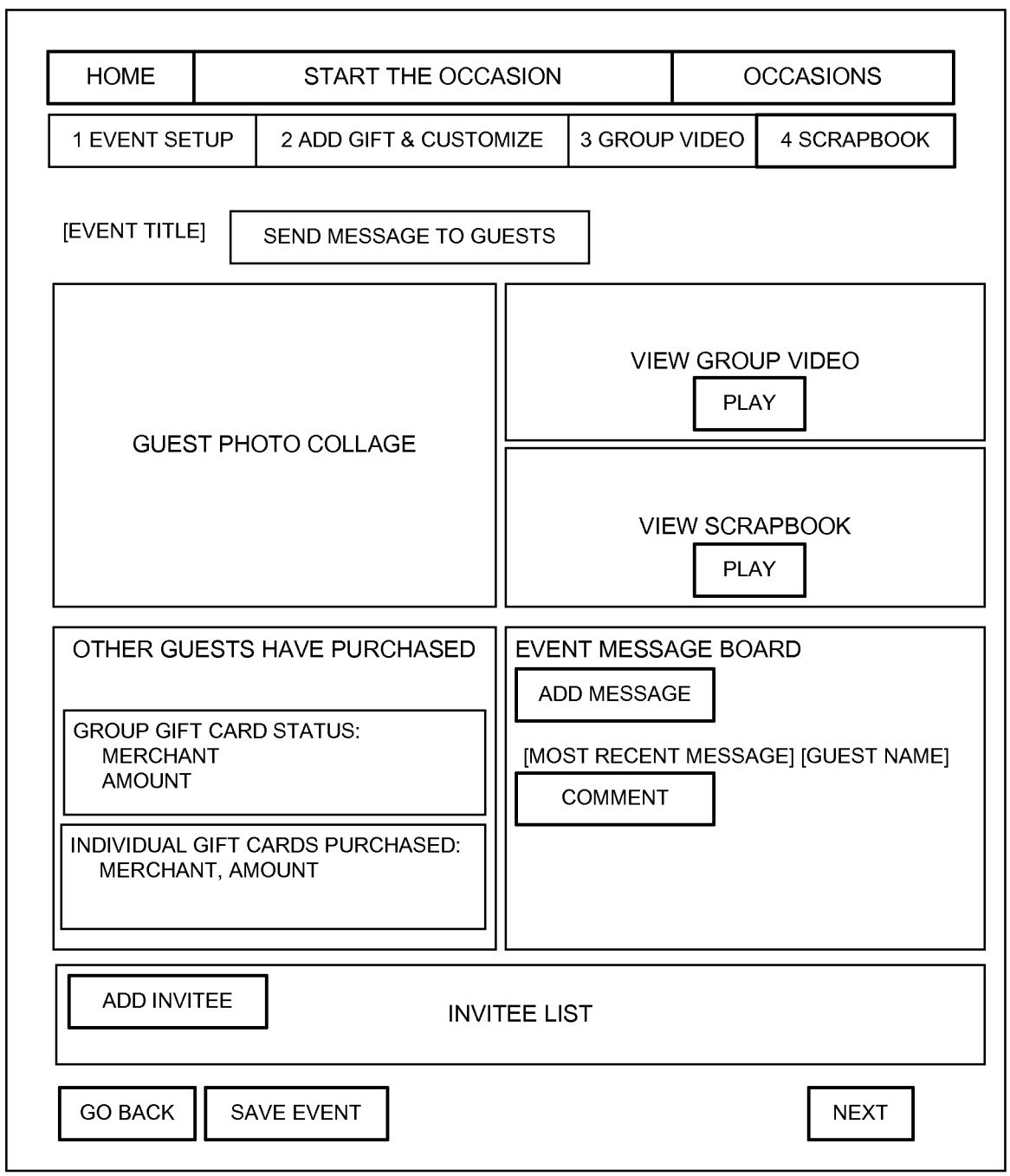

FIG. 26 illustrates an example home page screen that is generated by the personalized webpage hosting system according to the teachings of the present disclosure.

Figure 27:
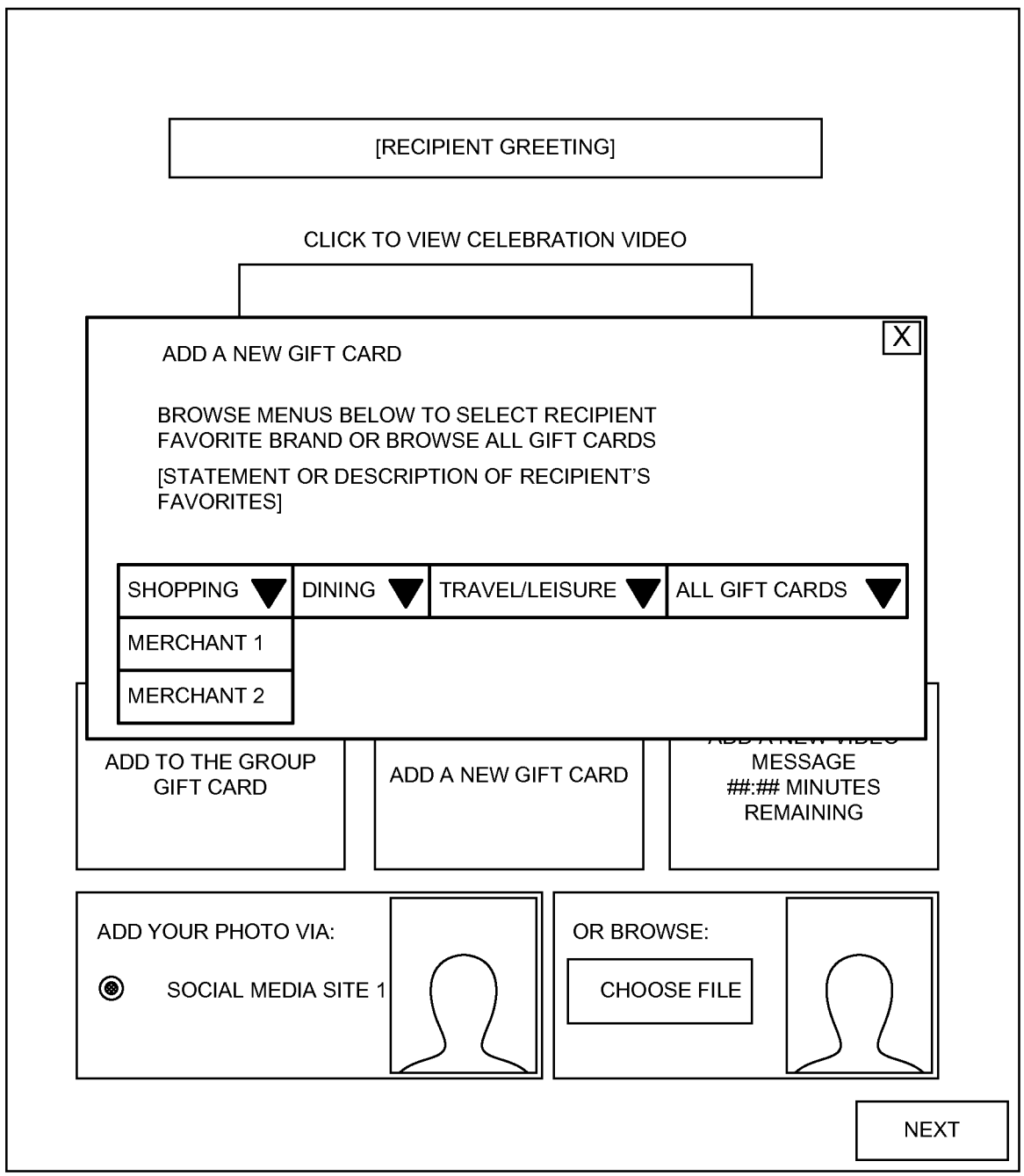

FIG. 27 illustrates an example gift card selection screen that is generated by the personalized webpage hosting system according to the teachings of the present disclosure.

Figure 28:
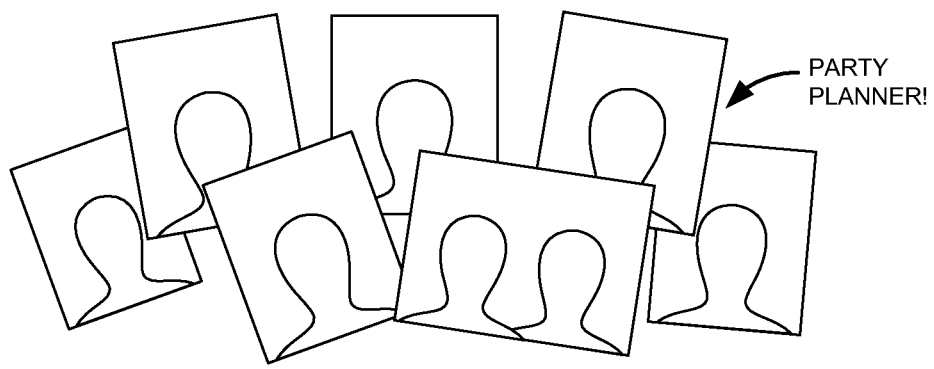

FIG. 28 illustrates an example initial splash screen that is generated by the personalized webpage hosting system according to the teachings of the present disclosure.

Figure 29:
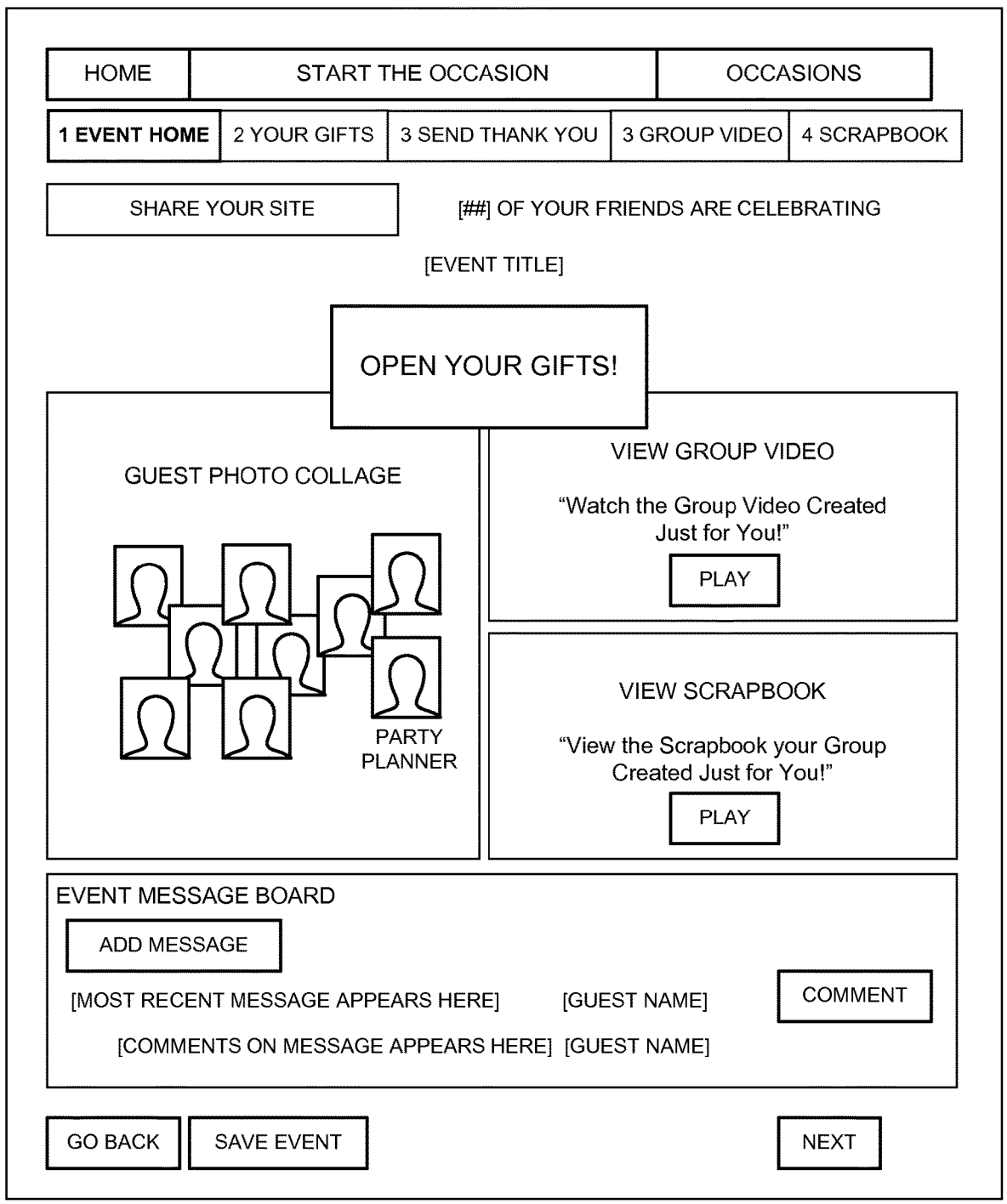

FIG. 29 illustrates an example recipient home page screen that is generated by the personalized webpage hosting system according to the teachings of the present disclosure.

FIG. 30A illustrates an example recipient gifting screen that is generated by the personalized webpage hosting system according to the teachings of the present disclosure.

FIG. 30B illustrates example monikers that are displayed on the recipient gifting screen according to the teachings of the present disclosure.

Figure 30C:
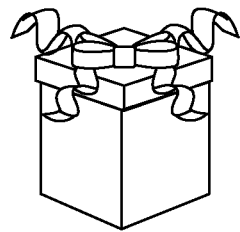

FIG. 30C illustrates an example merchant offer screen that is generated by the personalized webpage hosting system according to the teachings of the present disclosure.

Figure 30D:
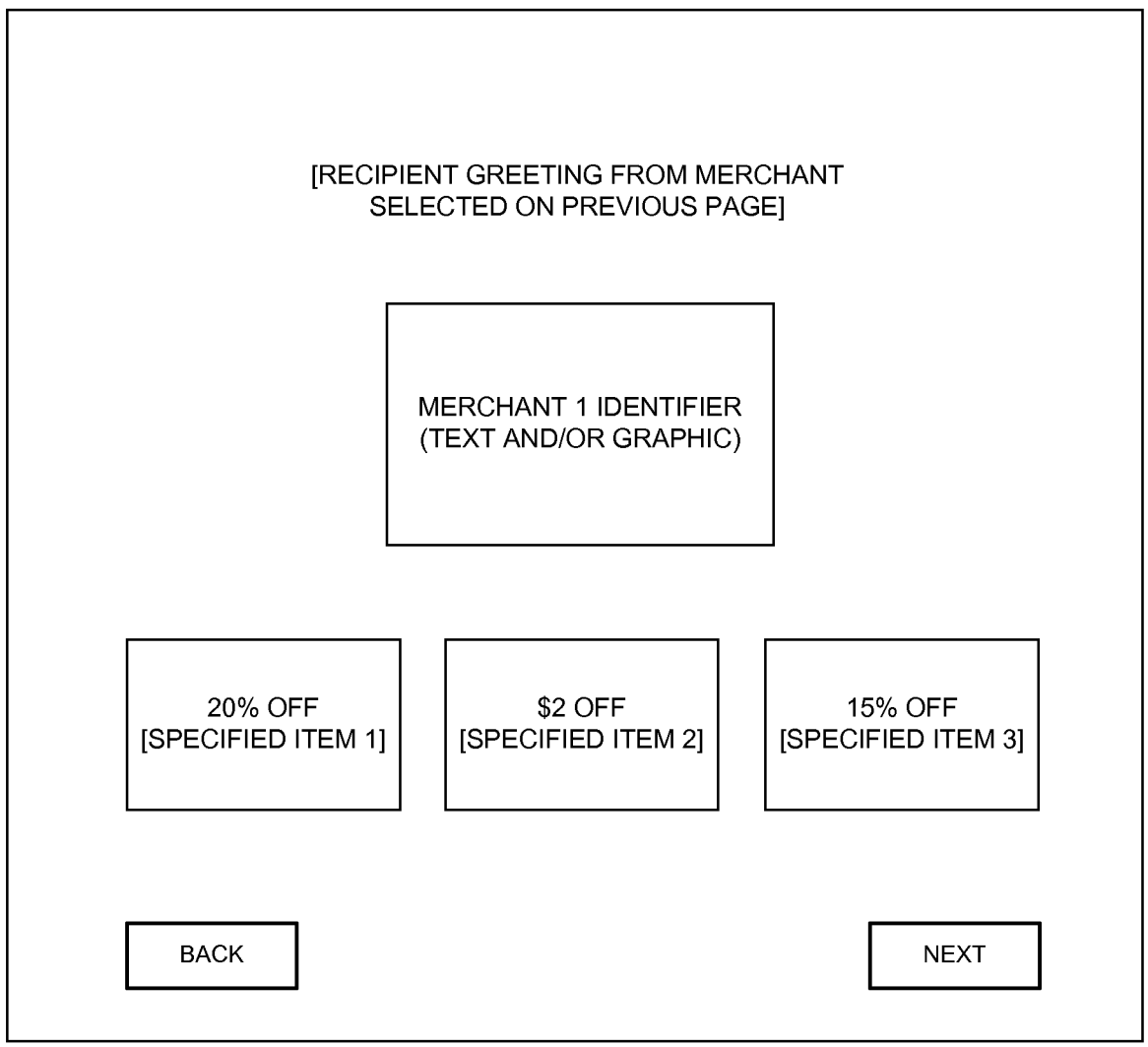

FIG. 30D illustrates example expanded monikers that are generated on the merchant offer that is generated by the personalized webpage hosting system according to the teachings of the present disclosure.

FIG. 31 illustrates an example thank you screen that is generated by the personalized webpage hosting system according to the teachings of the present disclosure.

Figure 32:
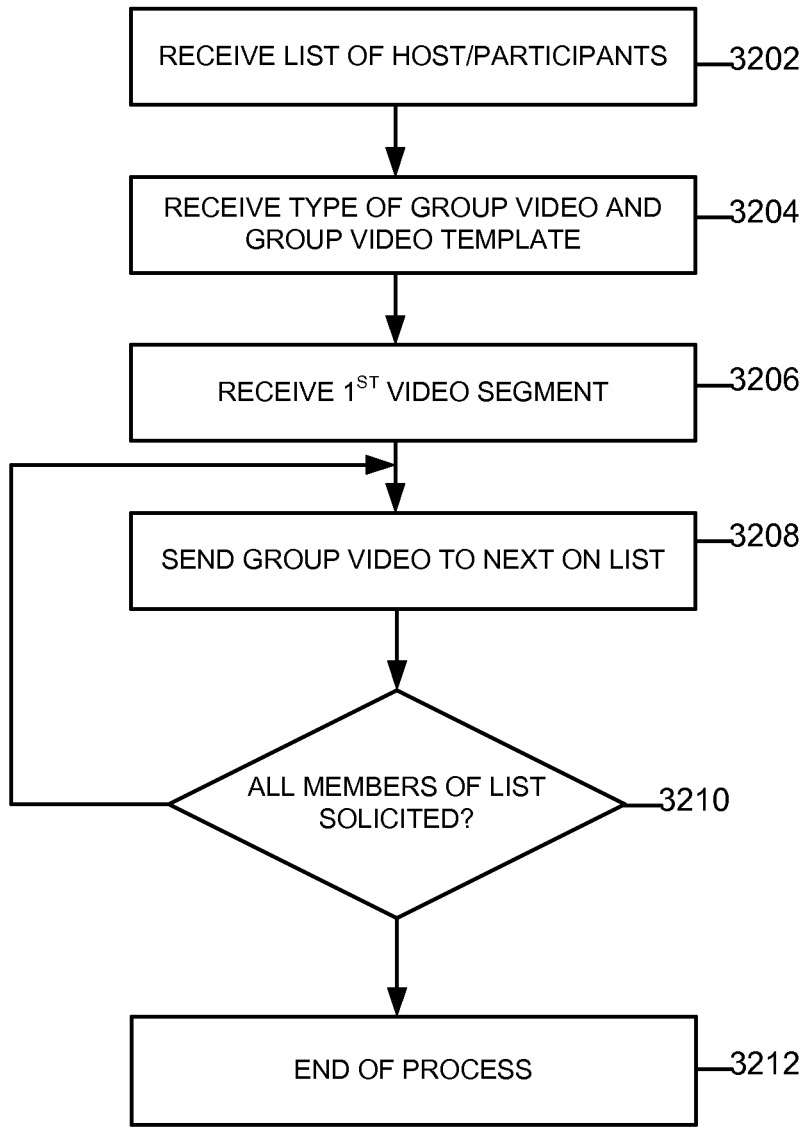

FIG. 32 illustrates an example process of generating a group video for sending to a recipient according to the teachings of the present disclosure.

Figure 33:
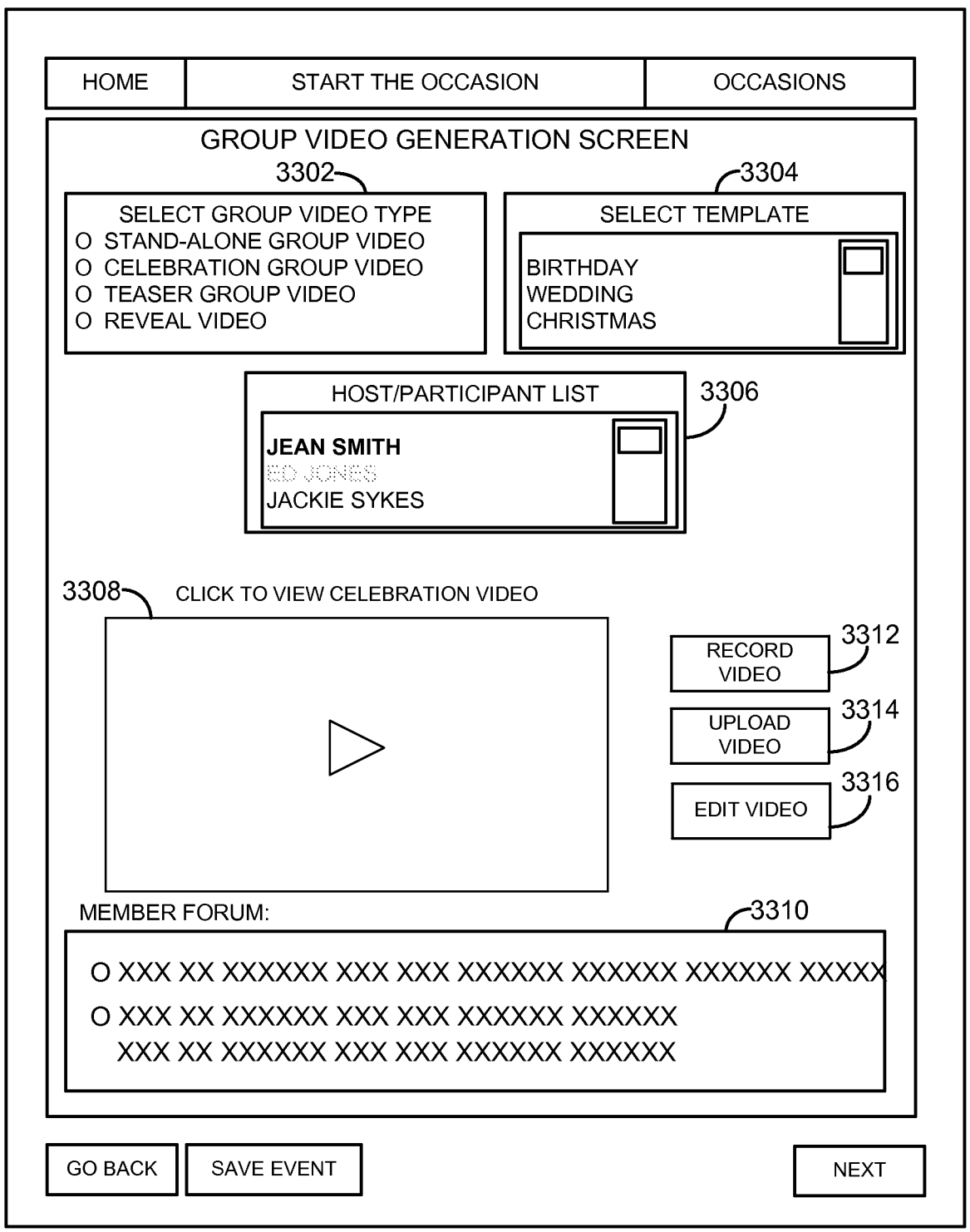

FIG. 33 illustrates an example group video entry screen that is generated by the application according to the teachings of the present disclosure.

Figure 34A:
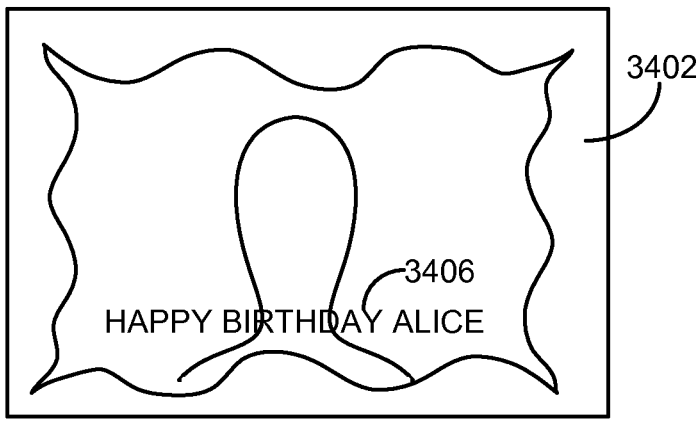
Figure 34B:
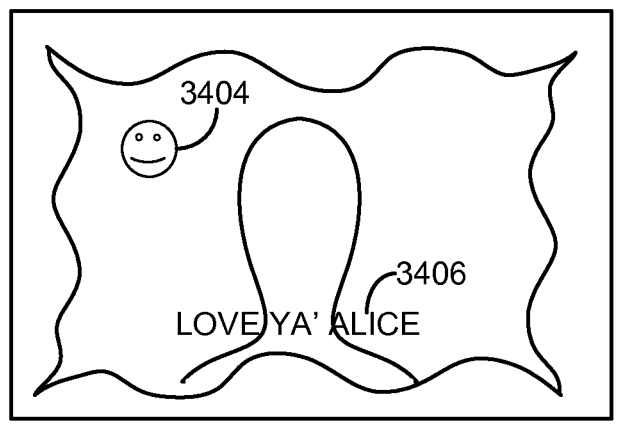
Figure 34C:
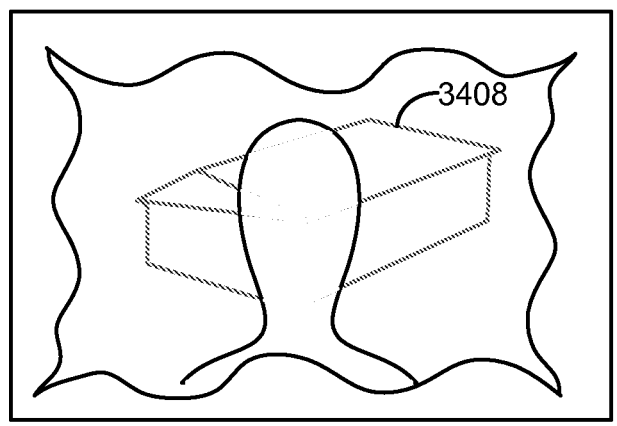

FIGS. 34A through 34C illustrate various segments of an example group video that may be generated by the process of FIG. 32 and the group video entry screen of FIG. 33 according to the teaching of the present disclosure.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

A system according to the present invention includes a purchase interface of a system webpage for receiving initial purchase and personalization information from a purchaser. The purchase interface is typically a webpage created using HTML (e.g. HTML5), XML, XHTML, PHP (PHP: Hypertext Preprocessor), JAVASCRIPT™, JAVA™ and/or equivalent programming languages or scripts as generally known in the field of art. A user (i.e. purchaser or organizer) may arrive at the purchase interface via a link (e.g. html link) provided on a third party webpage, such as a third party webpage offering gift cards or other goods or services, or the user may arrive at the purchase interface by directly accessing a system webpage. Certain embodiments or components of the purchase interface may be accessible via a browser, mobile Internet application, or other Internet-accessible software on a personal computer, smart phone, tablet device, electronic game device or other electronic device used for Internet access.

The purchase interface allows the purchaser to select among several themes or occasions such as birthday, anniversary, wedding, congratulations, thank you, back to school, new baby, bridal, graduation, house warming, and including seasonal themes or occasions such as Christmas, Hanukah, Valentine's Day, Easter, Mother's Day, Father's Day, Boss's or Administrative Assistant Day. Selection of a theme or occasion will influence or determine the options offered to the purchaser by the system during the transaction.

The purchaser is prompted to enter information identifying the purchaser and information identifying the recipient. Such information may include name, address, telephone number and email address. If the purchaser uses a device including GPS to access the system, such as mobile telephone, GPS data may be provided by the device to the system as a means of providing purchaser location. Further information entered for the gift recipient may include gender, age, interests, etc. Providing interests to the system may include the purchaser entering or selecting among vendors typically frequented or preferred by the gift recipient. The purchaser is then prompted to select one or more gift cards or other gifting means, select or enter monetary amounts, and provide personalization content, such as photographs or other images, sound or video files, or one or more messages to the recipient. Although the embodiments of the present disclosure described above makes reference to gift cards, other embodiments contemplate that any type of entity having stored value that may be used as a gifting medium, such as stored value cards (e.g., prepaid phone cards, credit cards, loyalty cards, etc.) and/or other electronic forms of value, such as electronic tickets (i.e., e-tickets), and the like.

The purchaser may be presented with a choice to either create a closed celebration or gifting presentation, whereby all selections are determined during the purchase process, or to create an open gifting presentation, whereby the purchaser serves as a celebration organizer, and third parties, and in some embodiments the recipient, may provide subsequent additional content and selections.

The system may provide personalization choices to the purchaser such as whether to deliver a selected gift card or cards to the recipient via a gift card holder selected among pre-designed holders offered for selection, via a holder customized to include purchaser provided text, images, or sound, or via a video gift card holder customized by inclusion of a selected or purchaser-provided video. The video gift card holder can store multiple videos provided by system users which may then be played sequentially. The PURL system allows users to load multiple videos limited in total length only by the storage capacity of the video gift card holder. The system also allows each participant to view storage capacity (presented in video run time) remaining on the video gift card holder. The system will prevent video messages that go beyond that capacity from being uploaded. In certain embodiments of the system, the system assigns a set time limit per participant and will not accept video messages from a participant that exceed that time limit. The system will also allow participants to view video messages uploaded by all participants, typically as a draft compiled video that includes all uploaded content to that point.

An email notification message is generated by the system to the gift recipient and includes a link to a personalized webpage identified by a PURL. The personalized webpage and PURL are both created by the system in response to selections and information provided by the purchaser. Typically, the PURL will incorporate some portion of the recipient's name or other personal identifier. In certain instances the identifier may relate to the name of a company or organization. The personalized webpage may include information provided by the purchaser such as the recipient's name, images, messages to the recipient, and information regarding gifting. Means may be provided for the recipient to add information to the webpage such as a wish list or a message to third parties that view or interact with the webpage. Means may also be provided for third parties, such as friends, relatives, or coworkers to add information for presentation on the webpage or other use by the system, such as details of an event (e.g. birthday party), messages to the recipient, or photos or video clips of an event. Information generated by the system or provided by the system provider may also be presented on the webpage such as information identifying gifting opportunities for a party interacting with the webpage. Information provided by a gift card vendor, or affiliates of the system provider or gift card vendor, may also be provided. For example, offers and advertisements generated by or on behalf of the gift card vendor or affiliate may be displayed.

In order to invite third parties to contribute to the content of the personalized webpage and/or to make gift purchase selections, a link incorporating the PURL associated with the webpage may be sent to third parties via email, text message, social media or similar means. The third party invitation to participate may include graphics and text designed to encourage participation and build excitement. The invitation may be sent well in advance of an alert to the recipient, so that third parties may make contributions and selections to the webpage, as well as gift purchases, prior to presentation of the webpage to the recipient. Alternatively, the recipient may be alerted shortly after creation of the personalized webpage and PURL so that the recipient may also influence content and selections, such as by providing a wish list or other information useful for participants to make gift purchase decisions.

The names of parties who are invited by the organizer to participate in the group gifting occasion, event or celebration, i.e. to become participants, will be listed publically on the PURL page. Those who have contributed a gift will be noted visually to represent their participation. Information received about participant participation from the PURL invitation page will be stored in a relational database (e.g. Oracle, SQL Server, MySQL or other operable databases) and presented for viewing by all invitees. PHP or other operable means is used to collect data from the PURL invitation page and transfer data to the relational database for storage. Data indicating which invitees have participated or have not yet participated may be used to send reminders or notifications (such as reminders for the group gift cut-off date to those who have not yet responded). A participant may recommend another party by adding that party's name and/or email address to a system form for receipt by the system. The recommendation, including any information provided by the recommending participant, is provided by the system to the organizer so that the recommended party may be accepted or rejected by the organizer for acceptance as a participant. Such acceptance or rejection is indicated by the organizer to the system via user interface on a personalized webpage accessible to the organizer. The organizer may accept or reject a recommended party for participation by activating an element (e.g. check box, radio button or other known type of selection element) on the webpage. If a recommended party is accepted, a record corresponding to the party, such a record typically including an email address, is added to the database record for participants. In certain embodiments, a notification may be provided by email or other means to the organizer when a participant recommends another party for participation.

In order to alert the recipient to the personalized webpage, and to provide a link incorporating the PURL associated with the webpage, the system may generate an email, text message, social media message or similar means of communication to the gift recipient. Alternatively, or in conjunction with the recipient alert message, a teaser video may be created using content provided and selected by the purchaser with a link to the teaser video provided in the message. In one embodiment, the teaser video may be generated from user-supplied content (e.g., textual, audio, photographic, and/or video content) that is transmitted at any suitable time, such as prior to receipt of the PURL by the recipient.

A celebration video is a video file which may be provided on the personalized (PURL-addressed) webpage to extend the celebration for the recipient by communicating a particular sentiment, occasion, or gift card brand experience to the recipient. The celebration video is typically personalized by uploading the recipient's photo to a system customizable central server. Text content can be added to certain customizable text fields such as the recipient's name and the occasion or sentiment. Upon uploading personalized content, the video is then rendered or composited to include the personalized content. The recipient is able to share the celebration video via social media channels by sharing the unique video URL with their social networks (e.g. FACEBOOK™, TWITTER™, PINTEREST™, INSTAGRAM™, YOUTUBE™, and GOOGLE™).

To select and enable generation of a celebration video, the purchaser (typically the organizer) selects a celebration video type from among several prerecorded videos (video templates) that may be viewed on or from a system interface. The organizer uploads a photograph of the recipient (and if provided as an option, a photograph of the organizer as well), enters the recipient's name in a text box, selects an appropriate occasion or sentiment from among several provided by the system, and enters the recipient's email address. In some embodiments, additional text fields may be provided to receive additional user text and additional photo or other image uploads may be accepted. The photograph and text are rendered into the selected video based on pre-defined fields within the video thereby creating an augmented reality experience for the recipient. The user is provided with an option to preview the video and make changes to the user information. When the user is satisfied with the video it is saved to a central server, i.e. a system video server. Upon completing the transaction via a payment/checkout procedure, the customized video message is added to the personalized webpage (the personalized webpage) where it can be viewed by other participants and ultimately by the recipient when they receive the personalized webpage.

As a further alternative that may be used in conjunction with any of the above means of notification, a third party invitation to participate, and/or an alert to the recipient, may be conveyed via social media such as a post to one or more FACEBOOK™ TWITTER™, PINTEREST™, YOUTUBE™, GOOGLE™ or other comparable accounts. System communications with social media networks may be made via network APIs and JavaScript SDKs, for example, using the Facebook SDK to invoke various APIs. It should be appreciated that communications between the system and social media networks make occur by any operable means. In addition to a link to the personalized webpage, these posts may provide additional information related to the recipient and event and provide a means for coordinating activities related to the event.

As an alternative to email or text messages to convey links, QR codes may be provided on gift cards, gift card holders, inserts, backer panels, correspondence, or other physical items conveyed to the gift recipient. These QR codes may be used as an alternative machine-readable method to encode and convey links or other information relative to the system.

A method in accordance with the present invention includes the steps of the gifting system providing a home page explaining the celebration or event to a party who serves as an initial purchaser and, in certain embodiments, an event or celebration organizer. The system interface provides a menu or other selection means for the organizer to select among predetermined occasions. Depending on the occasion type selected, the system interface may provide means for selecting among predetermined themes or designs as well. The system interface comprises a computer program that runs on a computing device such as a personal computer (e.g. desktop, laptop, notebook), server, mobile devices such as a tablet, mobile phone, IPOD™, IPAD™, and similar devices capable of presenting a user interface and networking to other computing devices.

The system interface receives details from the organizer such as the host or organizer's name, telephone number and e-mail address, the guest or recipient's name and e-mail address, an event title, and event date, and a cut-off date for participation. The system interface provides one or more menus or other selection means by which the organizer may specify recipient preferences as to shopping, dining, travel, or other purchase categories. The organizer selects whether or not to add a gift card to the purchase and, if so, whether the gift card will be a group gift card (receiving monetary contributions from multiple participants) or an individual gift card (paid by one party, typically the organizer). The organizer selects a gift card vendor, provides an amount, provides a cutoff date for contributing amounts to the gift card by other participants, and selects whether the gift card is to be a physical gift card for delivery to the recipient via mail or delivery service or an electronic gift card (also referred to an e-gift card or electronic gift card). An electronic gift card is typically embodied as an electronic message that includes a code to a stored value or other redeemable value. An electronic gift card may be send to a recipient by electronic message.

If the organizer selects a physical gift card, the system interface provides means for selecting and/or customizing a gift card holder. The purchaser may be presented with various design options for gift card holders which may be segregated among categories. If a user selects a category (e.g. color, design type, theme or occasion, pre-written message), then designs from that category will be presented for further selection. Typically, thumbnail images of designs are first presented for viewing on a system interface but may be selected by the purchaser to activate presentation of an enlarged view of the selected design.

Whether an electronic gift card or physical gift card is selected, the system provides an option for the selection and customization of a video. If a physical gift card (as opposed to an electronic gift card) has been selected and will be delivered to a gift recipient, the video comprises a celebration video to be provided for viewing by the recipient to enhance the recipient's gifting experience and celebration. If an electronic gift card is selected for delivery, a celebration video may be provided for viewing on the personalized webpage. The celebration video may be selected, or a custom video may be created by the organizer (or by the organizer and by the participants as a group video) on the system. If a group video is selected, the organizer would make that designation, optionally determine a length of a video message that each participant would be able to contribute, and each participating participant would have the ability to record a brief video message to be compiled with all other individual video messages and presented to the recipient on the personalized webpage as one sequential video. The celebration video functionality is provided and intended to make the gift recipient feel special upon viewing the gift or gifts at the personalized webpage and to serve as another way to extend the celebration of the special occasion.

The organizer provides an email address to be used by the system to send a link to the PURL which may be followed by the recipient to access the personalized webpage. The video, whether a teaser video or celebration video, will be viewable on the personalized webpage upon delivery of the PURL link to the recipient. The video is created from a video template selected by the organizer from among several video templates provided by the system. Content provided by the organizer, such as images and text, are inserted by the system into predetermined fields in the video template. The template and customized content is then rendered to produce the final video for viewing by the recipient and others. A teaser video may be sent prior to the cut-off date for participation to enhance the anticipation of the recipient.

In certain embodiments, the user uploads a photo or other image via an interface such as a Flash based player interface. The user may upload image files in any system-supported format such as JPG, TIFF, PNG, and BMP formats. The user may also select to choose a file from a social media network, which the system typically facilitates through a connecting API. The uploaded image is stored on the Content Delivery Network server. The image can be positioned by drag and drop, as well as fine-tuned controls for moving left, right, up, down, zoom in, zoom out, and rotating the image in 90 degree increments. The final, positioned image is then placed in a template-based Flash video file. This video file has predetermined placement areas that are marked and tracked within the video file. Uploaded content elements (e.g. text, images) are mapped on the placement areas in the video file. Once images and text are uploaded and mapped to the placement areas, the user can view a preview of the video through the video player. (Video players are typically generated using means such as Flash or HTML5.) The video is then composited and saved as a new video file (e.g. Flash video file) that is set for streaming from the Video Management System, specifically from the content delivery network (e.g. Rackspace or Akamai CDN). The Video Management System typically includes the entire video processing system, from the Flash components to the CDN. The video may be composited using any operable means, which may include a system specific custom compositing engine based on Adobe's Open Source Media Framework Template Flash video files. An email is sent to the recipient with a link to follow to view the final composited video file. The video may be viewed using any operable means, including a system specific, custom video player based on Adobe's Open Source Media Framework. The system may utilize a server such as a Rackspace Content Delivery Network server for storing the uploaded user images and a video server for storage of the template video files and streaming of the final composited video files. Additionally, via SWF to MP4 Conversion Tools, the video file is typically encoded into an MP4 format for optional playback on mobile devices. In certain embodiments, HTML5 is used along with or instead of Flash to play audio and video within webpages and, for example, to construct and play videos provided by the system.

Additional customization options are available if an organizer or participant selects to give an electronic gift card in addition to creation of a celebration video. Certain embodiments of the system provide options for a participant to take any of the following actions through interaction with the system:

1. Record a personal video message to announce the delivery of the gift. A video message is provided to the system either by recording via appropriate hardware and software on a computerized device (e.g. personal computer, laptop, tablet, mobile phone, smart phone, or other computerized device) operable for recording and electronically transferring video to the system, and/or by uploading a video already existing on a computerized device. This video message is typically combined with the video messages of other multiple participants that contribute to produce a video compilation that results in a teaser video or celebration video. Using video compilation tools, such as Flash or JavaScript in the prior art, and/or custom technologies, individual video clips are compiled or merged together to create one common video file. A known video file format includes SWF. Upon compilation of the video, it is stored to a file for consumer consumption, typically to a common, known format such as MP4. The video file is stored on a system server, such as a Content Delivery Network server, for playback to the recipient, organizer, participants, or other viewers. Participants may preview video recorded to-date, i.e. video recorded by prior participants thus far, as well as provide additional video content.

2. Record a personal audio message to announce the delivery of the gift. This audio message can be recorded via the microphone on the user's computer or via a toll free telephone number. Recorded audio is stored on a system server in any operable format and may be incorporated into video, sent to the recipient via electronic message, provided for listening via a link or audio player on the personalized webpage, or stored on an audio chip housed in a gift card holder.

3. Select to deliver the gift card to the recipient with a reveal animation video. Reveal animation videos are brief (for example, approximately 10 second) prerecorded animations that reveal what gift card is being given. The participant sending the gift card may select from a library of reveal animations, however, if no selection is made a standard, pre-selected animation may be used to announce the gift card being given.

Video messages may be presented to the gift recipient for viewing on a personalized webpage, as a video file attached to an electronic message such as email or text message, as a video file accessible through social media, or stored for viewing in a video playback device such as a video greeting card or video gift card holder. Notice of the video message to the gift recipient may be provided via electronic message, social media sites, or by arrival and viewing upon the video playback device. Reveal animation videos may be stored in a similar manner, presented in a similar manner and notice of reveal animation videos may be made in a similar manner as described above for teaser videos.

Audio messages may be presented to the gift recipient for listening on a personalized webpage, as an audio file attached to an electronic message such as email or text message, as an audio file accessible through social media, or stored for listening in an audio playback device such as an audio greeting card or audio gift card holder. Notice of the audio message to the gift recipient may be provided via electronic message, social media sites, or by arrival and viewing upon the audio playback device. In certain embodiments, the recorded audio is stored for playback on a Content Delivery Network server (e.g. Rackspace CDN) to enable access to the audio message online for listening.

The system interface receives payment information from the organizer such as credit card or other electronic payment information, typically utilizing a payment gateway API (e.g. PayPal® or Authorize.Net®) as well as billing and shipping addresses.

The system interface provides means for the organizer to invite other parties to participate in the celebration or event. Invitations may be sent via e-mail address or more generally by posts to social media sites. Based upon content uploaded or otherwise provided by the organizer, the system creates an invitation page displaying the recipient's name, images and text, and means for participants to make purchases and provide additional content. A celebration video, which may be selected by the organizer from pre-produced videos or may be created from a video template using participant content, may also be displayed upon the invitation page. Participants may suggest additional (prospective) participants to be invited by the organizer. The names and email addresses of the suggested participants (invitees) will be sent by the system in an email message to the organizer, alerting the organizer of these suggestions. The organizer may then log into the system to view these suggestions and deploy an invitation through the system to those suggested invitees they wish to invite.

Content provided by participants (participants include the organizer) may include messages entered as text, photographs or other images, and video or audio files. Content limits per participant may be preset by the system or may be determined and set by the organizer. Overall content limits, such as available video or audio file storage (whether calculated in time or bytes) are set by the system and generally determined by physical limitations of audio or video file circuit memory.

Content provided by participants, such as photos, may be uploaded from a participant personal computer or mobile device (IPOD™, IPAD™, mobile phone or similar devices) or may be obtained from social media cites referenced by participants, such as a participant FACEBOOK™ or TWITTER™ account/page, or photo sharing site, such as FLICKR™ or INSTAGRAM™. Video content is typically provided via file upload.

The system interface provides means, such as menus or lists, for participants to select and add a new gift card to the gifts to be provided to the gift recipient under the celebration. Gift card choices presented to the participants may be determined at least partially by information provided by the organizer such as recipient's favorite shopping, dining, and travel venues or providers.

The system may include selection criteria, such as the following, that is used by the system to construct a user profile that is used to select or generate special offers or to provide suggested gift card types or vendors to participants. Such criteria may be associated with the gift recipient and may include event type, age, gender, and geographical location.

Example 1

Event=Birthday
Age=14
Gender=Male
Interests=Gaming
Geographical Location=Chicago, Ill.
Coupon Offer=Electronic Arts Coupon for Gaming Example 2

Event=Baby Shower
Age=25
Gender=Female
Geographical Location=Minneapolis, Minn.
Coupon Offer=Enfamil Coupon for Formula Example 3

Event=House Closing
Age=26
Gender=Male
Geographical Location=Austin, Tex.
Coupon Offer=Clorox Coupon for Cleaning Supplies When such criteria is associated with a particular offer or offers, analytics, typically based on user input such as click-throughs, will be tracked and evaluated either via system algorithms or by system personnel for continual improvement of the criteria type and associated values. Selection criteria data is typically stored in a Relational Database (e.g., MySQL, Oracle, etc.). PHP along with SQL is utilized to match special offers with selection criteria.

Following the cut-off date for participation, an email, text, social media message or similar electronic message is transmitted by the system to the recipient notifying the recipient of the celebration. If a text message or other message that typically does not support graphic content is used, a link is provided to a recipient personalized webpage. If an email or similar message capable of displaying graphic content is used, the message may include, in addition text, photos or other images (including images provided by participants) as well as the aforementioned link.

The personalized webpage is created by the system and serves as the main interface for interaction between the recipient and the system as well as a means for the organizer and participant, as well as third party vendors, to display messages and content. Links to e-gift cards or to details and descriptions regarding physical gift cards are typically provided on the personalized event webpage and may comprise graphic elements, such as representations of gift boxes, which the recipient may click on with a computer pointer and mouse (or similar means) to open and view the details and descriptions. Physical gift cards may be shown as drawings or photos and will give the recipient the option to view who the gift was from. Electronic gift cards (also referred to as e-gift cards) are typically presented via animated video. Following the video, e-gift cards may then be printed or sent to a mobile device. In the case of a mobile device, the e-gift card will typically display a code on the mobile device screen that may be used to access and use the e-gift card to make a purchase. The system may present offers on the personalized event webpage from third party vendors such as discounts, coupons, special pricing and other incentives for using gift cards to purchase from certain manufacturers or within certain time spans.

The system interface provides means for the recipient to send thank you notes, either physical or electronic, to participants. In some embodiments, the recipient may customize thank you note content. In certain embodiments of the system, the recipient may record and/or upload a video or audio message for viewing by participants. Links to such videos, typically hosted on a system webpage, may be transmitted to participants via email or text message or similar means, or may be posted on social media sites.

Another embodiment of the invention includes a personalized webpage to facilitate travel-related gifting and sharing photos and travel-related details, such as travel itinerary, with others. The personalized webpage is addressed by a PURL created using user entered information. The PURL and personalized webpage may be created by any of several types of users including a traveler, a friend or relative of a traveler, or someone in the travel industry working with the traveler, such as travel agent booking a trip for the traveler.

The PURL-addressed personalized webpage may comprise a centralized resource for storing and presenting all details pertaining to a traveler's trip and may replace one or more travel confirmation numbers. All trip details may be entered, stored and presented on the personalized webpage for ready access by the traveler and others (participants). In addition, the personalized webpage may present one or more interfaces for participants to contribute monetarily to trip expenses, purchase gifts for the traveler from associated merchants or vendors, purchase hotel upgrades, book dinner reservations, pay for meals and excursion, upgrade airline or other travel tickets, and view and upload content.

The personalized webpage may also provide third party content pertaining to the trip such as flight information, weather information, and touring and activity suggestions. During or after the trip, the traveler may upload content such as text, audio, photos, and video to the personalize webpage for access by the traveler and for the traveler to share with others. In certain embodiments of a travel-related personalized webpage, options for creating online photo albums may be provided as well as options for purchasing photo prints, photo compact discs, and printed photo albums.

Travel-related personalized webpages and associated PURLs may be offered by parties in the travel industry such as travel agencies, cruise lines, airlines, hotels, theme parks, national and state parks, and federal and state tourism agencies. Travel-related personalized webpages and associated PURLs may include themes or otherwise be directed to occasions such as family vacations, honeymoons, anniversary trips, family travel such as for baptisms, and business-related travel.

Embodiments of the present disclosure provide an enhanced online gifting experience that includes a webpage personalized for a gift recipient. A system according to the present invention includes an online interface for a purchaser to enter information identifying a gift recipient, as well as text, sound, images or video relevant to the gift recipient and/or to an event. The system may use portions of this information, or other information provided by a user, to create a personalized webpage identified and located via a personal uniform resource locator (PURL). The personalized webpage is a dynamic webpage that is addressed by the PURL which is created using information provided to the system, typically by an occasion organizer. A gift recipient's name can be utilized by the system when generating (naming) the PURL or the PURL can be custom named by the user. A unique identifier may be included in the PURL to avoid users creating duplicate PURLs.

The personalized webpage provides a means for a purchaser (i.e. organizer or host) to organize a gifting experience pertaining to an occasion or event, and includes options to allow a gift recipient and invited third parties (participants or guests) to add information and make selections on the webpage.

An embodiment of a computer-implemented personalized webpage gifting system may include a purchase interface for receiving data comprising an occasion selection, recipient identifying information, recipient preferences, organizer identifying information, a personalized webpage design selection, a gift card selection, gift card selection criteria, event details, a gift card holder selection, a video selection, payment information, and shipping information. Upon entering typically at least occasion selection, recipient identifying information, organizer identifying information, webpage design selection, and event details, the system creates a purchaser-initiated personalized uniform resource locator addressing a personalized webpage (also generated by the system) for celebrating a recipient occasion and facilitating gifting to the recipient by the purchaser and other participants.

In an embodiment of the system, a user initiating a celebration (also referred to as a purchaser, organizer or host) accesses a system purchase interface of a system user interface of a system webpage or other gifting platform. The organizer may begin organizing the celebration by selecting an occasion or event they wish to celebrate, typically on behalf of a gift recipient (recipient), for example a birthday, wedding or anniversary, or a seasonal celebration such as Christmas, Hanukah, or Valentine's Day. The organizer enters information identifying themselves, such as name and e-mail address, and also enters similar information identifying the recipient. The organizer selects and specifies the gender of the recipient and also enters the recipient's age. Additional information about the recipient, particularly information pertaining to interests and preferences, such as where the recipient likes to shop and where the recipient likes to eat, may also be provided or selected. Such information may be selected from menus or lists of predetermined third party providers or vendors (associated with gift cards or other gifting means) that may be provided by the system. The organizer may also select a gift card from a list of predetermined merchants or vendors, as well as a corresponding dollar amount to associate with the card, as the organizer's own gift to the recipient. The system provides the organizer with information regarding whether or not any of the available gift card vendors are offering specials or discounts to the gift card recipient with the purchase of the gift card.

The organizer selects whether to close out the celebration or keep it open for other participants to add to the amount or select additional gift cards and amounts. (Note that the term "participant" may include the organizer.) The organizer selects how the gift card will be delivered, either physically or electronically/digitally, e.g. by email. Notification of the gift card may be via social media or networks such as FACEBOOK™, TWITTER™, PINTEREST™, INSTAGRAM™, YOUTUBE™, GOOGLE™, or by SMS/Text Message or email. Physical gift cards are typically delivered to the recipient by mail or mail service. Electronic gift cards may be delivered electronically via non-public (private) means such as email or text message or attachments thereto. The system provides the organizer with an option for the personalized webpage to include special offers or coupons from gift card brands, retailers, or manufactures for the gift recipient (PURL recipient) to view and consider. The option will typically be presented as an opt-in box that the organizer may select in order for the gift recipient to see the special offers or coupons made available from manufacturers or retailers at the time of the gift reveal (when the PURL and personalized webpage are presented to the recipient).

The system interface also provides the organizer with a selection of gift card holder personalization options. The options may vary depending on the gift card delivery method, either physical or digital. Personalization options for physical gift cards include selecting among holders that may bear customized images and text, holders that may include stored audio data for playback by audio circuits held within the holder, and holders that include stored video data for playback by video circuits held within the holder and various combinations thereof. Personalization options for electronic gift cards include recording a video or audio message to announce the arrival of the gift card, customizing a celebration video that utilizes the recipient's name, photo and other identifying elements, or selecting an animation video that reveals the gift card to the recipient. If digital delivery of an electronic or electronic gift card is selected, there are additional customization options available such as audio or video messages that allow the sender to announce the delivery or arrival of the electronic gift card as well as animation videos that do the same.

During the process of organizing the gifting experience, the system creates a personalized webpage for the recipient including a PURL typically generated using information specific to the recipient, such as the recipient's name or a portion thereof. The PURL is then used by the system, the organizer or other participants to identify and link to the recipient's personalized webpage created according to the system. Initially, the personalized webpage typically includes a message to participants identifying the recipient and the occasion to be celebrated. Options are provided to participants such as adding dollar amounts to a gift card, selecting a new gift card and amount, adding messages or comments, viewing messages or comments, adding images or videos, viewing images or videos uploaded by participants or generated by the system, or adding other content to be used by the system. Typically, the personalized webpage will include indicia or instructions such as a countdown to the cut-off date, or occasion date, to prompt participants to take action. Such instructions may also be transmitted upon initiation by the organizer or at selected intervals to participants to remind participants to take action.

The organizer may select among various prerecorded video templates stored on a system server to customize a celebration video for extending the gifting experience for the recipient. The celebration video will be presented to the recipient as on or in association with the recipient personalized webpage. Images provided by the organizer or other participants, such as a photo of the recipient (and possibly the organizer), as well as information provided as text, is placed by video generation software associated with the system into predetermined fields within the video template thereby creating a customized video for the recipient. The celebration video is presented on a personalized webpage, or system interface thereof, and links to the personalized webpage may be provided to the recipient, the organizer, and other participants by the system via email or text messages or by postings on social media sites.

In the case of an open celebration, the organizer will typically specify a cut-off date by which any contributions by other participants must be made. Typically, the cut-off date is specified as just prior to the date of the occasion being celebrated. Upon closure of an open celebration, the system will typically display a webpage thanking participants for their participation in the celebration, indicating amounts and types of gifts prepared for the recipient, and displaying content provided by participants and the organizer. A link may also be transmitted via electronic means, such as email or text message, to participants and/or posted on social media sites. The system also creates and displays the finalized recipient personalized webpage including a greeting to the recipient and information such as indications of gifts provided, relevant dates (such as dates by which gifts will arrive in the mail or be transmitted to the recipient), links to the teaser video or other content, and links to content or information provided on social media sites.

The system also provides an option to select creation of an online photo album or scrapbook. The event organizer or others participating in the celebration (collectively referred to as participants) may create an online photo album consisting of any images provided by the participants, including photographs of the gift recipient. The pages of the photo album can be selected from a library of predesigned photo album page templates including predesigned photo layouts and page designs. The photo album functionality typically may be accessed by all participants to view and to upload images. Images may be uploaded from a participant's computer or mobile device (e.g. cell phone, smart phone, pad or tablet) or may be selected from a social media site such as FACEBOOK™, TWITTER™, PINTEREST™, INSTAGRAM™, YOUTUBE™, and GOOGLE™.

The photo album is typically viewable by all participants throughout the event creation process and to the gift recipient as part of the recipient's personalized webpage. The photo album displays the provided or selected photographs or other images and allows a participant who uploads an image to include a brief description, or caption, with the image. Participants may also provide and associate comments with each image in the photo album. The various photos that are added may be sized, moved or repositioned on a photo album page by the participant who is adding the photos and customizing the album page. Photos may also be added, deleted, sized, moved or repositioned by the recipient.

A physical, printed photo album containing the image content (or a selected portion thereof) of the online photo album may be ordered for an additional cost. Printed photo albums are typically made available for ordering once the personalized webpage has been created and provided for access to the gift recipient. The gift recipient or a participant (ordering party) may select from a number of photo album covers and templates to be used with a printed album and may place an order by which the selected images will be printed, compiled and bound into a physical album mailed to the ordering party. In certain embodiments of the system, only the gift recipient may select printed photo album criteria such as images, covers and templates. In such case, participants in the event typically may also order and purchase the album designed by the gift recipient. In other embodiments of the system, any participant may make such selections to create a printed photo album personalized for that participant.

In addition to gift cards, or other gifts generated by the system through input from the organizer and participants, special offers may be provided and presented through the system from third parties such as vendors. Vendors may, for example, offer coupons, discounts or other special incentives for using gift cards by a certain date or for particular types of purchases or for purchases from particular manufacturers.

The system may also provide a selection of thank you cards, typically electronic or e-cards, amongst which the recipient may choose for transmission to one or more participants or groups of participants. Additionally, the system may provide means for the recipient to select among and/or customize a video message to participants. E-cards, video messages or links thereto may all be posted by or through the system to social media sites. The system may also provide means for the recipient to send a physical thank you card that is personalized with photos, sound, text or video and sent to a selected participant, several selected participants, or to all participants.

All Functionality described in the invention can either be provided via standalone ecommerce site or individual components/modules can be embedded in third party retailer sites via industry standard APIs provided by the system provider.

An embodiment of a method of providing a personalized webpage for online gifting may comprise certain of the steps of providing a system interface for receiving an occasion selection and recipient information, generating a personal uniform resource locator based upon a portion of said recipient information, generating a personalized webpage addressed by said personal uniform resource locator, providing a system interface for receiving a first set of identifying information, a gift card selection, a gift card dollar amount selection and a gift card delivery method selection, a second set of identifying information, a closed celebration selection or an open celebration selection, a gift card holder selection, one or more gift card holder personalization option selections, and other personalized content, and providing means for notification of the personalized webpage. The recipient information may include gender, age, location and preferences. The gift card holder may be selected from the group consisting of holders personalized with text, holders personalized with images, holders personalized with audio, and holders personalized with video. The personalized content may be selected from the group consisting of text, image file, audio file, and video file. The means for notification may be selected from the group consisting of text message, email message, electronic message, and social media network.

Figure 1A:
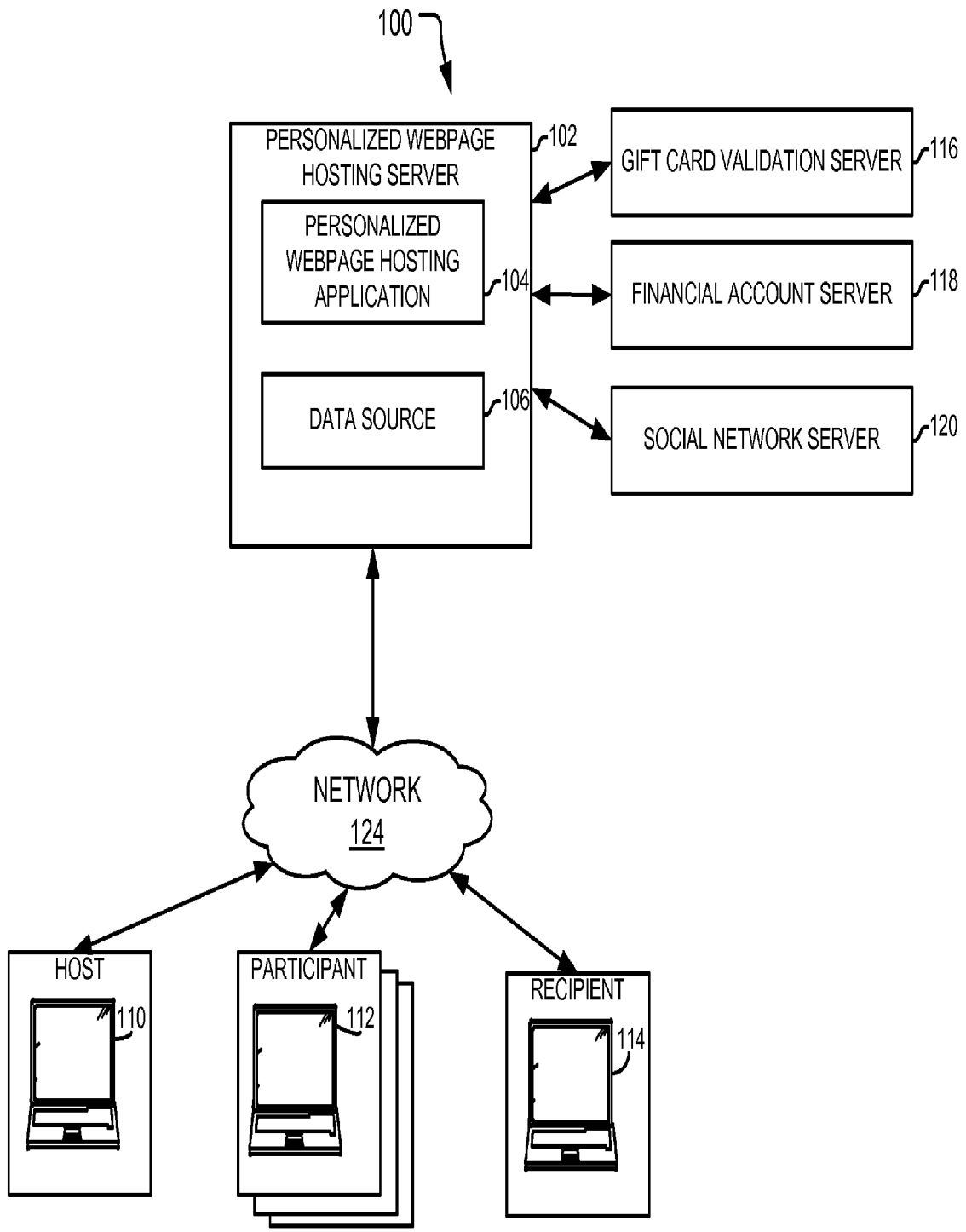
FIG. 1A is a block diagram of a computing system that includes an example personalized webpage hosting system according to an aspect of the present disclosure.
Figure 1B:
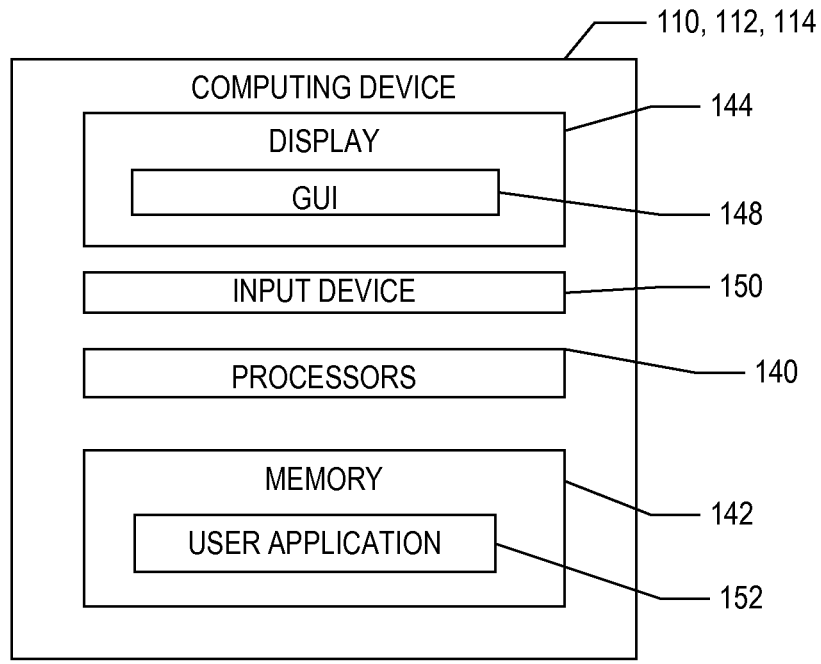
FIG. 1B depicts an embodiment of an example computing device according to one aspect of the personalized webpage hosting system.
Figure 1C:
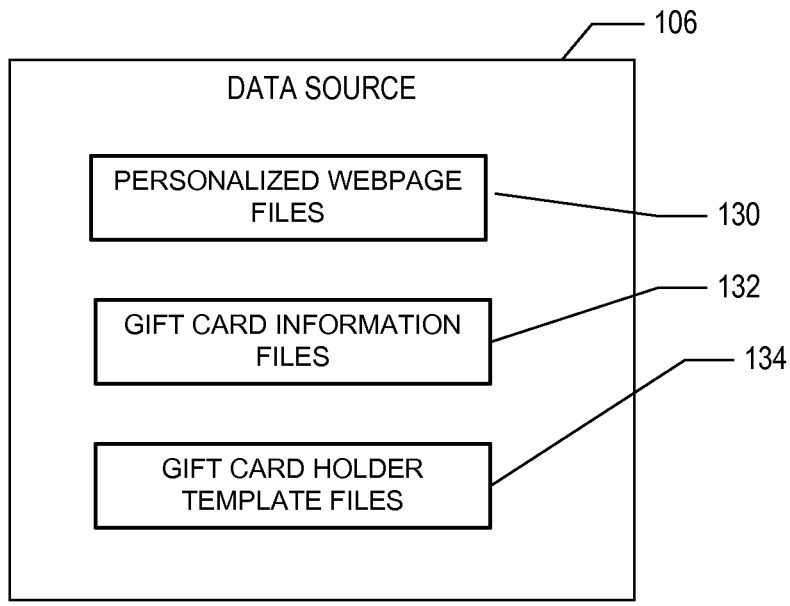
FIG. 1C depicts an embodiment of an example data source according to an aspect of the personalized webpage hosting system.

FIGS. 1A through 1C depict an example personalized webpage hosting system 100 according to aspects of the disclosure. The system 100 includes a personalized webpage hosting server 102 or other computing device or system that includes a webpage hosting application 104 and a data source 106. As will be described in detail below, the webpage hosting application 102 receives personalized content for a recipient from a computing device 110 of a host and computing devices 112 of one or more participants and generates a personalized webpage for display on a computing system 114 of a recipient.

The server 102 includes a processing system 202 (FIG. 2) that executes the webpage hosting application 104 stored in volatile and/or non-volatile memory 204 (i.e., computer readable media) using the data source 106. Examples of a server 102 include one or more servers, personal computers, mobile computers and/or other mobile devices, and other computing devices. The server 102 may communicate via wireless and/or wireline communications.

The server 102 communicates with a gift card validation server 116 for activation of one or more gift cards, and a financial account server 118 that is associated with a financial account of the user to provide payment for the activated gift cards by the host and participants. The financial account is any type, such as a credit card account, a debit card account, or a PAYPAL™ account of the user. Prior to activation of a gift card, the server 102 facilitates a financial transaction between the gift card activation server 116 and the financial account server 118 associated with the user to provide payment for the gift card.

The server 102 also communicates with a social network server 120 and a production facility 122. The server 102 communicates with the social network server 120 to obtain information about the user and/or recipient for suggesting additional content to be included with the gift card holder/gift card combination. The server 102 communicates with the production facility 122 to facilitate manufacture of a medium for including user-supplied content, which in this particular embodiment is a gift card holder that may be sent along with the selected physical gift card to the recipient. The gift card validation server 116, the financial account server 118, the social network server 120, and production facility 122 have one or more processors and executable instructions stored in volatile and/or non-volatile memory for performing the actions and/or steps described herein.

The server 102 communicates with a website of a retailer, such as a mail order retailer, or processing center of a retailer or other entity that processes incoming orders for products and fulfills these orders by managing shipment of the ordered product to the purchaser or other recipient and payment for the ordered product from the purchaser.

The server 102 communicates with a gift card validation server 116 for activation of the gift card, and a financial account server 118 that is associated with a financial account of the user to provide payment for the activated gift card by the user. The financial account is any type, such as a credit card account, a debit card account, a GOOGLE WALLET™ account, or a PAYPAL™ account of the user. Prior to activation of the gift card, the server 102 facilitates a financial transaction between the gift card validation server 116 and the financial account server 118 associated with the user to provide payment for the gift card. The server 102 also communicates with a social network server 120 to obtain information about the user and/or recipient for suggesting additional content to be included with the gift card holder/gift card combination. Additionally, the server 102 communicates with the social network server 120 to obtain information about the user and/or recipient for suggestions regarding events or any special occasions (e.g., birthdays, anniversaries, weddings, expected graduation dates, and the like) associated with the user and/or recipient. For example, the server 102 may obtain information associated with a friend of the user indicating that the friend has an upcoming anniversary, and present this information to the user along with any gift card/gift card holder designs related to anniversaries so that the user can optionally select a particular gift card/gift card holder design to send to the friend (e.g., recipient).

The data source 106 stores personalized webpage files 130, gift card information files 132, gift card holder information files 134, and gift card holder template file 134. In other embodiments, the data source 106 stores any suitable type of information for personalizing the gift card holder by the user. The personalized webpage files 130 store information with each personalized webpage and its associated personalized uniform resource locator (PURL). The gift card information files 132 store information with one or more gift cards that may be purchased by the host and/or participants. The gift card holder information files 134 store template data associated with customized gift card holders that are generated by the host and/or participants. Although the data source 106 is shown as being located on, at, or within the local server 102, it is contemplated that the data source 106 can be located remotely from the local server 102 in other aspects of the system 100, such as on, at, or within a database of a data management system or a database of another computing device or system having at least one processor and volatile and/or non-volatile memory.

The communication network 124 can be the Internet, an intranet, or another wired and/or wireless communication network. In one aspect, one or more of the server 102 and the computing devices 110, 112, and 114 communicate with one another using any suitable protocol or messaging scheme. For example, the server 102 and computing devices 110, 112, and 114 may communicate using a Hypertext Transfer Protocol (HTTP), extensible markup language (XML), extensible hypertext markup language (XHTML), or a Wireless Application Protocol (WAP) protocol. Other examples of communication protocols exist. Although the example of FIG. 1A shows the server 102 communicating with the computing devices 110, 112, and 114 through a network, other embodiments contemplate the server 102 communicating directly with the computing devices 110, 112, and 114 without the use of a separate and a distinct network. Additionally, other embodiments contemplate that the modules employed by the server 102 and the computing devices 110, 112, and 114 are integrated in one computing system.

Further, the servers 116 through 120 alternatively may communicate with the personalized webpage hosting server 102 via the network.

FIG. 1B depicts an example embodiment of a computing device 110, 112, and 114 of the host, participants, and recipient according to one aspect of the personalized webpage gifting system 100. The computing device 110, 112, and 114 is a computing or processing device that includes one or more processors 140 and memory 142 and is to receive data and/or communications from, and/or transmit data and/or communications to, the server 102 via the communication network 124. For example, the computing device 110, 112, and 114 can be a personal computer, such as a laptop or notebook computer, a workstation, or other processing device such as a personal digital assistant or a tablet computer. The computing device 110, 112, and 114 includes a display 144, such as a computer monitor, for displaying data and/or a graphical user interface 148. The computing device 110, 112, and 114 also includes an input device 150, such as a keyboard or a pointing device (e.g., a mouse, trackball, pen, or touch screen) to enter data into or interact with the graphical user interface 148. In one embodiment, the display 144 comprises a touchscreen device in which input is provided via contact by the user with the touchscreen device.

The computing device 110, 112 includes a user application 152 stored in the memory 142 and executed on the processors 140 to generate the graphical user interface (GUI) 148 to the display 104. The graphical user interface 148 enables the computing device 110, 112 of the host/participant to interact with one or more data entry forms received from the server 102 to enter order data for generating the personalized webpage and/or submitting orders to the application 104. In one embodiment, the user application 152 includes a web browser that displays interactive web pages, applets, or other suitable user interface mechanisms including one or more selectable fields, editing screens, and the like for selecting content and/or modifying pre-recorded content by the user (i.e., sender). In another embodiment, the GUI application 152 includes application software (i.e., a mobile app) that is executed on the computing device 110, 112, which is, for example, a wireless communication device for providing one or more selectable fields, edit screens, and the like for selecting content and/or modifying pre-recorded content by the user.

According to an aspect of the present disclosure, the user application 152 also includes one or more application program interface (API) modules 154 for communicating with one or more peripheral devices 156 configured in the computing device 110, 112. The API modules 154 include any type that receives user-supplied content from the user. For example, the API modules 154 include a keyboard for receiving alpha-numeric text information from the user, a microphone for receiving audio content from the user, and/or a camera for receiving photographic or video content from the user. As another example, the user application 152 may expose the API modules 154 for use by one or more other systems, such as PAYPAL™, or GOOGLE WALLET™, so that these systems may also communicate with the peripheral devices 156 for receiving user-supplied content from the computing device.

Figure 2:
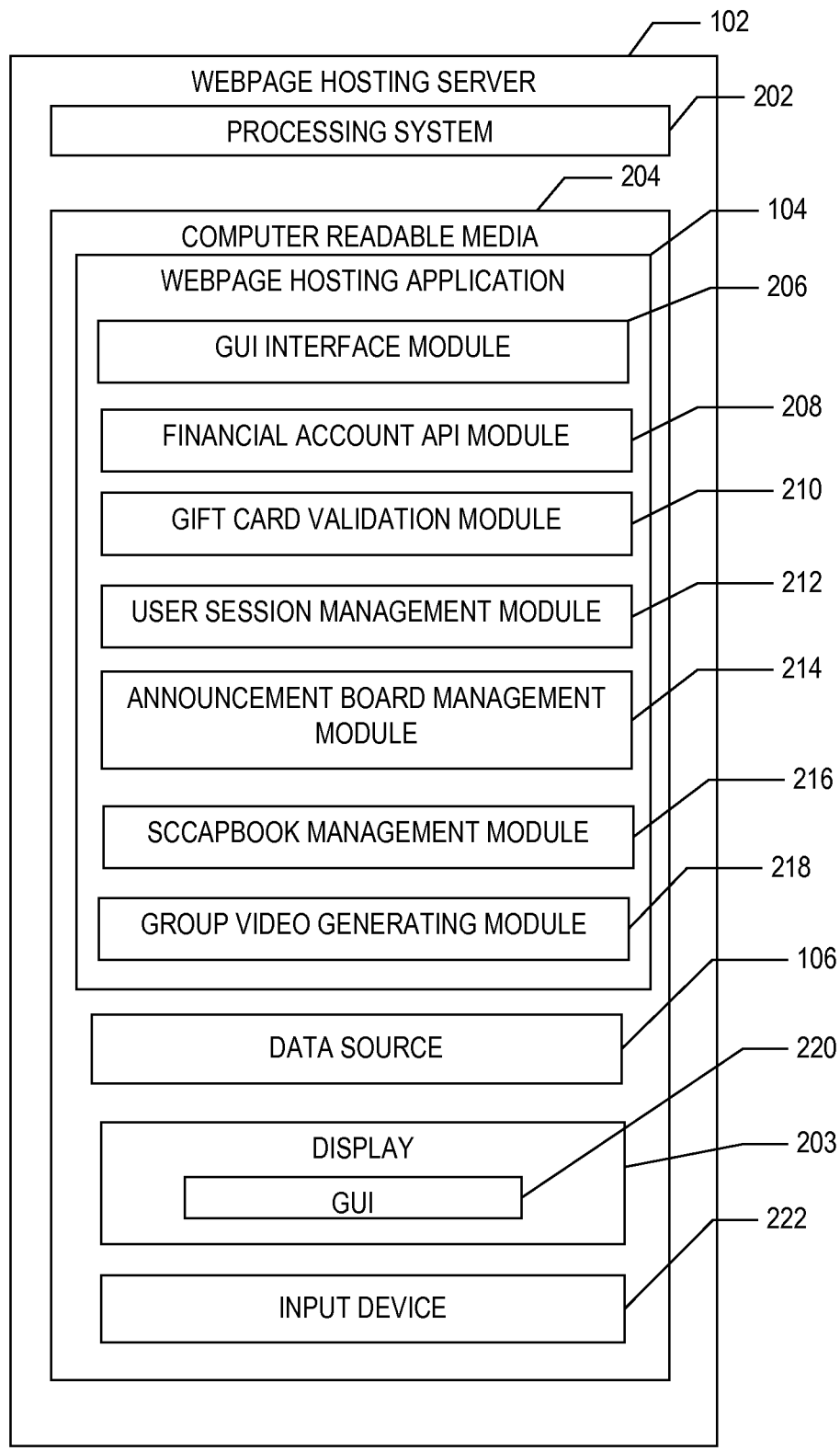
FIG. 2 is a block diagram of a computing system that includes an example personalized webpage hosting application according to an aspect of the personalized webpage hosting system.

FIG. 2 is a block diagram depicting an example personalized webpage hosting application 104 executing on the personalized webpage hosting server 102. According to one aspect, the personalized webpage hosting server 102 includes a processing system 202 that includes one or more processors or other processing devices. A processor is hardware. The processing system 202 executes the personalized webpage hosting application 104 to generate a GUI on a display of the computing devices 110, 112, and 114 in order to receive customized content for generating the PURL, and for generating a gift card and associated gift card holder to be sent to a recipient. According to another aspect, the personalized webpage hosting server 102 also includes a display 203, such as a computer monitor, for displaying data and/or a graphical user interface 226. The personalized webpage hosting server 102 may also include an input device 228, such as a keyboard or a pointing device (e.g., a mouse, trackball, pen, or touch screen) to enter data into or interact with the graphical user interface 228.

The personalized webpage hosting server 102 includes a computer readable media 204 on which the personalized webpage hosting application 104 and data source 106 are stored. The personalized webpage hosting application 104 includes instructions or modules that are executable by the processing system 202 to generate customized gift card holder/gift card combinations to be sent to a recipient. The computer readable media 204 may include volatile media, nonvolatile media, removable media, non-removable media, and/or another available media that can be accessed by the personalized webpage hosting server 102. By way of example and not limitation, computer readable media 204 comprises computer storage media and communication media. Computer storage media includes non-transient storage memory/media, volatile media, nonvolatile media, removable media, and/or non-removable media implemented in a method or technology for storage of information, such as computer/machine readable/executable instructions, data structures, program modules, and/or other data. Communication media may embody computer readable instructions, data structures, program modules, or other data and include an information delivery media or system.

A GUI interface module 206 facilitates the receipt of data and/or other communications from the host computing device 110, the participant computing device 112, and the recipient computing device 114. In one example, GUI interface module 206 communicates with the computing device 110 to generate an interactive display, or other suitable user interface mechanism including one or more selectable fields, editing screens, and the like for receiving instructions and data and activating the card by the host on the GUI 148.

A financial account API module 208 communicates with a payment processing server, such as the financial account server 118, to transact a monetary transfer of funds from the financial account of the host and/or participant to a financial account of a merchant of the gift card.

The gift card validation API module 210 communicates with the gift card validation server 116 for activation of the gift card. For example, the gift card validation server 116 may be a server managed by a merchant associated with the gift card. For another example, the gift card validation server 116 may be a third party server of a third party gift card activation service for activation of the gift card. Examples of such third party gift card activation service include INCOMM™, SVS™, and STORE FINANCIAL™ gift card activation services.

A physical gift card or an electronic gift card (e-gift card) may be validated. In one embodiment, an e-gift card may be generated in digital form and transmitted to the recipient via any suitable communication mechanism, such as via an e-mail message or a short message service (SMS) message. The e-gift card may be printable in a form suitable for redemption at a retail outlet of a merchant associated with the e-gift card.

Additionally, the GUI 220 may receive user input via the input device 222 to control the operation of the server 102. For example, an administrator may, from the display 203 and input device 222 of the server 102, control the server 102 to inhibit or allow certain functionality, perform periodic maintenance on the server 102, and/or access one or more log files associated with the operation of the server 102.

A user session management module 212 establishes, maintains, and cancels user sessions with each user (i.e., host, participants, and recipient) that accesses the personalized webpage. The user session management module 212 grants certain rights to add, delete, and/or modify content included in the personalized webpage according to each user. For example, the user session management module 212 allows addition and/or deletion of certain features, such as the addition of another group video or the deletion of an existing, while restricting the participants from performing such procedures.

An announcement board management module 214 manages the creation and modification of an announcement board that is included with the PURL website. The announcement board is included as a portion of the personalized webpage for facilitating communication among the host and one or more participants. For example, a participant may jot down a comment to another participant that has previously added video content to the group video feature of the personalized webpage informing the other participant that the added video content looks great.

A scrapbook management module 216 manages the creation and modification of a scrapbook feature of the personalized webpage. The scrapbook is included as a portion of the personalized webpage, and includes content such as textual, audio, photographic, and/or video content that is supplied by the host and/or participants for consumption by the recipient. The scrapbook is formatted in a manner to resemble a physical scrapbook having multiple pages that each commemorates a memorable occasion shared between the host/participants and the recipient.

A group video generating module 218 manages the creation of a group video that is provided to the recipient. For example, the group video generating module 218 may generate a group video in the form of a celebration video that is to be transmitted to the recipient. As another example, the group video generating module 218 generates a group video in the form of a reveal video that is played on the computing device of the recipient to reveal the gift. As yet another example, the group video generating module 218 generates a group video in the form of a teaser video transmitted to the recipient in a message independently of a gift given to the recipient.

In a particular case in which the application is embodied in a mobile application (e.g., mobile app), the group video generating module 218 may generate and maintain a list of participants from contact information received from a first of multiple participants who contribute to the group video. Upon receipt of a video segment from each participant, the group video generating module 218 may combine the received video segments with any previously received video segments to form partially completed group video. The group video generating module 218 may then transmit the partially completed group video to the next participant in the list of participants to solicit their contribution to the group video. The group video generating module 218 may also, determine when all participants in the list of participants have either contributed to the group video or declined to participate in the group video, and transmit the completed group video when completed. In one embodiment, the group video generating module 218 may forward the completed group video back to the computing device of the first participant who initiated group video for final approval prior to sending to the computing device of the recipient.

It should be appreciated that the modules described herein are provided only as an example of a computing device that may execute the personalized webpage hosting application 104 according to the teachings of the present invention, and that other computing devices may have the same modules, different modules, additional modules, or fewer modules than those described herein. For example, one or more modules as described in FIG. 2 may be combined into a single module. As another example, certain modules described herein may be encoded and executed on other computing devices, such as the computing devices 110, 112, and 114 used by the host, participants, and recipient, respectively. Further, one or more or all of the modules may be stored and executed by the personalized webpage hosting server 102 and data and instructions are transmitted to and from the personalized webpage hosting server 102 and the computing device 103 to execute their functions.

Figure 3A:
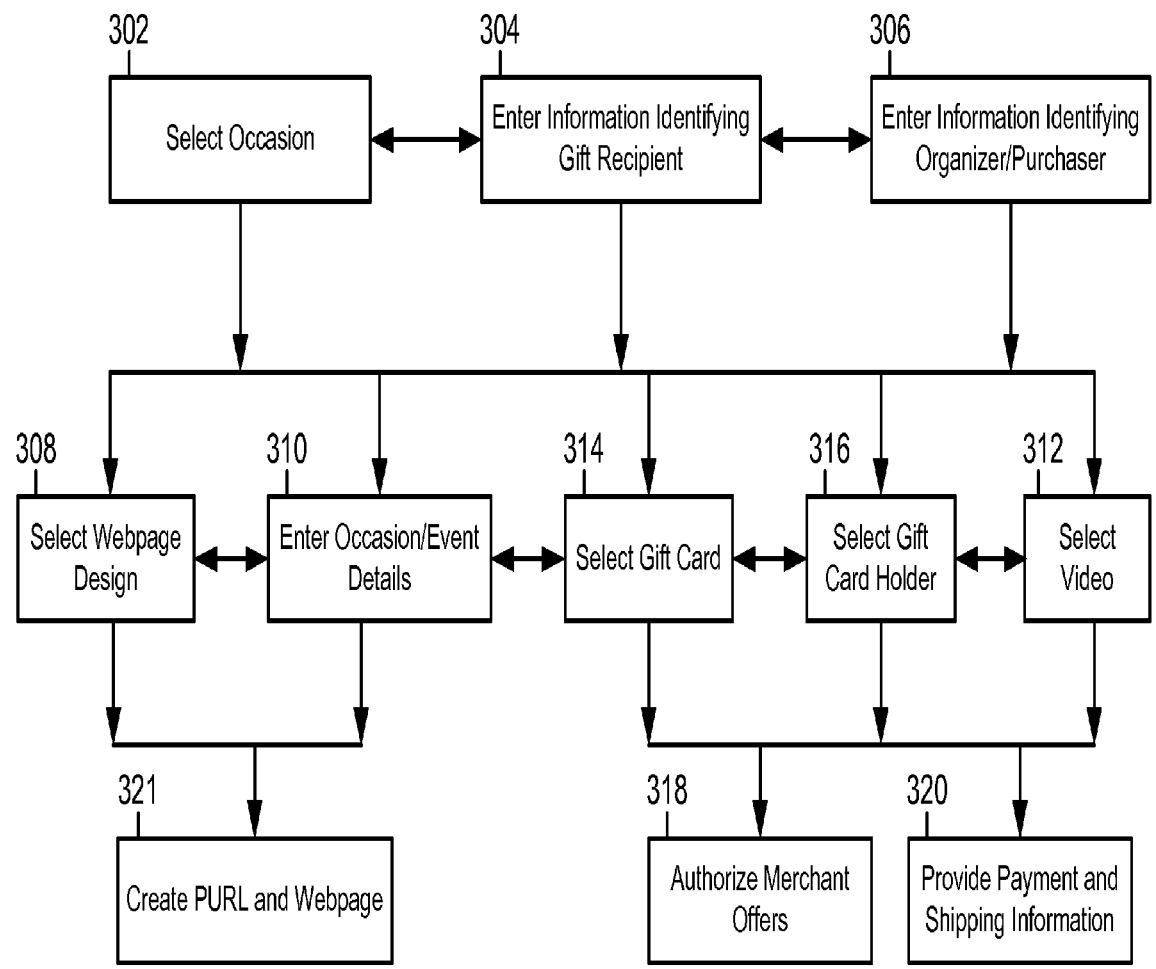
FIG. 3A is a flowchart depicting an example process for creating a personalized webpage and associated personalized uniform resource locator (URL) according to an aspect of the gift card ordering system.

FIG. 3A illustrates an example process of generating a personalized webpage and associated personalized URL by the application 104 according to the teachings of the present disclosure. Although the example process describes a generic GUI 148 interface for receiving content from the host/participants for generating the personalized webpage, the application 104 may generate any suitable interface for receiving information from a host or participant that can be used to create a personalized webpage and associated personalized URL. For example, the interface may be generated as a webpage that is rendered by a web browser executed on the host computing device 110 through a network 124, such as the Internet, or generated by application software (i.e., a mobile app) designed to be executed on a computing device embodied as a wireless communication device, a tablet computer, or other similar type of portable computing device.

In general, the generic interface receives information from the host that includes selection of an occasion, recipient identifying information, recipient preferences, host identifying information, a personalized webpage design selection, a gift card selection, gift card selection criteria, event details, a gift card holder selection, a video selection, payment information, and shipping information. Upon receiving the information, the application 104 creates a personalized uniform resource locator (PURL) addressing a personalized webpage for celebrating an occasion of the recipient and facilitating gifting to the recipient by the host and one or more other participants.

In step 302, the application generates an occasion selection screen (FIG. 4) for receiving a particular occasion to be celebrated with the recipient. Examples of selectable occasions generated by the application 104 include, for example, a birthday, wedding or anniversary, or a seasonal celebration such as Christmas, Hanukah, or Valentine's Day.

In step 304, the application 104 generates a recipient information screen (FIG. 5) for receiving recipient identifying information associated with the recipient. As shown, the recipient information screen may also provide an interface for entering certain interests and/or preferences known about the recipient by the host. These interests/preferences are used by the application 104 to generate suggested content and/or gift cards that may be added to the personalized webpage.

For example, the application 104 may prompt the host to enter information identifying the host and information identifying the recipient. Such information may include name, address, telephone number and email address. If the host uses a device including GPS to access the system, such as mobile telephone, GPS data may be provided by the device to the system as a means of providing host location. Further information entered for the gift recipient may include gender, age, interests, etc. Providing interests to the system may include entering or selecting, by the host, vendors typically frequented or preferred by the recipient. The purchaser is then prompted to select one or more gift cards or other gifting means, select or enter monetary amounts, and provide personalization content, such as photographs or other images, sound or video files, or one or more messages to the recipient.

In one embodiment, the application 104 presents the host with a choice to either create a closed webpage wherein all selections are made by the host, or to create an open webpage wherein the host serves as an organizer, and participants, and in some embodiments the recipient, may provide additional content and selections.

In step 306, the application 104 generates a host information screen (FIG. 6) for receiving information associated with the host. In step 308, the application 104 generates a webpage design screen (FIG. 7) for receiving information associated with a particular design of the webpage. For example, if the application receives Christmas as an occasion selection, the webpage design screen may include selectable themes, such as a manger design theme, a wise men design theme, and a Christmas tree design theme that may be selected by the host.

In step 310, the application 104 generates an occasion/event details screen (FIG. 9) for receiving one or more details to be associated with the personalized webpage. For example, the event details screen may receive a title to be associated with the personalized webpage, a date of the event, and a participant cut-off date. The event date is the date at which the personalized webpage is made available to the recipient, while the participant cut-off date refers to a point in time in which no further content is allowed to be added to the personalized webpage so that it may be finalized for sending to the recipient. In one embodiment, the application 104 displays a counter indicating a period of time period remaining before the cut-off date arrives. In step 312, the application 104 generates a group video screen (FIG. 10) for receiving information associated with a group video to be added to the personalized webpage.

In step 314, the application 104 receives information associated with a gift card. To accomplish this, the application 104 generates a gift card merchant selection screen (FIG. 12) for receiving information associated with a particular merchant of the gift card. Once the merchant information is received from the host, the application generates a gift card detail selection screen (FIG. 13) for receiving detailed information associated with the gift card.

The gift card may be a physical gift card that is fabricated by a production facility and sent to the recipient using a suitable mail delivery service, such as the United Parcel Service. Alternatively, gift card may be an electronic gift card (e-gift card) that is included in the personalized webpage. In one embodiment, if the gift card is to be a physical gift card, the application 104 receives information for customization of a gift card holder to be sent with the gift card to the recipient in step 316. Additional details for customizing gift card holders, which are described in U.S. patent application Ser. No. 13/273,220, entitled "Online Personalized Gifting System," filed Oct. 13, 2011, is incorporated fully herein by reference in its entirety.

Once gift card information is received, the application 104 authorizes the selected gift card with the gift card validation server 116 in step 318. That is, the application 104 provides the host with an option for the personalized webpage to include special offers or coupons from gift card brands, retailers, or manufactures for the gift recipient to view and consider. The option will typically be presented as an opt-in box that the host may select in order for the gift recipient to see the special offers or coupons made available from manufacturers or retailers when the recipient views the personalized webpage.

In step 320, the application 104, processes payment for the selected gift card by communicating with a financial account server that manages a financial account (e.g., a credit card account) of the host.

In step 321, the application 104 generates the PURL and associated personalized webpage using information provided by the host. The application 104 generates a uniform resource locator (URL) to uniquely identity or associate the recipient with the personalized webpage. In one embodiment, the personal uniform resource locator (PURL) will typically take the following form: http://<party name or other selected personal identifier>.<domain name (typically the name or identifier of the owner of the domain)>.<com, net, biz, org or other top level domain>. In other embodiments, any suitable uniquely identifying format may be used. The generated PURL may be used as a means for providing a customized or personalized web address without creating a separate domain.

Figure 3B:
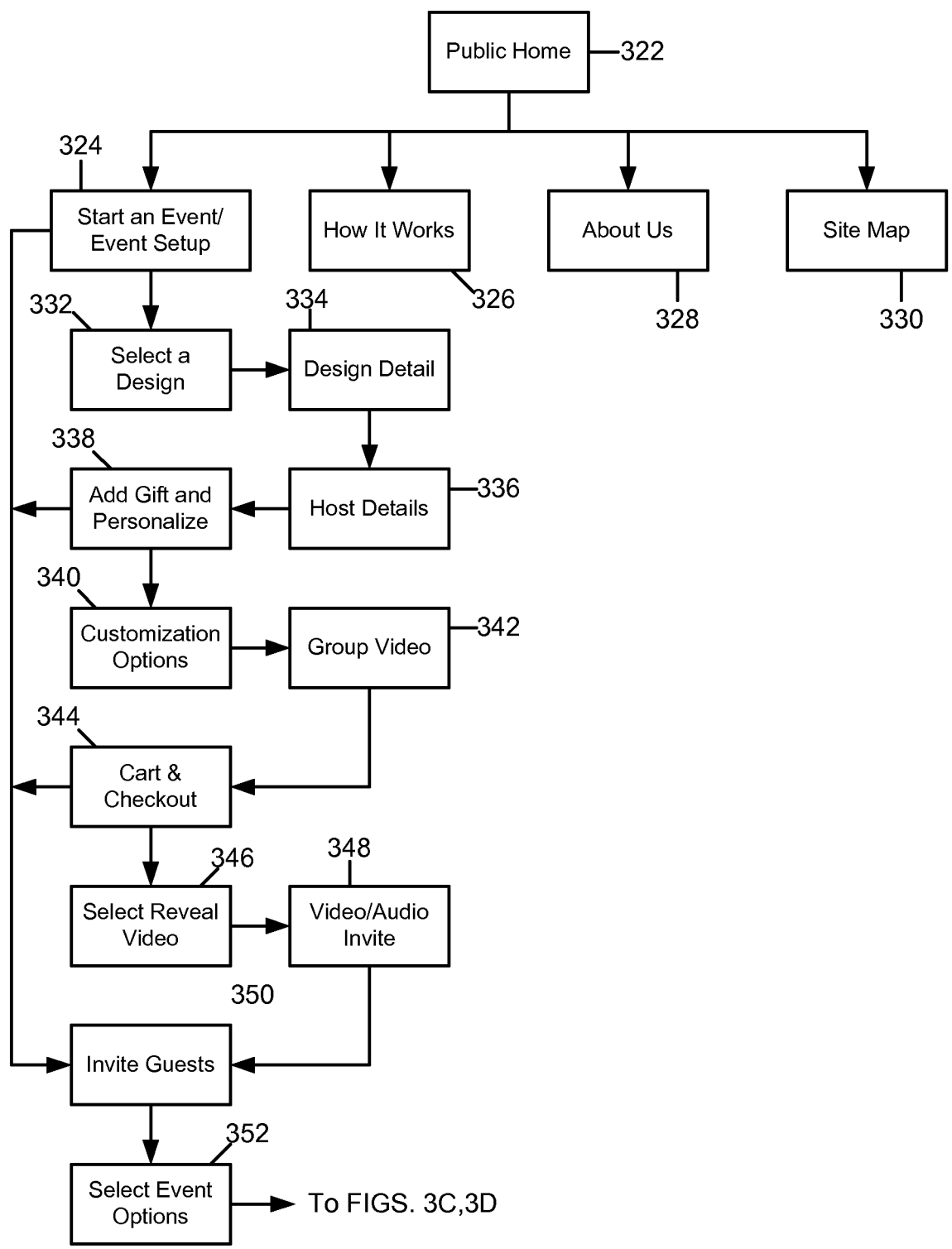
FIG. 3B is a flowchart depicting an example process of a PURL management webpage that is generated by the application according to the teachings of the present disclosure.

FIG. 3B illustrates an example process of a PURL management webpage that is generated by the application 104 according to the teachings of the present disclosure.

In step 322, the application 104 generates a splash screen (FIG. 14) representing a home page of the PURL management webpage. The splash screen provides for user initiation of a particular personalized webpage (step 324), navigating to a help page (step 326), navigating to an information screen describing the administrators of the PURL management webpage (step 328), and/or navigating to a site map page that outlines describing the various webpages that make up the PURL management webpage (step 330).

From a user perspective, the host initiates begins organizing the personalized webpage by selecting an occasion or event they wish to celebrate, typically on behalf of a recipient, for example a birthday, wedding or anniversary, or a seasonal celebration such as Christmas, Hanukah, or Valentine's Day. The host enters information identifying themselves, such as name and e-mail address, and also enters similar information identifying the recipient, such as the gender of the recipient and the recipient's age. Additional information about the recipient, particularly information pertaining to interests and preferences, such as where the recipient likes to shop and where the recipient likes to eat, may also be provided or selected. Such information may be selected from menus or lists of predetermined third party providers or vendors (associated with gift cards or other gifting means) that may be provided by the system. The host may also select a gift card from a list of predetermined merchants or vendors, as well as a corresponding monetary amount to associate with the card, as the host's own gift to the recipient. The system provides the host with information regarding whether or not any of the available gift card vendors are offering specials or discounts to the gift card recipient with the purchase of the gift card.

In response to the host initiating a particular personalized webpage, the application 104 generates a drop-down list (FIG. 15) showing the various occasions that the personalized webpage may be generated for in step 332. Alternatively, the application 104 may generate a detailed occasion screen (FIG. 16) showing a detailed view of the occasions for which the personalized webpage may be generated for in step 334. When a particular occasion is received from the host, the application 104 displays a "next" button (FIG. 17) for the host to continue to step 336.

In step 336, the application 104 generates a details entry screen (FIG. 18) for receiving information associated with the host, the recipient, and one or more other participants. Additionally, the application 104 may be receive, via the details entry screen, information associated with personal preferences associated with the recipient that the application 104 may use to create suggested gift cards that may be purchased by the host and/or participants.

In step 338, the application 104 generates a gift card selection screen (FIG. 19) for receiving selection of one or more gift cards. At this point, the application 104 receives instructions from the host for either entry of information for adding one or more participants (step 350) or customizing the selected gift card. The host and/or the recipient selects how the gift card will be delivered, either physically or digitally. If the gift card is a physical gift card, it may be delivered using a conventional mail delivery service. However, if the gift card is an electronic gift card, it may be included as a feature of the personalized webpage.

In step 340, the application 104 generates a gift card customization screen (FIG. 20) for receiving additional information associated with the selected gift card. In step 342, the application 104 generates a group video entry screen (FIG. 21) that provides for entry of textual, audio, photographic, and/or video content by the host and/or the participants. The group video review screen also allows the host and/or each participant to review the celebration video that was previously created.

Any type of user-supplied content may be entered by the host and/or participants. For example, the user can upload a photo or other image via an interface such as a Flash based player interface to the application 104. The user may upload image files in any supported format such as JPG, TIFF, PNG, and BMP formats. The uploaded image is stored on the data storage 110. The application 104 provides for positioning of the image by dragging and dropping the image to a selected portion of the screen, as well as fine-tuning controls for moving the image left, right, up, or down as well as zooming in, zooming out, and rotating the image in any desired orientation. The final, positioned image is then placed in group video file. The group video file has predetermined placement areas that are marked and tracked within the group video file. Uploaded content elements (e.g. text, images) are mapped on the placement areas in the video file. Once image and text information are uploaded and mapped to the placement areas, the host and/or participants can view a preview of the group video through a video player.

The group video is then composited and saved as a new group video file (e.g. Flash video file) that is set for streaming from a content delivery network or content distribution network (CDN), such as RACKSPACE™ or AKAMAI™. The content delivery network typically manages most or all content of the group video file. The group video may be composited using any suitable means, which may include a system specific custom compositing engine based on Adobe's Open Source Media Framework Template™ flash video files.

The personalized webpage includes a hypertext link to access the final composited group video file by the content delivery network. The group video may be viewed using any suitable means, including a system specific, custom video player based on Adobe's Open Source Media Framework™. The system may utilize a server such as a Rackspace Content Delivery Network™ server for storing the uploaded user-supplied images and a video server for storage of the template video files and streaming of the final composited group video files. Additionally, using format conversion tools (e., SWF to MP4 conversion tools), the group video file may be encoded into an MP4 format for optional playback on mobile devices. In certain embodiments, the group video may be formatted according to an HTML5 format to play audio and video within webpages and, for example, to construct and play group videos provided by the system.

In step 344, the application 104 completes a transaction with the host using conventional financial checkout procedures. At this point, the application 104 receives instructions from the host for either entry of information for adding one or more participants (step 350) or creation of a reveal video by the host and/or participants. In step 346, the application 104 generates a reveal video creation screen (FIG. 22) that allows the host to create a reveal video structure. The application 104 allows the host to select among various prerecorded video templates stored on a system server to customize the reveal video for the recipient (FIG. 23). The reveal video will be presented to the recipient as on or in association with the recipient personalized webpage. Images provided by the host or other participants, such as a photo of the recipient, as well as information provided as text, is placed by video generation software associated with the application 104 into predetermined fields within the video template thereby creating a customized video for the recipient. In step 348, the application 104 generates an invitation screen (FIG. 24) that allows participants to add video and/or audio content to the reveal video structure.

In step 350, the application 104 generates a guest invitation screen (FIG. 25) that allows the host to enter the one or more participants. In order to invite participants to contribute to the content of the personalized webpage and/or to make gift purchase selections, a link incorporating the PURL associated with the webpage may be sent to participants via email, text message, social media or other technique. The invitation to participate may include graphics and text designed to encourage participation and build excitement. The invitation may be sent well in advance of an alert to the recipient, so that participants may make contributions and selections to the webpage, as well as gift purchases, prior to presentation of the personalized webpage to the recipient. Alternatively, the recipient may be alerted shortly after creation of the personalized webpage so that the recipient may also influence content and selections, such as by providing a wish list or other information useful for participants to make gift purchase decisions.

In step 352, the application 104 receives various options associated with the PURL webpage that includes for example, the cut-off date for participation in the PURL webpage, the delivery date at which the PURL webpage is made available to the recipient, one or more content features to be included in the personalized webpage, an addition or deletion of at least one of the participant users. At this point, the application 104 generates a PURL and a corresponding personalized webpage using customized information provided by the host.

Figures 3C, 3D:
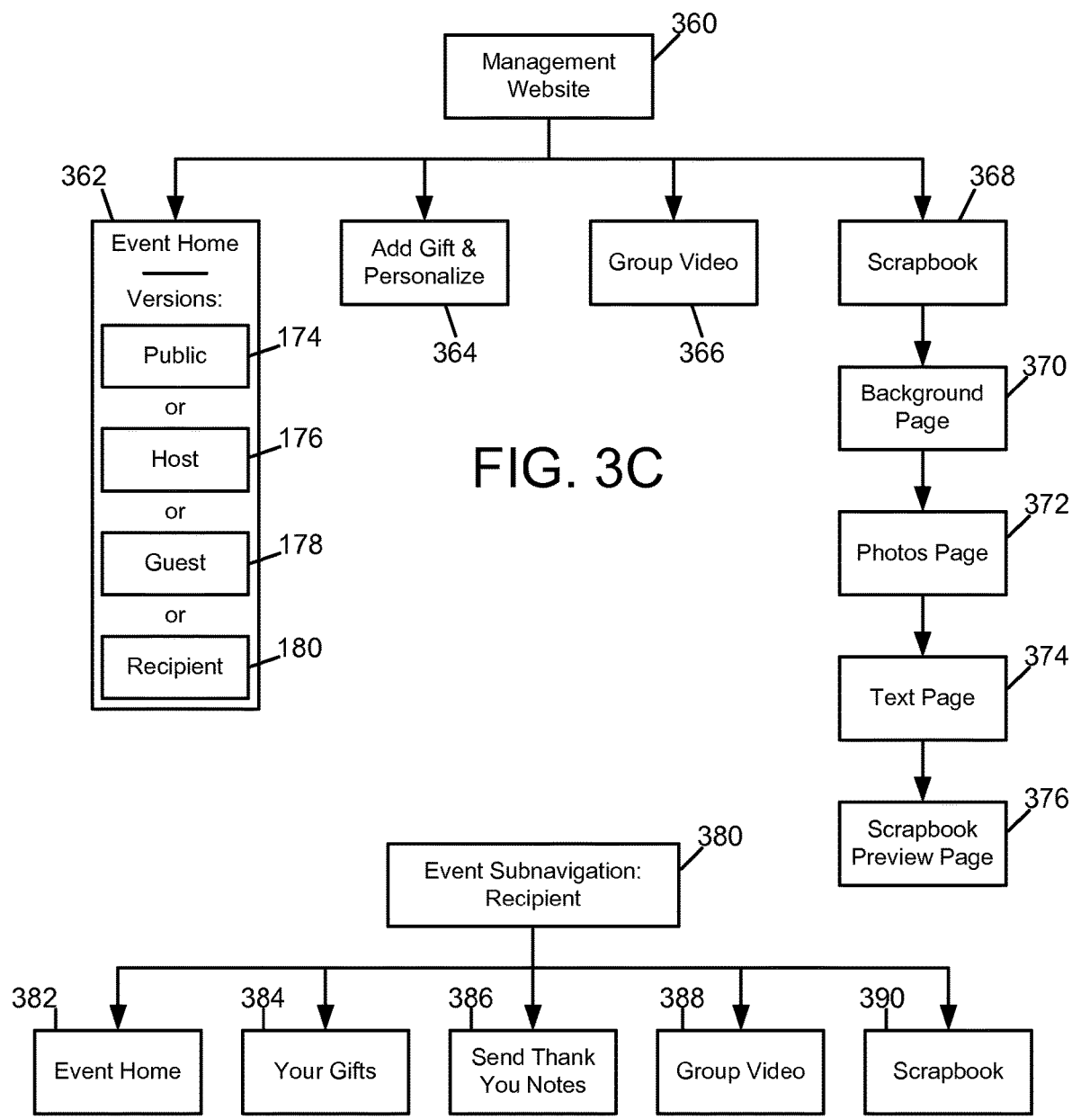
FIG. 3C is a flowchart depicting an example process of a personalized webpage that is generated by the application according to the teachings of the present disclosure.
FIG. 3D is a flowchart depicting an example process for displaying the personalized webpage to the recipient by the application according to the teachings of the present disclosure.

FIG. 3C illustrates an example process of a personalized webpage that is generated by the application 104 according to the teachings of the present disclosure. In step 360, the application 104 generates a home page when either of the computing devices 110, 112, and 114 of the host, participants, and/or recipient, respectively, accesses the personalized webpage via the PURL.

In step 362, the application 104 generates a version of the personalized webpage according to an identity of the user that accesses the personalized webpage. For example, the application 104 generates a home page screen (FIG. 26) that is displayed for the host and/or participants. In one embodiment, the application 104 provides session management for access to the personalized webpage using a login screen in which each user, such as a public user, the host, participants, or recipient may enter identifying information, such as a user name and password for providing a session to view and/or modify content included in the personalized webpage. In one embodiment, the session provided for all users other than the host has limited modification rights relative to the host. That is, the session provided for the host allows certain administrative operations that are restricted from use by either of the participants, recipient, and other (i.e., public) users. Administrative operations allowed by the host session may include, for example, a delivery date that the personalized webpage is to be made available to the recipient, one or more content features to be included in the personalized webpage, an addition or deletion of at least one of the participants.

The public user generally refers to a generic user who is neither a host, a participant, nor a recipient associated with the personalized webpage. In one embodiment, an administrative operation of the host includes whether the personalized webpage is to be a public webpage or a private webpage. For example, if the host designates the personalized webpage to be a public webpage, access to the personalized webpage is allowed for public users; however, if the host designates the personalized webpage to be a private webpage, access to the personalized webpage by public users is not allowed.

In another embodiment, the application 104 provides another administrative operation of allowing the host to add or delete one or more content features, such as the celebration video or scrapbook, from the personalized webpage. For example, after the application 104 has generated the personalized webpage and participants have begun inputting content, it is noted that an additional scrapbook should be generated for a particularly memorable occasion known among the host, certain participants, and the recipient. In this case, the application 104 provides a means for the host to generate a second scrapbook commemorating the particularly memorable event even after the personalized webpage has been initiated.

In step 364, the application 104 generates a gift card selection screen (FIG. 27) for receiving information associated with one or more gift cards. The application 104 provides for adding additional monetary value to a previously selected gift card; or alternatively, selection of a new gift card by the host and each participant.

In one embodiment, the application 104 performs analytics using information about the recipient to generate suggested gift card selections for the host and participants. The recipient information may be obtained from the host, participants, and/or one or more social media outlets. The application 104 includes various selection criteria to construct a user profile that is used to select or generate special offers or to provide suggested gift card types or vendors to participants. Examples of such selection criteria may include an event type, an age of the recipient, a gender of the recipient, and a geographical region in which the recipient resides. As a particular example, analytics performed on a male recipient residing in Chicago, Ill. having his 14th birthday reveals that he has an interest in computer gaming. The application 104 uses this information to suggest one or more gaming coupons for computer games. When such criteria is associated with a particular offer or offers, analytics based on user input such as click-throughs, will be tracked and evaluated either via system algorithms or by system personnel for continual improvement of the criteria type and associated values.

In step 366, the application 104 receives textual, audio, photographic, and/or video content from the host and/or participants for generating a group video to be included in the personalized webpage. For example, the application 104 may allocate a specified time portion of the group video for each participant to enter a video segment to be included in the group video. Additionally, the application 104 may provide for embellishments to existing video segments by certain participants.

A group video is generally a video file which may be provided on the personalized webpage to communicate a particular sentiment, occasion, or gift card brand experience for the recipient. The group video is typically personalized by uploading the recipient's photo to a system central server. Text content can be added to certain customizable text fields such as the recipient's name and the occasion or sentiment. Upon uploading personalized content, the video is then rendered or composited to include the personalized content. The recipient is able to share the group video via social media channels by sharing a video URL associated with the group video with social networks, such as FACEBOOK™, TWITTER™, PINTEREST™, INSTAGRAM™, YOUTUBE™, and GOOGLE™.

To select and enable generation of a group video, the host selects a group video type from among several prerecorded video templates that may be viewed on or from the GUI 148 of the host computing device 110 or participant computing device 112. The host uploads a photograph, such as a photograph of the recipient and/or a photograph of the host, enters the recipient's name in a text box, selects an appropriate occasion or sentiment from among several provided by the system. In some embodiments, additional text fields may be provided to receive additional text or photographic information from the host and/or participant. The photograph and text information are rendered into the selected video based on pre-defined fields within the video thereby creating an augmented reality experience for the recipient. The host and/or participants are provided with an option to preview the video and make changes to the entered information. When the host is satisfied with the video, it is saved to the data storage.

In step 368, the application 104 activates a scrapbook according to upon request from the computing device of the host or one of the participants. The pages of the scrapbook can be selected from a library of predesigned scrapbook page templates including predesigned photo layouts and page designs. The scrapbook functionality typically may be accessed by all participants to view and to upload images. Images may be uploaded from a participant's computer or mobile device (e.g. cell phone, smart phone, pad or tablet) or may be selected from a social media site such as FACEBOOK™, TWITTER™, PINTEREST™, INSTAGRAM™, YOUTUBE™, and GOOGLE™.

The scrapbook is typically viewable by all participants throughout the event creation process as part of the recipient's personalized webpage. The scrapbook displays the provided or selected photographs or other images and allows a participant who uploads an image to include a brief description, or caption, with the image. Participants may also provide and associate comments with each image in the scrapbook. The various photos that are added may be sized, moved or repositioned on a scrapbook page by the participant who is adding the photos and customizing the album page. Additionally, photos may also be added, deleted, sized, moved or repositioned by the recipient.

A physical, printed scrapbook including the image content of the online scrapbook may be ordered from the administrator of the PURL management webpage. Printed scrapbooks are typically made available for ordering once the personalized webpage has been created and provided for access to the gift recipient. The gift recipient or a participant may select from a number of scrapbook covers and templates to be used with a printed album and may place an order by which the selected images will be printed, compiled and bound into a physical album mailed to the ordering participant. In certain embodiments, only the recipient may select printed scrapbook criteria such as images, covers and templates. In such a case, participants in the event typically may also order and purchase the album designed by the gift recipient. In other embodiments of the system, any participant may make such selections to create a printed scrapbook personalized for that participant.

Once the scrapbook is activated, the application 104 generates various pages, such as a background page that includes content summarizing other content included in the scrapbook (step 370), one or more photo pages including photographs entered by the host and/or one or more participants (step 372), one or more text pages including textual content entered by the host and/or one or more participants (step 374). At any point during the scrapbook generation process, the host and/or participants may review the scrapbook for visualizing the scrapbook as it would be viewed by the recipient (step 376).

At the delivery date set by the host, the application 104 sends a message, such as an email notification message to the gift recipient and includes a link to a personalized webpage identified by a PURL. The personalized webpage and PURL are both created by the system in response to selections and information provided by the host. Typically, the PURL will incorporate some portion of the recipient's name or other personal identifier. In certain instances the identifier may relate to the name of a company or organization. The personalized webpage may include information provided by the host such as the recipient's name, images, messages to the recipient, and information regarding gifting. Means may be provided for the recipient to add information to the webpage such as a wish list or a message to participants that view or interact with the webpage. Means may also be provided for participants, such as friends, relatives, or coworkers to add information for presentation on the webpage or other use by the system, such as details of an event (e.g. birthday party), messages to the recipient, or photos or video clips of an event. Information generated by the system or provided by the system provider may also be presented on the webpage such as information identifying gifting opportunities for a party interacting with the webpage. Information provided by a gift card vendor, or affiliates of the system provider or gift card vendor, may also be provided. For example, offers and advertisements generated by or on behalf of the gift card vendor or affiliate may be displayed.

In order to alert the recipient to the personalized webpage, and to provide a link incorporating the PURL associated with the webpage, the system may generate an email, text message, social media message or similar means of communication to the recipient. In one embodiment, the application 104 generates a notification to the recipient via a social media outlet. The application 104 may include network APIs and JavaScript SDKs, for example, using the Facebook SDK to invoke various social network APIs. It should be appreciated that communications between the system and social media networks make occur by any operable means. In addition to a link to the personalized webpage, posts generated by the social media outlets may provide additional information related to the recipient and event and provide a means for coordinating activities related to the event.

As an alternative to e-mail or text messages to convey links, QR codes may be provided on gift cards, gift card holders, inserts, backer panels, correspondence, or other physical items conveyed to the gift recipient. These QR codes may be used as an alternative machine-readable method to encode and convey links or other information relative to the system.

FIG. 3D illustrates an example process for displaying the personalized webpage to the recipient by the application 104 according to the teachings of the present disclosure. In step 380, the application 104 generates the recipient version of the personalized webpage when the recipient establishes a session as described above with respect to step 362 of FIG. 3C. The application 104 generates an initial splash screen (FIG. 28) that is displayed for the recipient when the recipient session is initially established. The splash screen includes a hypertext link for receiving an instruction by the recipient to view the various features of the personalized webpage. For example, the application 104 generates a recipient home page screen (FIG. 29) that allows the recipient to browse through the various features of the personalized webpage previously generated by the host and participants (step 382).

In step 384, the application 104 generates a gifting screen (FIG. 30A) when the recipient selects a gifting hypertext link from the recipient home page. The gifting screen includes monikers that may be expanded by the application 104 when selected by the recipient as shown in FIG. 30B. In one embodiment, the a merchant offer screen (FIG. 30C) is generated by the application 104 to display one or more merchant offerings provided by certain merchants who have previously formed advertising agreements with the administrator of the PURL management webpage. The merchant offer screen includes other monikers that may be expanded by the application 104 when selected by the recipient as shown in FIG. 30D.

In step 386, the application 104 generates a thank you screen (FIG. 31) for entry of thank you information to be sent to the participant and the participants. That is, the application 104 provides for selection of thank you cards, typically electronic or e-cards, among which the recipient may choose for transmission to the host and the one or more participants. Additionally, the system may provide means for the recipient to select among and/or customize a video message to participants. E-cards, video messages or links thereto may all be posted by or through the system to social media sites. The application 104 may also provide means for the recipient to send a physical thank you card that is personalized with photos, sound, text or video and sent to a selected participant, several selected participants, or to all participants.

From the home screen, the application may display various other screens, such as the group video that has been generated by the host and participants (step 388), and the scrapbook that has been generated by the host and participants (step 390).

A personalized URL and associated personalized webpage has been herein described that provides a technique for group collaboration to generate a gifting mechanism for a recipient using user-supplied textual, audio, photographic, and/or video content that may include one or more gift cards. Whereas conventionally implemented gift cards are typically small in size thus minimizing any visual appeal that may otherwise be obtained with physically larger retail products. Additionally, due to the gift cards' relatively small size, only a limited amount of information may be placed on these gift cards. Embodiments of the present disclosure provide a solution to this problem via an online personalized webpage for including personalized information and/or one or more customized gift cards for a recipient.

A system according to the present invention includes a graphical user interface (GUI) for entry of information by a host identifying a gift recipient and one or more participants. The host generally refers to as an administrator of the personalized webpage while the participants are generally referred to as users of the webpage having limited rights relative to the host. The host and the participants may enter content, such as text, sound, images or video relevant to the recipient and/or to an event associated with the recipient. The system may use portions of this information, or other information, to create a personalized webpage identified and located via a personal uniform resource locator (PURL). The personalized webpage is addressed by the PURL which is created using information provided by the host. A recipient's name can be utilized by the system when generating (naming) the PURL or the PURL can be custom named by the host. A unique identifier may be included in the PURL to avoid users creating duplicate PURLs.

FIG. 32 illustrates an example process of generating a group video for sending to a recipient by the application 104 according to the teachings of the present disclosure. In one embodiment, the group video generation process is performed by an application 104 executed on a server 102 that communicates with a client using a thin client model. Other embodiments contemplate that the process may also be performed by a mobile application (i.e., mobile app) executed on a computing device, such as a smart phone or a tablet computer.

In general, the group video may include any video content comprising multiple video segments contributed from multiple users, such as the host and one or more participants in which each video segment includes content directed toward the recipient. Although the group video generation process described herein is directed toward operation within that of the personalized webpage gifting system, other embodiments contemplate that the group video generation process may be performed independently of the personalized webpage gifting system or that of any other process. For example, the group video generation process may be performed by a mobile app that functions independently of any application and/or server that administers the group video generation process such as described above.

The generated group video may be used as any suitable means for the recipient of the group video. For example, the generated group video may be used as a reveal structure that is played to reveal a gift provided to a recipient. As another example, the generated group video may be used as a teaser video that is transmitted to the recipient independently of the gift transmitted to the recipient. Additionally, the generated group video may be used as a celebration video for view by the recipient.

Entry of video segments by each of the host and participants may be provided a group video entry screen (FIG. 33) generated by the application 104 on the GUI 148 of the host computing device 110 and/or participant computing devices 112. The group video entry screen includes a group video type entry portion 3302, a group video template selection portion 3304, a host/participant list portion 3306, a group video preview portion 3308, a forum portion 3310, and one or more other selectable buttons that are described in detail herein below.

In step 3202, the application 104 generates a list of participants and the host sponsoring the group video. The list of host and participants may include those participants selected for inclusion in the personalized webpage gifting system described above, or may include additional participants, a reduced subset of the participants selected for inclusion in the personalized webpage gifting system, or an entirely different list group of people from those who have been selected for inclusion in the personalized webpage gifting system. In one embodiment, the list of the host and participants includes contact information, such as e-mail address information that may be used for soliciting their entry of a video segment for inclusion in the group video. In a particular embodiment in which the application 104 is a mobile app, the contact information may include a phone number that may be used for soliciting each participant's entry of a video segment via a text message.

For example, the host/participant list portion 3306 displays a list of the host and participants who have been invited to contribute to the group video. The host/participant list portion 3306 includes certain indicia for identifying those participants included in the list who have already generated their video segment, those who are scheduled to generate their video segment in the future, and/or those will have declined to generate a video segment for inclusion with the group video. For example, the host/participant list portion 3306 indicates those members who have contributed their video segment in emboldened text, those who have not yet contributed in standard weight text, and those who have declined to contribute in greyed out text.

When displayed on the host computing system 110, editing of the list to include additional persons, remove existing persons from the list is allowed by the application 104. However, when the group video generation screen is displayed on a participant computing device 112, editing of the list may be disabled as will be described herein below. That is, the application 104 is configured to allow editing of the list only by the host, or the person who has originated the group video process. In one embodiment, the list is initially populated with people who have been selected for inclusion in the personalized webpage gifting system as described above with respect to FIG. 23. In other embodiments, the list may be initially populated any group of people, or empty, such as in the case that the group video generation process is performed independently of the personalized webpage gifting system.

In step 3204, the application 104 receives selection of a type of group video to be generated and a particular template that provides a structure for entry of video segments from each of the host and participants. For example, the group video entry screen includes a group video type entry portion 3302 that provides for user selection of the type of group video to be generated. As shown, the group video type entry portion provides for selection of a stand-alone group video that is transmitted to a recipient independently of any gift that may have been selected for the recipient, a celebration video that is transmitted to the recipient along with a gift selected for the recipient, a reveal video that is played by the recipient to reveal his or her gift, and a teaser video that is transmitted to the recipient independently of the gift that is transmitted to the recipient.

The group video entry screen also includes a template selection portion 3304 that provides for entry of one group video template from among multiple group video templates available by the system. For example, the application 104 provides multiple group video templates each having themes associated with a special occasion, such as a birthday, an anniversary, a wedding, a congratulations message, a thank you message, a back to school event, a new baby, a bridal shower, a graduation, a house warming message, Christmas, Easter, and the like. For example, a new baby template may include a border that is patterned with baby related items, such a baby bottles, baby carriages, tinker bells, maternity wards, and the like. Additionally, the new baby template may include captions that include editable textual content associated with babies, such as "It's a girl!," and/or "Congratulations dad." The captions may also be editable for customizing the message delivered to the recipient.

In step 3206, the application 104 receives a first video segment to be included in the group video. In one embodiment, the first video segment will be received from the host that has initiated the group video, while subsequent video segments will be received from one or more other participants identified in the list of participants. In another embodiment, such as one in which the application 104 is a stand-alone mobile app that functions independently of a server, the first video segment may be entered by any individual, such as one who originated the group video.

The group video entry screen includes a record button 3212 that when selected, causes the application 104 to record a video segment using a camera coupled to the host computing device 110 or participant computing device 112. The group video entry screen also includes an upload button 3214 that provides for entry of a pre-recorded video segment from the host and stored on a memory of the host computing device 110.

The group video entry screen also includes a group video preview screen 3308 that displays a preview of the group video or the recorded video segment generated by the host and/or participants upon request from the host/participants. A video segment edit button 3316 is also provided that allows the user to make various changes to the recorded or uploaded video segment, such as timewise cropping of one or more portions of the video segment, darkening or lightening the video image, increasing or decreasing a volume of an audio portion of the video segment, and the like.

In one embodiment, the application 104 may measure one or more characteristics associated with the video segment, compare the characteristics against one or more normal limits associated with each characteristic, and generate a message to the user (e.g., host and/or participants) if a characteristic exceeds a specified normal limit. For example, the application 104 may generate an alert message if it determines that a recorded or uploaded video segment is either too short in length or too long in length to fit within the allotted timeframe of the group video. As another example, the application 104 may generate an alert message if it determines that the audio and/or video quality does not meet some specified quality level.

In step 3208, the application 104 sends the partially completed group video to the participant computing device 112 associated with the next person on the list described above. In one embodiment, the application 104 may send a notification message, such as an e-mail message or a text message indicating that participation in generating a group video for a recipient is requested. The notification message may include a hypertext link or other URL that may be used to access the group video entry screen. If the application 104 is a stand-alone mobile app, the mobile app may automatically, upon successful entry of a video segment by a previous user (e.g., host or participant), transmit the partially complete group video to another instance of the mobile app installed on a computing device of the next person. However, if another instance of the mobile has not been previously installed, the mobile app may generate a text message to the next person offering to install an instance of the mobile app so that the next person may be able to contribute to the group video.

The application 104 generates the group video entry screen as described above for receiving a video segment from the next person on the list. The application 104 receives a video segment from the next person on the list in a similar manner to how the video segment from the host is received. Nevertheless, the application 104 restricts the next person from certain functions relative to those provided to the host. For example, the application 104 restricts the participants from adding or deleting participants from the list, while the application 104 allows the host to edit the list of participants. As another example, the application 104 restricts the participants from changing the type or template of the group video, while allowing the host to make these changes.

In one embodiment, the group video entry screen also includes a forum portion 3310 to provide a means of communication among the host and participants using the group video entry screen. The forum portion 3310 provides for entry of messages by each of the host and/or participants, and displays these messages for view by the other members (e.g., host/participants) on the list. Each of the host and/or participants may use the forum portion for entering messages that may be viewed by other members of the group. For example, a particular participant may create a message that includes a comment about a previously contributed video segment, such as "Mary Beth, I really like your recorded video segment, especially the way you laughed at the end." As another example, the host or a participant may create another message for a member of the group or one who has yet to contribute a video segment, such as "Hey Ed, don't forget to bring your croquet set to the recipient's birthday party next week."

In step 3210, the application 104 determines whether the members on the list have had an opportunity to contribute to the group video. If so, processing continues at step 3212 in which the processing ends. However, if another person on the list has not yet been solicited for contributing to the group video, processing continues at step 3208 for soliciting that next person's contribution to the group video.

In one embodiment, the application 104 may transmit reminder messages to the next person when that next person has not responded within a certain specified time. For example, the application 104 after having transmitted the partially completed group video to the participant computing device 112, may initiate a timer such that, if the timer reaches a certain specified value, the application 104 then transmits a reminder message to that next person. The application 104 may also be configured to, after a specified number of reminder messages have been sent to the next participant with no response, cancel that next member from the list (e.g., declined to participate) and transmit a notification message to the host indicating a not available condition associated with that next person. In one embodiment, the specified time for delivery of the reminder messages, and the specified number of reminder messages are customizable values that may be set by the host. For example, the application 104 may provide for entry by the host that each participant should receive no more than three reminder messages, and that each of the reminder messages should be sent once per day.

FIGS. 34A through 34C illustrate various video segments of an example group video that may be generated by the process of FIG. 32 and the group video entry screen of FIG. 33 according to the teaching of the present disclosure. The group video generally comprises a combination of multiple video segments contributed by multiple people, and typically includes content directed toward a recipient to convey a sentiment or terms of endearment for the recipient from the contributors of the group video.

As shown, each of FIGS. 34 through 34C represent individual video segments generated and contributed by each of three people. Nevertheless, it should be understood that the group video may include any quantity of video segments, such as only two video segments, or four or more video segments. The group video may be generated from a template that is based on a theme, such as, for example, a birthday of the recipient.

In one embodiment, the template may include a border 3402 that is superimposed around a periphery of the video segments obtained from the host and participants. The border 3402 may include a simple pattern or may include images associated with the theme of the template, such as images of birthday cakes, party hats, presents, and the like for themes associated with birthdays.

In another embodiment, the group video template may include other elements, such as icons 3404 or text fields, such as text captions 3406 that may be editable by each host and/or participant who contributes to the group video. For example, the template may include a standard text caption to be superimposed over each contributed video segment stating "Happy Birthday [insert name]" that whose name is to be filled in by the host. As shown, the first video segment shows that the text caption has been edited to state "Happy Birthday Alice." Additionally, the text caption 3406 superimposed on each video segment may be edited by the contributor of that video segment. For example, the person who contributed the video segment of FIG. 34B has edited the text caption to state "Love Ya' Alice," while the person who contributed the video segment of FIG. 34C has edited the text caption 3406 to remove all of the standard text.

In yet another embodiment, the application 104 may provide for superimposing an image 3408, such as a photograph as a background image behind the video segment of that person who contributed that video segment. For example, as shown in FIG. 34C, the application 104 superimposes a background image 3408 behind the video segment which was received from the contributor of the video segment of FIG. 34C.

In yet another embodiment, the application 104 may also superimpose audio content on the group video. For example, the template may include a rendition of the birthday song to be superimposed over audio content included in each video segment. Additionally, the application 104 may provide for replacement of the standard audio segment provided by the template with another audio segment selected by the host and/or participants.

Although FIGS. 34A through 34C illustrate an example group video that may be generated by the system, other embodiments may include additional, fewer, or different components without deviating from the spirit or scope of the present disclosure. For example, the group video describes a border that extends across the entire periphery of the video segments comprising the group videos, other group videos may include a border that extends over only one edge of the video segments, such as along the bottom edge, top edge, a or side edge of the video segments. As another example, while the group video describes three video segments generated by a corresponding three people, other embodiments contemplate that each contributing person may contribute any number of video segments, such as two or more video segments, that are inserted within different timeslots of the group video.

It is to be understood that while certain forms of this invention have been illustrated and described, it is not limited thereto except insofar as such limitations are included in the following claims and allowable equivalents thereof.

The invention claimed is:

1. A personalized gifting system comprising:
a server in communication with a computing device and comprising at least one processor; and
one or more non-transitory computer-readable media storing computer-executable instructions executable by the at least one processor to:
generate a graphical user interface configured to receive recipient information associated with at least a gift recipient from a user;
generate a personalized uniform resource locator (URL) based at least in part on the recipient information;
receive at least one of text, audio, video, and a photograph from a plurality of participants;
present an option for limiting a length of the video; and
present, via a personalized webpage accessible by the personalized URL, the at least one text, audio, video, and the photograph to the recipient.

2. The personalized gifting system of claim 1, wherein the instructions are further executable to facilitate transmission of a gift with the at least one text, audio, video, and photograph from the plurality of participants.

3. The personalized gifting system of claim 2, wherein the gift is a physical gift and an image of the gift is presented via the personalized webpage.

4. The personalized gifting system of claim 3, wherein the instructions are further executable to facility delivery of the physical gift.

5. The personalized gifting system of claim 4, wherein the instructions are further executable to send a message to the recipient with a link to the personalize webpage identified by the personalized URL at a delivery date of the physical gift.

6. The personalized gifting system of claim 2, wherein the gift comprises at least one of a stored value card, a good, and a service presented via the personalized webpage.

7. The personalized gifting system of claim 6, wherein the at least one of the stored-value card, the good, and the service provided via the personalized webpage is redeemable at a third-party website and a physical location associated with the third-party.

8. The personalized gifting system of claim 7, wherein the at least one of the stored-value card, the good, and the service is associated with at least one of travel, dining, and shopping.

9. The personalized gifting system of claim 6, wherein the stored-value card is associated with an account associated with at least one participant of the plurality of participants or a host.

10. The personalized gifting system of claim 6, wherein the stored-value card is selected from a plurality of stored-value card options based at least in part on a stored history of input from at least one of the plurality of participants and a host.

11. The personalized gifting system of claim 1, wherein the instructions are further executable to combine at least two of the text, audio, video, and photographic content.

12. The personalized gifting system of claim 1, wherein the instructions are further executable to generate a forum portion on the GUI for receiving entry of text content and displaying the text content, the text content including information from at least one participant to one or more other participants of the plurality of participants.

13. One or more non-transitory computer-readable media storing computer-executable instructions that, when executed by at least one processor, perform a method of presenting a personalized gift to a recipient, the method comprising the steps of:
  generating a graphical user interface (GUI) to receive personalized content from each of a plurality of participants,
  wherein the personalized content comprises at least one of a video segment, text, audio, and a photograph from each of the plurality of participants,
  presenting, via the GUI, an option for limiting a length of each video segment to be received;
  combining, using the at least one processor, the personalized content from each participant to form a personalized content structure;
  generating a personalized Uniform Resource Locator (URL); and
  presenting, using the at least one processor, the personalized content structure to the recipient via a personalized webpage associated with the personalized URL.

14. The method of claim 13, further comprising facilitating transmission of a gift with the personalized content structure to the recipient.

15. The method of claim 14, further comprising presenting administrative operations associated with the personalized webpage, wherein the administrative operations associated with the personalized webpage are at least one from the list comprising a delivery date of the personalized content structure and the gift to the recipient, one or more content features to be included in the personalized webpage, and an addition or deletion of at least one of the participants.

16. The method of claim 15, further comprising receiving stored-value card information associated with a stored-value card for the recipient, and activating the stored-value card using a financial account associated with at least one of the plurality of participants and a host with access to the administrative operations.

17. A personalized gifting system comprising:
  a server in communication with a computing device and comprising at least one processor; and
  one or more non-transitory computer-readable media storing computer-executable instructions executable by the at least one processor to:
    generate a Graphical User Interface (GUI) to receive personalized content from each of a plurality of participants;
    generate a personalized Uniform Resource Locator (URL),
    wherein the personalized content comprises at least one of a video segment, text, audio, and photographic content from each of the plurality of participants;
    present, via a display, an option for limiting a length of each video segment to be received;
    combine, using the at least one processor, the personalized content from each of the participants to form a personalized content structure; and
    present the personalized content structure and a gift to a recipient via the personalized URL.

18. The personalized gifting system of claim 17, wherein the computing device is a mobile device and is further executable to:
  receive contact information associated with the plurality of participants from a host;
  generate a list of participants from the contact information; and
  display the list of participants on the GUI.

19. The personalized gifting system of claim 18,
  wherein the instructions are further executable to display a name associated with each participant indicative of each participant that has contributed to the personalized content structure, and
  wherein a text of the personalized URL comprises recipient information associated with the recipient of the gift.

20. The method of claim 19, wherein the instructions are further executable to receive stored-value card information associated with a stored-value card for the recipient, and activating the stored-value card using a financial account associated with at least one of the plurality of participants and a host.

* * * * *